(12) United States Patent
Shiohara

(10) Patent No.: US 8,125,533 B2
(45) Date of Patent: Feb. 28, 2012

(54) UNDEVELOPED IMAGE DATA DEVELOPING APPARATUS, METHOD FOR DEVELOPING UNDEVELOPED IMAGE DATA, AND COMPUTER PROGRAM FOR DEVELOPING UNDEVELOPED IMAGE DATA

(75) Inventor: Ryuichi Shiohara, Hatsumoto (JP)

(73) Assignee: Seiko Epson Corporation, Tokyo (JP)

( * ) Notice: Subject to any disclaimer, the term of this patent is extended or adjusted under 35 U.S.C. 154(b) by 894 days.

(21) Appl. No.: 12/117,618

(22) Filed: May 8, 2008

(65) Prior Publication Data
US 2008/0278599 A1 Nov. 13, 2008

(30) Foreign Application Priority Data

May 8, 2007 (JP) ................................. 2007-123618
May 8, 2007 (JP) ................................. 2007-123634

(51) Int. Cl.
*H04N 5/228* (2006.01)
*H04N 7/01* (2006.01)
*G06K 9/46* (2006.01)
*G06K 9/36* (2006.01)

(52) U.S. Cl. ...................... 348/222.1; 348/441; 348/458; 382/166; 382/235; 382/239; 382/244

(58) Field of Classification Search ................ 348/222.1, 348/441, 458; 382/239, 166, 235, 244
See application file for complete search history.

(56) References Cited

U.S. PATENT DOCUMENTS 7,408,587 B2 * 8/2008 Matsutani et al. ............ 348/441
7,702,015 B2 * 4/2010 Richter et al. ........... 375/240.11
7,782,365 B2 * 8/2010 Levien et al. ............... 348/220.1
7,831,103 B2 * 11/2010 Mahiar et al. ................. 382/239

FOREIGN PATENT DOCUMENTS

| JP | 08-298669 | | 11/1996 |
|---|---|---|---|
| JP | 2002330388 | A | 11/2002 |
| JP | 2004-128809 | | 4/2004 |
| JP | 2005086516 | A | 3/2005 |
| JP | 2005-275454 | | 10/2005 |
| JP | 2005-286423 | | 10/2005 |
| JP | 2006-203555 | | 8/2006 |
| JP | 2006-203572 | | 8/2006 |
| JP | 2006-227698 | | 8/2006 |
| JP | 2006-295815 | | 10/2006 |
| JP | 2006295815 | A | 10/2006 |

* cited by examiner

*Primary Examiner* — Luong T Nguyen
*Assistant Examiner* — Quang Le
(74) *Attorney, Agent, or Firm* — DLA Piper LLP (US)

(57) ABSTRACT

The invention provides a development processing apparatus that performs development processing on the basis of an image file that contains undeveloped image data created by a digital camera and accompanying image data that accompanies the undeveloped image data. The accompanying image data is image data that has been subjected to development. The development processing apparatus includes an actual development processing section that creates actually developed image data conforming to a predetermined format from the undeveloped image data. A first analysis-purpose image generating section is provided that creates a first analysis-purpose image data having a predetermined resolution by performing development processing on the undeveloped image data. A second analysis-purpose image generating section is provided that creates a second analysis-purpose image data having a predetermined resolution from the accompanying image data.

8 Claims, 40 Drawing Sheets

FIG. 8A
3008×2000 PIXELS
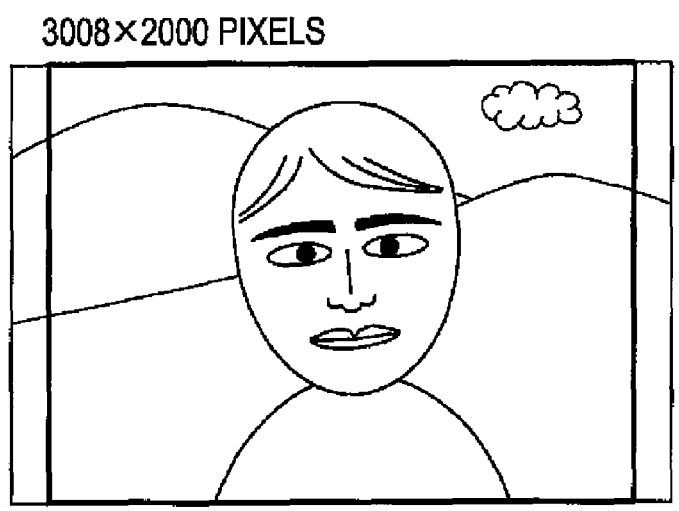
FIG. 8B
2664×1998 PIXELS
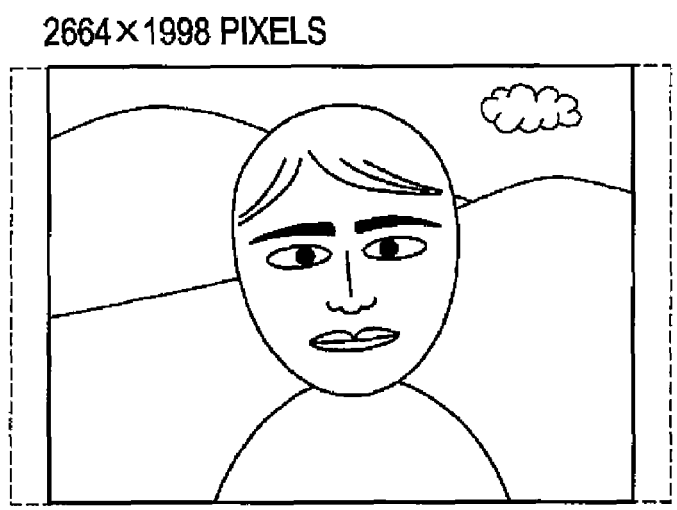
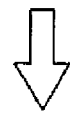
FIG. 8C
320×240 PIXELS
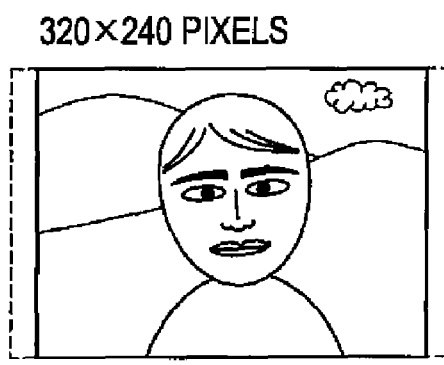

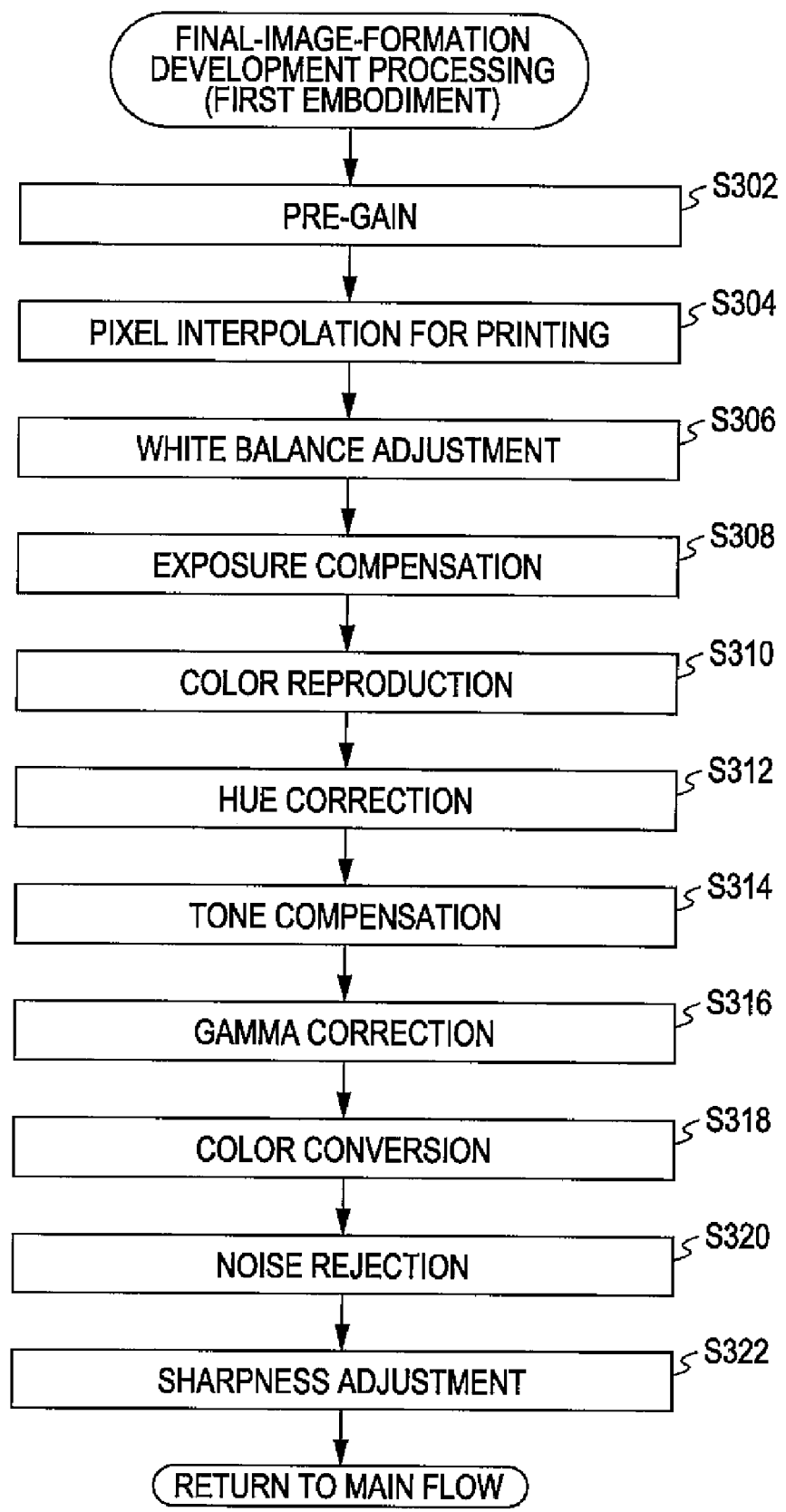

FIG. 12

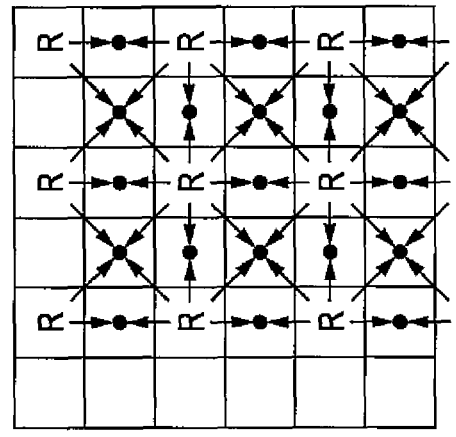
FIG. 34C
ARRAY PATTERN OF R PIXELS
FIG. 34E
R-PIXEL INTERPOLATION PROCESSING
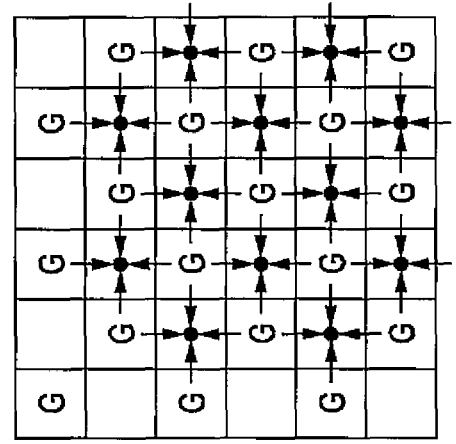
FIG. 34B
ARRAY PATTERN OF G PIXELS
FIG. 34D
G-PIXEL INTERPOLATION PROCESSING
FIG. 34A
BAYER COLOR-FILTER ARRAY PATTERN

FIG. 35A
BAYER COLOR-FILTER ARRAY PATTERN

| R | G | R | G | R | G |
|---|---|---|---|---|---|
| G | B | G | B | G | B |
| R | G | R | G | R | G |
| G | B | G | B | G | B |
| R | G | R | G | R | G |
| G | B | G | B | G | B |

FIG. 35B
PIXELS USED FOR GENERATION OF RGB PIXEL

| R | G | | | R | G |
|---|---|---|---|---|---|
| G | B | | | G | B |
| | | | | | |
| | | | | | |
| R | G | | | R | G |
| G | B | | | G | B |

FIG. 35C
RGB PIXELS

| RGB | RGB |
|---|---|
| RGB | RGB |

UNDEVELOPED IMAGE DATA DEVELOPING APPARATUS, METHOD FOR DEVELOPING UNDEVELOPED IMAGE DATA, AND COMPUTER PROGRAM FOR DEVELOPING UNDEVELOPED IMAGE DATA

CROSS-REFERENCE TO THE RELATED APPLICATIONS

This application claims benefit of priority under 35 U.S.C. §119 to Japanese Patent Application No. 2007-123618 filed May 8, 2007 and Japanese Patent Application No. 2007-123634 filed May 8, 2007, the entire contents of both of which are incorporated herein by reference.

BACKGROUND

1. Technical Field

The present invention relates to a technique for developing undeveloped image data created by a digital camera.

2. Related Art

Conventionally, users of digital still cameras record RAW image data (undeveloped image data) into a memory card, which directly represents the amount of incident light that entered into an image pickup device, such as a CCD or the like, that is provided in the digital still camera. The RAW image data recorded into the memory card is thereafter converted into image data conforming to an image-data format such as JPEG, TIFF, or the like, or into printing image data by a development processing application or the like that is installed on a personal computer. In the following description, converted image data may be referred to as actually developed image data. Development techniques of the related art are described in, for example, JP-A-8-298669, JP-A-2006-295815, and JP-A-2006-227698.

In the above-described conversion of RAW image data into image data conforming to an image-data format, known as "development processing" or more simply as "development". The picture quality of actually developed image data is greatly affected by the processing parameters used in the course of the development processing. The processing parameters are hereafter referred to as development conditions. For this reason, unless appropriate development conditions are set, the picture quality of the actually developed image data can be unsatisfactory, which is a problem that has not been fully solved by the related art. Even if development conditions are suitable for some RAW image data, those development conditions are not always suitable for other RAW images because shooting conditions (i.e., photographing conditions), under which RAW images are taken, differ from one shooting location to another.

SUMMARY

The present invention provides a technique for facilitating the development condition settings at the time of developing undeveloped image data so as to create actually developed image data.

One aspect of the invention is a development processing apparatus that performs development processing on the basis of an image file that contains undeveloped image data that was created by a digital camera and further contains accompanying image data that accompanies the undeveloped image data. The accompanying image data is image data that has been subjected to development. The development processing apparatus includes an actual development processing section that creates actually developed image data conforming to a predetermined format from the undeveloped image data. A first analysis-purpose image generating section is provided that creates a first analysis-purpose image data having a predetermined resolution by performing development processing on the undeveloped image data. A second analysis-purpose image generating section is provided that creates a second analysis-purpose image data having a predetermined resolution from the accompanying image data. A development condition determining section is provided that determines development conditions that are to be used by the actual development processing section by analyzing either one of the first analysis-purpose image data and the second analysis-purpose image data. An analysis-purpose image data selecting section is provided that selects either one of the first analysis-purpose image data and the second analysis-purpose image data as analysis-purpose image data that is to be used in the analysis performed by the development condition determining section on the basis of precedence between the first analysis-purpose image data and the second analysis-purpose image data.

According to this configuration, development conditions used for creating actually developed image data are set by analyzing either one of the first analysis-purpose image data or the second analysis-purpose image data. Therefore, it is possible to easily set development conditions used in development processing performed by the actual development processing section. The second analysis-purpose image data is created from accompanying image data, which accompanies undeveloped image data, if the accompanying image data is suitable for analysis. Therefore, it is possible to reduce the load (i.e., burden or amount) of arithmetic processing required for creating analysis-purpose image data. On the other hand, the first analysis-purpose image data is created from the undeveloped image data if the accompanying image data accompanying the undeveloped image data is not suitable for analysis. In this manner, analysis for the setting of development conditions is performed with increased reliability.

According to this configuration, the analysis-purpose image data selecting section should determine the precedence on the basis of information on the digital camera that is contained in the image file.

The state of the accompanying image data accompanying the undeveloped image data usually differs from one digital camera to another. For this reason, the selection of the analysis-purpose image data becomes easier by determining the precedence on the basis of information on the digital camera.

According to this configuration, the analysis-purpose image data selecting section should determine the precedence on the basis of the type of the accompanying image data.

Furthermore, the analysis-purpose image data selecting section should set the second analysis-purpose image data higher in precedence than the first analysis-purpose image data if the accompanying image data is black-and-white image data.

A black-and-white image does not have any color information. Accordingly, it is not suitable for the determination of development conditions depending upon a method of determining the development conditions performed by the development condition determining section. Therefore, it is possible to determine the development conditions with increased reliability by setting the second analysis-purpose image data higher in precedence than the first analysis-purpose image data.

According to this configuration, the precedence is determined on the basis of the format of the accompanying image data that accompanies the undeveloped image data. Therefore, the state of the accompanying image data accompanying the undeveloped image data is more precisely reflected in the selection of the analysis-purpose image data. For this reason, the selection of the analysis-purpose image data is made more accurately.

According to this configuration, the development condition determining section should have a selection instruction acquiring section that acquires instructions for selecting the analysis-purpose image data given by a user. The precedence should be determined on the basis of the user instructions acquired by the selection instruction acquiring section.

According to this configuration, the precedence is determined on the basis of the user instructions. Therefore, it is possible to ensure that the actually developed image data is suited to the user's preference.

According to this configuration, the resolution of the first analysis-purpose image data should be the same as the resolution of the second analysis-purpose image data.

If the resolution of the first analysis-purpose image data is set to be the same as the resolution of the second analysis-purpose image data, then the development condition determining section can determine development conditions by means of the same processing regardless of whether the first analysis-purpose image data is analyzed or the second analysis-purpose image data is analyzed. Therefore, it is possible to simplify the configuration of the development condition determining section.

The present invention can be implemented and/or embodied in a variety of modes. As a few non-limiting examples thereof, the invention can be implemented and/or embodied in the form of a development processing apparatus (i.e., developing apparatus), a development processing method (i.e., developing method), an image outputting apparatus provided with the development processing apparatus, and/or an image outputting method utilizing the development processing method. Further non-limiting examples include a computer program that realizes functions made available by these apparatuses and/or methods, and/or a storage medium that stores such a computer program. In addition thereto, the invention can be a data signal that contains the content of the computer program and is transmitted via or in the form of a carrier. The above description is provided as non-limiting enumerating examples for the sole purpose of facilitating the understanding of the invention.

BRIEF DESCRIPTION OF THE DRAWINGS

The invention will be described with reference to the accompanying drawings, wherein like numbers reference like elements.

FIGS. 8A, 8B, and 8C are schematic diagrams that illustrate the formation of a size-reduced image from an original screen-nail image.

FIG. 10 is a flowchart that illustrates one example of the processing flow of final-image-formation development processing that is performed in the step S160.

FIG. 12 is a schematic diagram that illustrates an example of a development content setting screen displayed in step S110a.

FIG. 23 is a schematic diagram that illustrates another example of the development content setting screen displayed in the step S110a.

FIGS. 34A, 34B, 34C, 34D, and 34E are schematic diagrams that illustrate one example of simplified pixel-interpolation processing.

FIGS. 35A, 35B, and 35C are schematic diagrams that illustrate one example of the simplified pixel-interpolation processing performed by means of a method different from that illustrated in FIG. 34 (FIGS. 34A, 34B, 34C, 34D, and 34E).

DESCRIPTION OF EXEMPLARY EMBODIMENTS

With reference to the accompanying drawings, exemplary embodiments of the invention are explained in the following seven sections.

A. Embodiment 1
B. Embodiment 2
C. Embodiment 3
D. Embodiment 4
E. Embodiment 5
F. Embodiment 6
G. Variation Example

A. Embodiment 1

Figure 1:
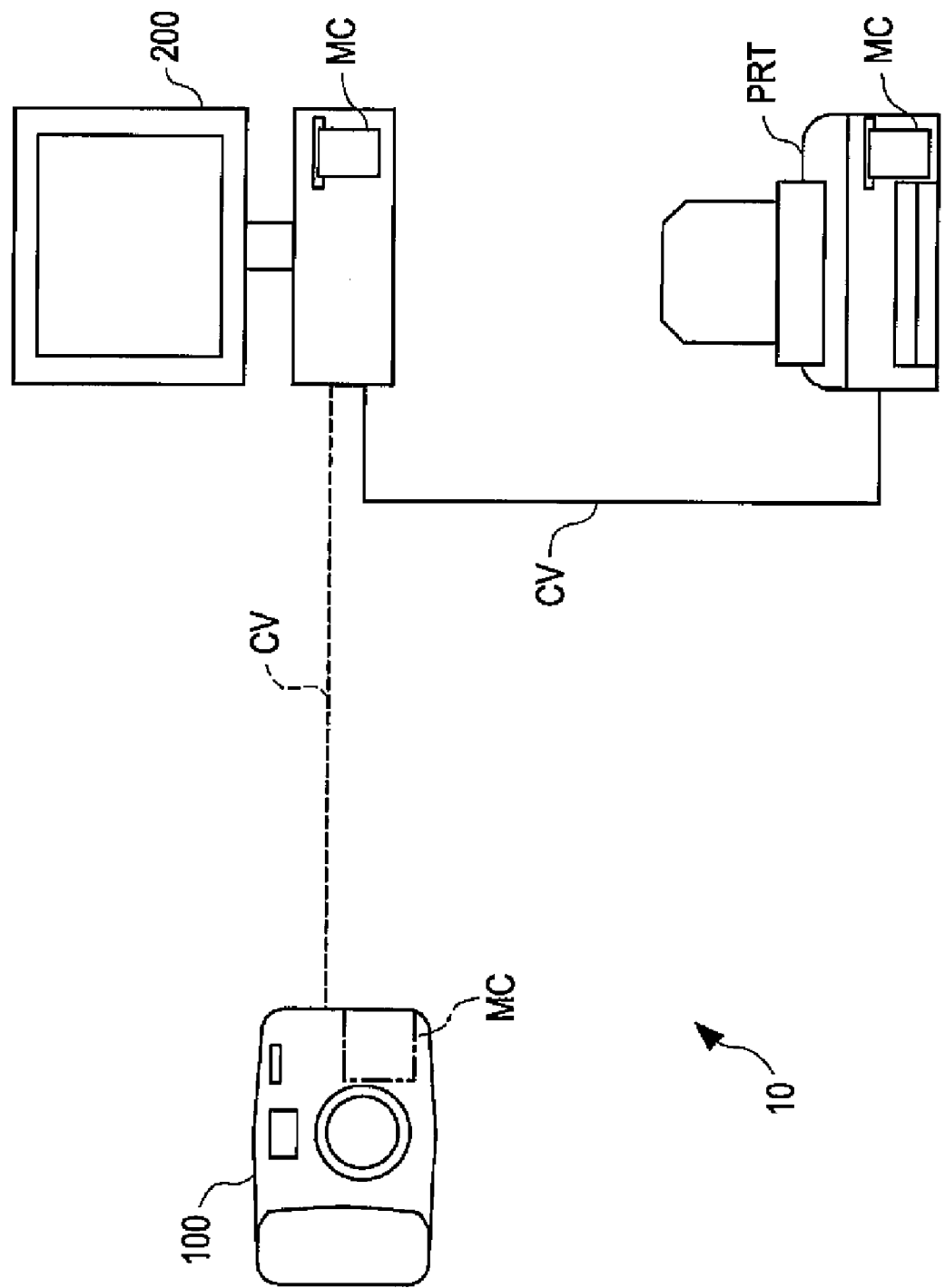
FIG. 1 is a diagram of an image processing system according to one embodiment of the invention.

FIG. 1 is a diagram that schematically illustrates an example of the configuration of an image processing system 10 to which a first embodiment of the invention is applicable. The image processing system 10 includes, though not necessarily limited thereto, a digital still camera 100, a personal computer 200, and a printer PRT. The digital still camera 100 is provided with a memory card slot in which a memory card MC can be inserted. The memory card MC is shown in an alternate long and short dash line in FIG. 1.

The digital still camera 100 creates an image file that conforms to a predetermined format from a photographed image. The created image file is stored in the memory card MC. The personal computer 200 can read out the image file stored in the memory card MC when a user inserts the memory card MC into a memory card slot provided in the personal computer 200. Image data contained in the read-out image file is subjected to image processing performed by the personal computer 200. Thereafter, the printer PRT, which is connected to the personal computer 200 via a printer cable CV, prints out the image-processed image data. Furthermore, a user can insert the memory card MC into the memory card slot of the printer PRT instead of the memory card slot of the personal computer 200 so that the printer PRT can execute direct printing on the basis of the content of the image file stored therein. If the personal computer 200 and the digital still camera 100 are connected to each other via a camera cable CV, it is possible to transfer (i.e., transmit) an image file from the digital still camera 100 to the personal computer 200.

Figure 2:
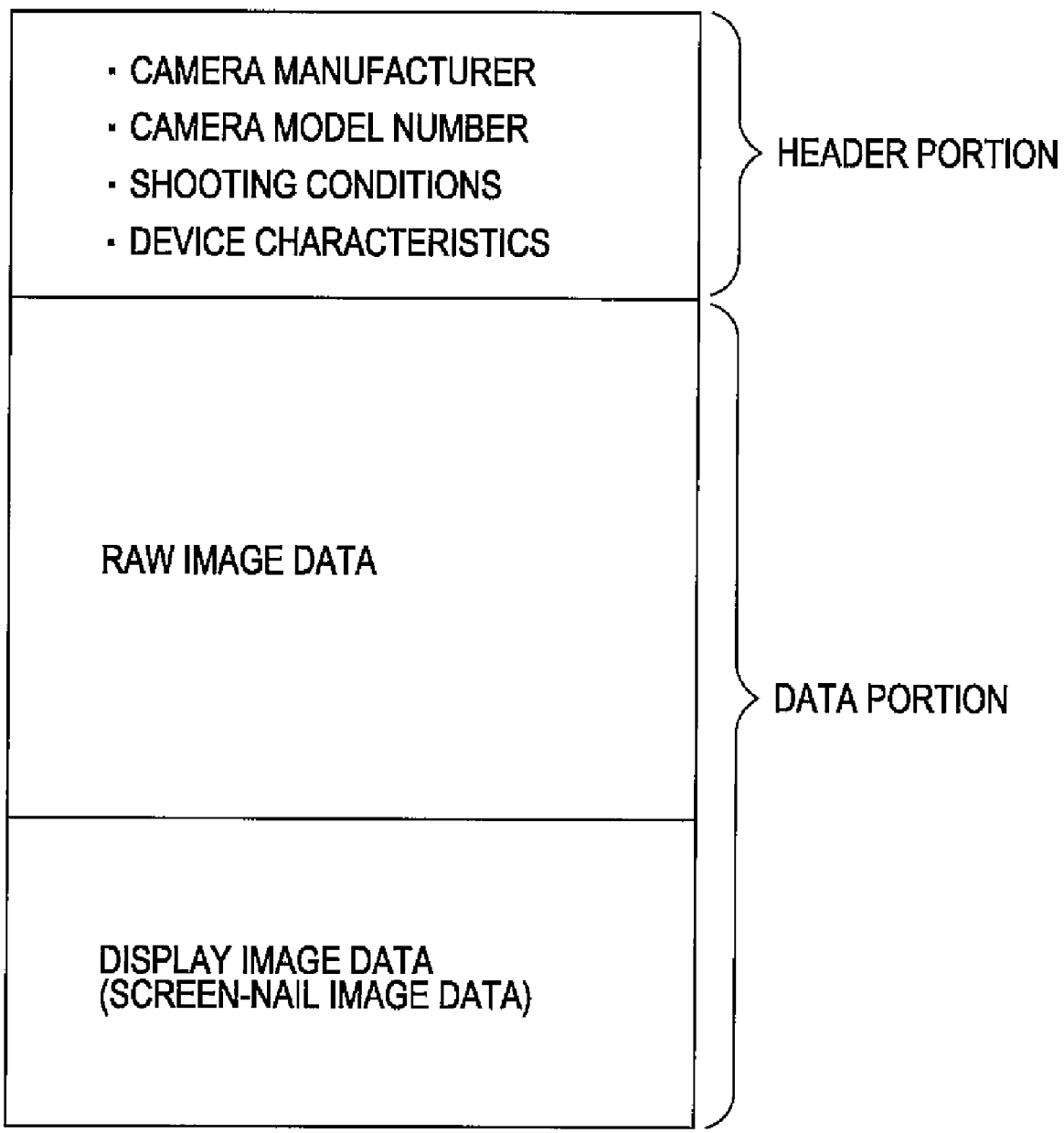
FIG. 2 is a view that illustrates an example of the data format of a RAW image file created by a digital still camera.

FIG. 2 is an explanatory diagram that illustrates an example of the data format of a RAW image file created by the digital still camera 100. A RAW image file is a type of image file created by the digital still camera 100. A RAW image file contains RAW image data that indicates the output value of an image pickup device (e.g., CCD, CMOS, etc.,) provided in the digital still camera 100. A RAW image file is created in a data format similar to Exif (Exchangeable Image File Format). A RAW image file has a header portion and a data portion as illustrated in FIG. 2.

The header portion of a RAW image file contains the description of additional information that includes, but is not limited to, the name of a camera manufacturer that created the RAW image file, the model name/number of the camera that created the RAW image file, shooting conditions, the shooting date and time, and camera characteristics (i.e., device characteristics). The shooting-condition information includes camera conditions that were set at the time of photographing an image such as a shutter speed, an aperture, a white-balance setting value, and scene setting. The camera characteristics information includes various kinds of parameters that indicate the device characteristics of the digital still camera 100. For example, an offset value with respect to a gradation value is one of such variety of parameters. A more detailed explanation of the offset value will be given later.

The data portion of a RAW image file contains RAW image data and display image data created at the time of shooting. The display image data is image data prepared for the purpose of display. The display image data is obtained as a result of developing RAW image data. That is, the display image data is "developed" image data obtained by performing image-formation processing on RAW image data. Herein, the term "developed" is used as the antonym of "undeveloped", where the former indicates that certain image data has already been subjected to development processing whereas the latter indicates that certain image data has not yet been subjected to development processing. In addition, a RAW image data contained in a certain RAW image file represents the same object of shooting (i.e., the same photographed image) as that represented by the display image data contained in the same RAW image file. Both RAW image data and display image data are recorded at the same time as when an object of shooting is photographed. Display image data is used, for example, at the time of displaying a photographed image on a display panel provided on a camera in a rough and speedy manner. Display image data is JPEG image data subjected to development processing performed in a camera. Display image data may have the same number of pixels arrayed in a matrix pattern made up of the same number of rows and columns as that of a RAW image data. Display image data may alternatively have a smaller number of pixels arrayed in a matrix pattern made up of a reduced number of rows and/or columns in comparison with that of RAW image data. Sometimes the size of display image data is reduced so as to be as small as a VGA size (640×480 pixels). Display image data is also called screen-nail image data. Since screen-nail image data is image data accompanying RAW image data, it may be referred to as an "accompanying image data," in the disclosure and appended claims if the context allows. Furthermore, the data format of a RAW image file is different each digital still camera 100 manufacturer, and/or from one model thereof to another.

Figure 3:
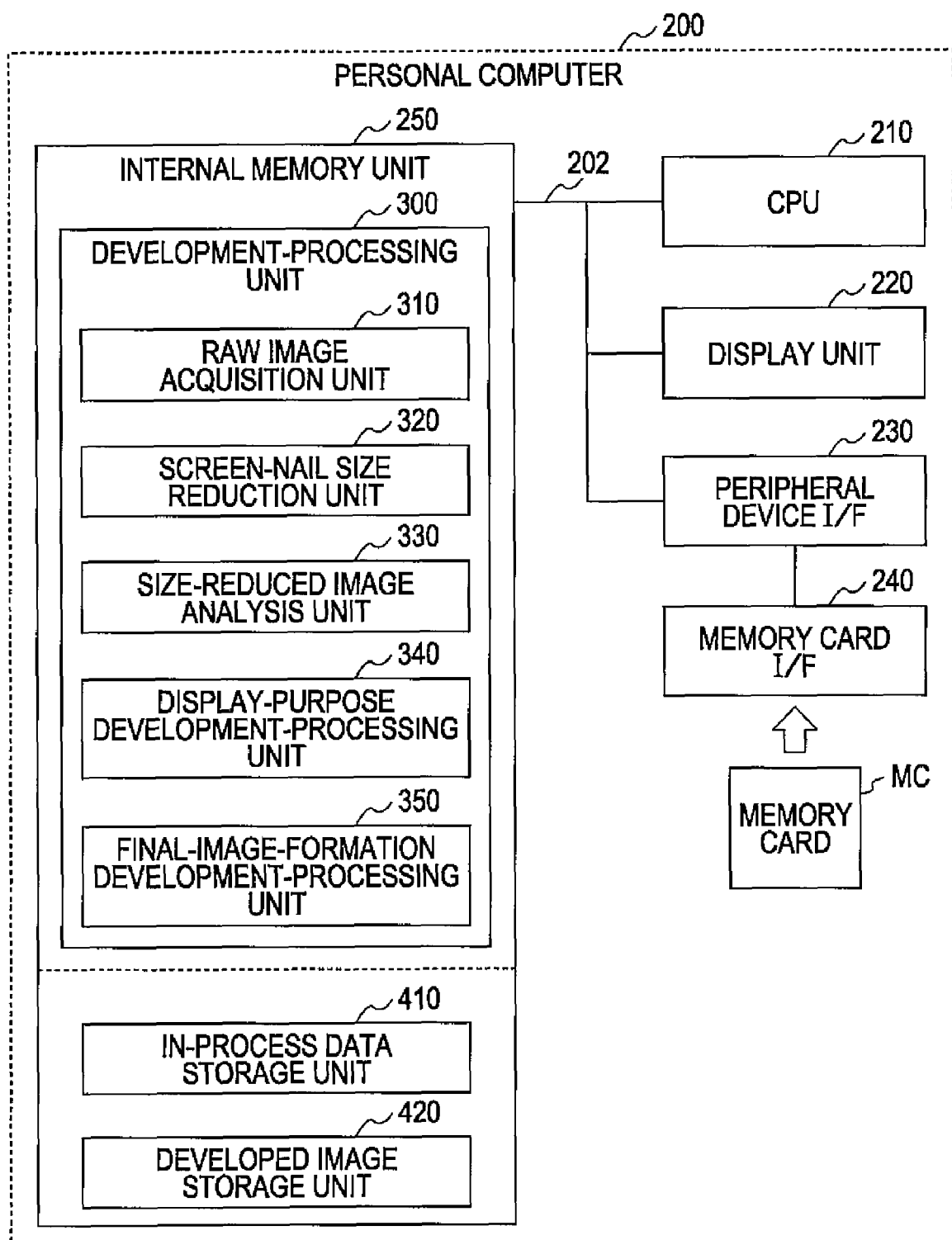
FIG. 3 is a block diagram that illustrates one embodiment of a personal computer of the invention.

FIG. 3 is a block diagram that schematically illustrates one example of the configuration of the personal computer 200 according to a first embodiment of the invention. The personal computer 200 is provided with a central processing unit (CPU) 210, a display unit 220 that displays an image, a peripheral device interface (I/F) 230, a memory card I/F 240, and an internal memory unit 250. The CPU 210, the display unit 220, the peripheral device interface I/F 230, and the internal memory unit 250 are interconnected to one another via a bus 202. With such an interconnection, data transfer (i.e., transmission and reception) between the CPU 210, the display unit 220, the peripheral device interface I/F 230, and the internal memory unit 250 are performed via the bus 202. The memory card I/F 240 is connected to the peripheral device interface I/F 230. Data transfer between the personal computer 200 and the memory card MC inserted in the memory card I/F 240 is provided via the peripheral device interface I/F 230.

The internal memory unit 250 has a development-processing unit (i.e., developing unit) 300. The development-processing unit 300 includes, though not limited thereto, a RAW image acquisition unit 310, a screen-nail size reduction unit 320, a size-reduced image analysis unit 330, a tentative preview display development-processing unit 340, and a final-image-formation development-processing unit 350 (i.e., "non-tentative" development-processing unit) 350. Each of the RAW image acquisition unit 310, the screen-nail size reduction unit 320, the size-reduced image analysis unit 330, the tentative preview display development-processing unit 340, and the final-image-formation development-processing unit 350 is provided as a program module inside the internal memory unit 250. Each of the functions of the development-processing unit 300 is implemented as a result of the execution of the corresponding one of these program modules 310, 320, 330, 340, and 350 built in the development-processing unit 300 by the CPU 210. The development-processing unit 300 has two development-processing functions: a batch development-processing function and an individual development-processing function. In the batch development processing, the development-processing unit 300 performs development processing on a plurality of RAW image data, each of which is contained in the corresponding one of a plurality of RAW image files. In the individual development processing, the development-processing unit 300 performs development processing on a singular (i.e., one) RAW image data contained in the corresponding one RAW image file. In addition to the above-described development-processing unit 300, the internal memory unit 250 is further provided with an in-process data storage unit 410 and a developed image storage unit 420. The in-process data storage unit 410 temporarily stores (in-process) data that is generated during the execution of development processing. The developed image storage unit 420 stores a developed image data, that is, an image data that has already been subjected to development processing.

A variety of input devices such as a keyboard and a computer mouse (not shown), though not limited thereto, are connected to the peripheral device interface I/F 230. The digital still camera 100 and the printer PRT shown in FIG. 1 are also connected to the peripheral device interface I/F 230. A user can provide instructions to the personal computer 200 by manipulating the above-described input devices that are connected to the peripheral device interface I/F 230.

Figure 4:
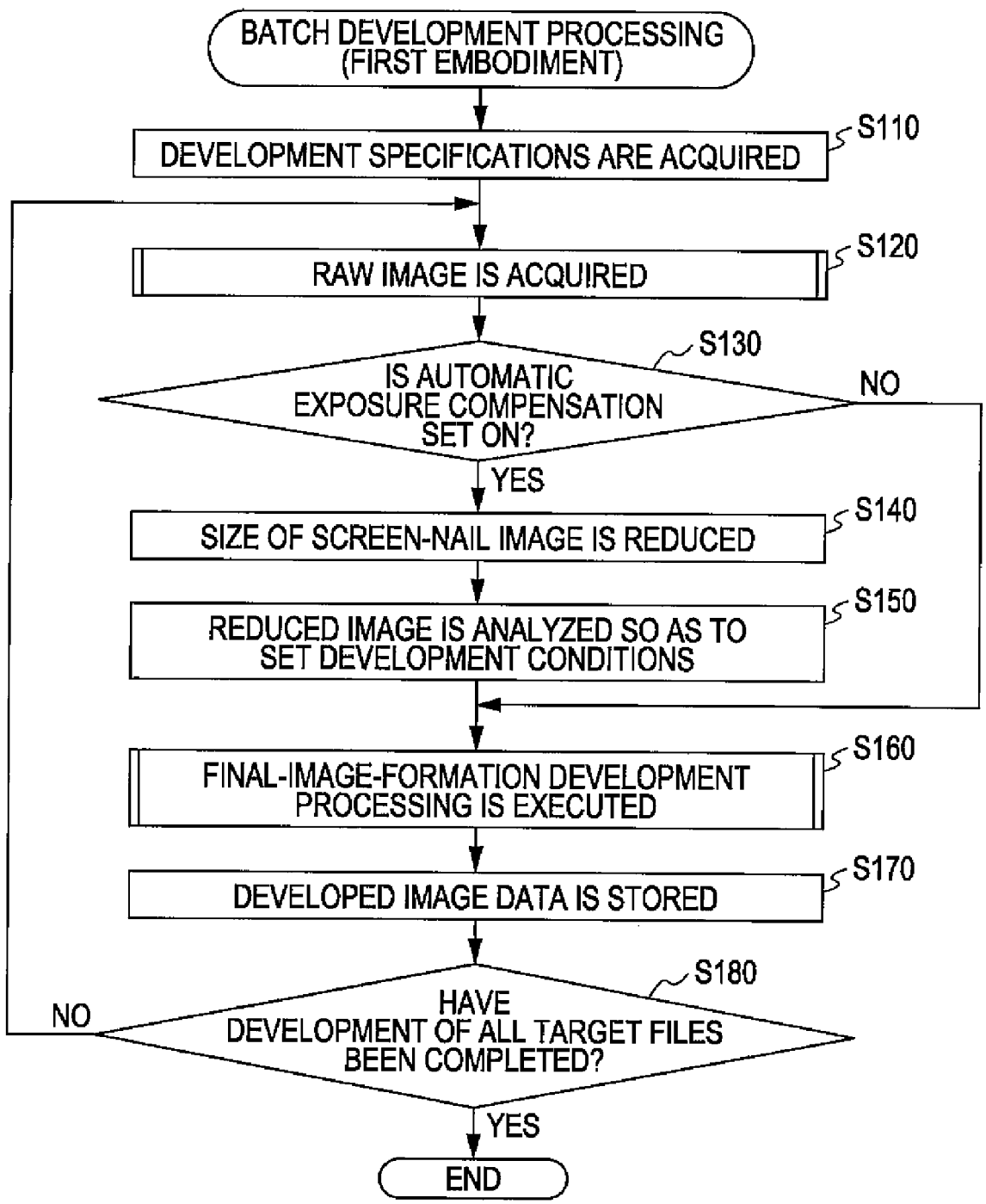
FIG. 4 is a flowchart that illustrates one example of the processing flow of batch development processing in which a development-processing unit performs development processing under batch development conditions that are collectively set for a plurality of RAW image files.

FIG. 4 is a flowchart that illustrates an example of the processing flow of batch development processing in which the development-processing unit 300 performs development processing under batch development conditions that are collectively set for a plurality of RAW image files. The development-processing unit 300 performs the batch development processing described herein. Each of batch development processing described herein and individual development processing to be described later is executed at the time when a user launches a developing application so as to perform development processing on RAW image file(s). Alternatively, each of the hatch development processing and the individual development processing is executed at the time when development processing is instructed in an image-processing application.

In a first step S110, the development-processing unit 300 (refer to FIG. 3) acquires (i.e., receives) an instruction to specify the content of development. In the following description, the specified content of development is referred to as "development specifications" (i.e., development instructions). As the content of development, RAW image files each contain the specified development target RAW image data. In addition, unlike its customary meaning, development conditions also specify the "content" of development. Specifically, the development-processing unit 300 displays a menu screen that prompts a user to input an instruction for specifying development targets on the display unit 220 (refer to FIG. 3). The menu window is referred to as a "development content setting screen" (i.e., a screen presented to a user for specifying or instructing development content). While monitoring the menu screen shown on the display unit 220, the user manipulates a pointing device such as a mouse so as to give instructions on the content of display to the personal computer 200.

Figure 5:
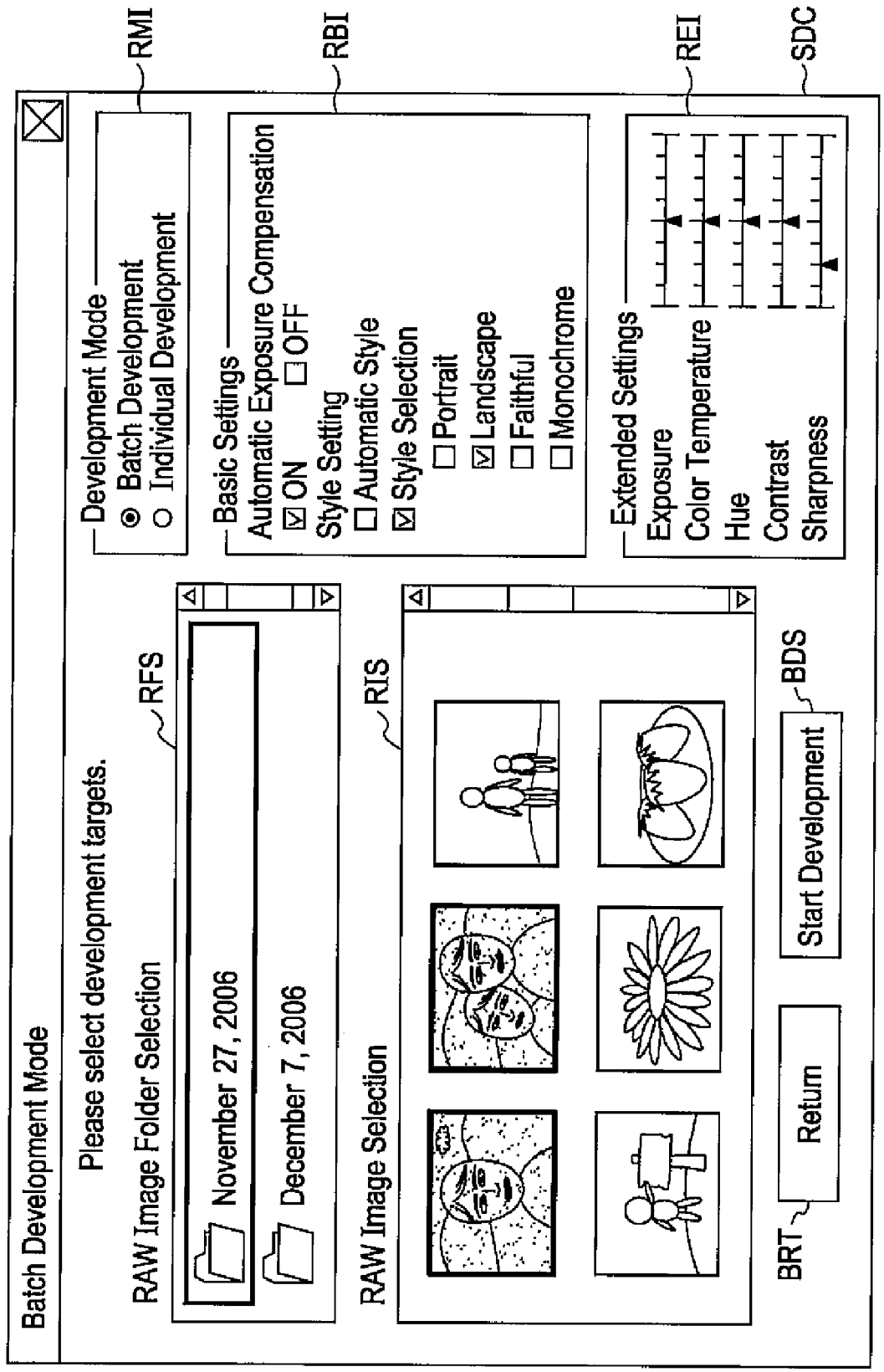
FIG. 5 is a schematic diagram that illustrates one example of a development content setting screen displayed in step S110 of FIG. 4.

FIG. 5 is an explanatory diagram that schematically illustrates an example of a development content setting screen SDC displayed in step S110. As shown therein, the development content setting screen SDC has a folder selection region RFS and an image selection region RIS. The folder selection region RFS is provided so as to allow a user to make selection among a plurality of folders in each of the stored RAW image file(s). The image selection region RIS is provided to allow a user to make selection among a plurality of RAW image files stored in the selected folder. Referring to the example illustrated in FIG. 5, one folder that has a folder name of "Nov. 27, 2006" is selected in the folder selection region RFS. In the image selection region RIS thereof, two RAW image files are selected. If the user presses down a "Start Development" button BDS after making a selection of the development targets as described above, development processing is performed on each of the two RAW image data contained in the corresponding one of these user-selected two RAW image files. As a result, developed image data is created. However, if the user presses down a "return" button BRT, the batch development processing is aborted.

In addition to the above-described folder selection region RFS and the above-described image selection region RIS, the development content setting screen SDC further has development-processing-condition setting regions RMI, RBI, and REI, each of which can be used for instructing (i.e., specifying or setting) development conditions. A user can specify, instruct, or set, development conditions by manipulating a pointing device in each of these development-processing-condition instructing regions RMI, RBI, and REI. Referring to FIG. 5, "batch development" is specified in the mode instruction region RMI, which is a selection area provided to allow a user to specify an operation mode (i.e., development mode) for development processing. If a user selects an "individual development" radio button in the mode instruction region RMI, individual development processing (described in detail later) is executed in place of batch development processing.

In the basic instruction region RBI, a user can specify basic and standard development conditions that are left up to an ordinary user's choice (or a user's ordinary choice) made for development processing. Referring to FIG. 5, among a plurality of setting items available for user's ordinary selection in the basic instruction region RBI, a check is placed in the automatic exposure compensation ON checkbox. In the illustrated example, since the automatic exposure compensation is active in a checkmark state, the parameters of exposure compensation to be performed during the execution of development processing are automatically set. For the setting item of "style", which determines standard parameters other than exposure compensation, "landscape" is chosen. In the extended instruction region REI, a user can specify extended and more sophisticated development conditions in addition to the basic settings made in the basic instruction region RBI described above. A user can make an arbitrary setting for the five setting items of "exposure", "color temperature", "hue", "contrast", and "sharpness" in the extended instruction region REI. A more detailed explanation as to how these extended setting items are configured will be given later. In FIG. 5, the style is set as "landscape" in the basic instruction region RBI. Accordingly, among a plurality of setting items available for user's finer adjustment in the extended instruction region REI, "sharpness" is set at a level that is lower than the center thereof by two increments (i.e., two graduations).

Figure 6:
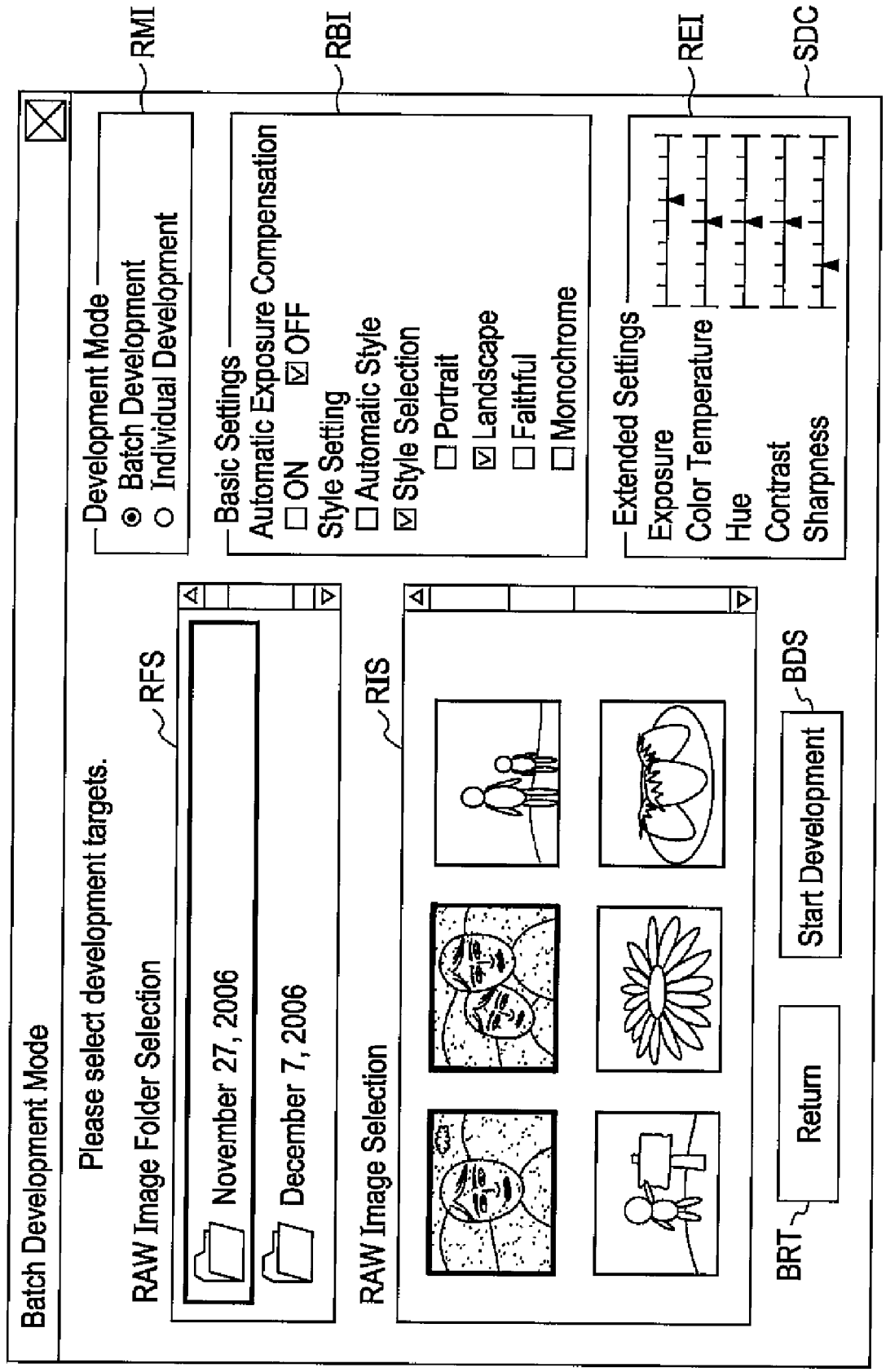
FIG. 6 is a schematic diagram that illustrates another example of the development content setting screen displayed in step S110 of FIG. 4, which shows settings that differ from those of FIG. 5.

FIG. 6 is an explanatory diagram that schematically illustrates another example of the development content setting screen SDC displayed in step S110, which shows settings that differ from those of FIG. 5. The setting of the development content setting screen SDC illustrated in FIG. 6 differs from the setting of the development content setting screen SDC illustrated in FIG. 5 in that, firstly, the "automatic exposure compensation" among a plurality of basic setting items is set OFF in FIG. 6 whereas it is set ON in FIG. 5. Secondly, the "exposure" among a plurality of extended setting items is set higher by one increment in FIG. 6 than that of FIG. 5. If a user presses down the "Start Development" button BDS shown on the development content setting screen SDC illustrated in FIG. 6, development processing is performed on each of the two RAW image data contained in the corresponding one of the user-selected two RAW image files illustrated therein under the development conditions specified in the above-described extended setting items. As a result thereof, developed image data is created.

Figure 7:
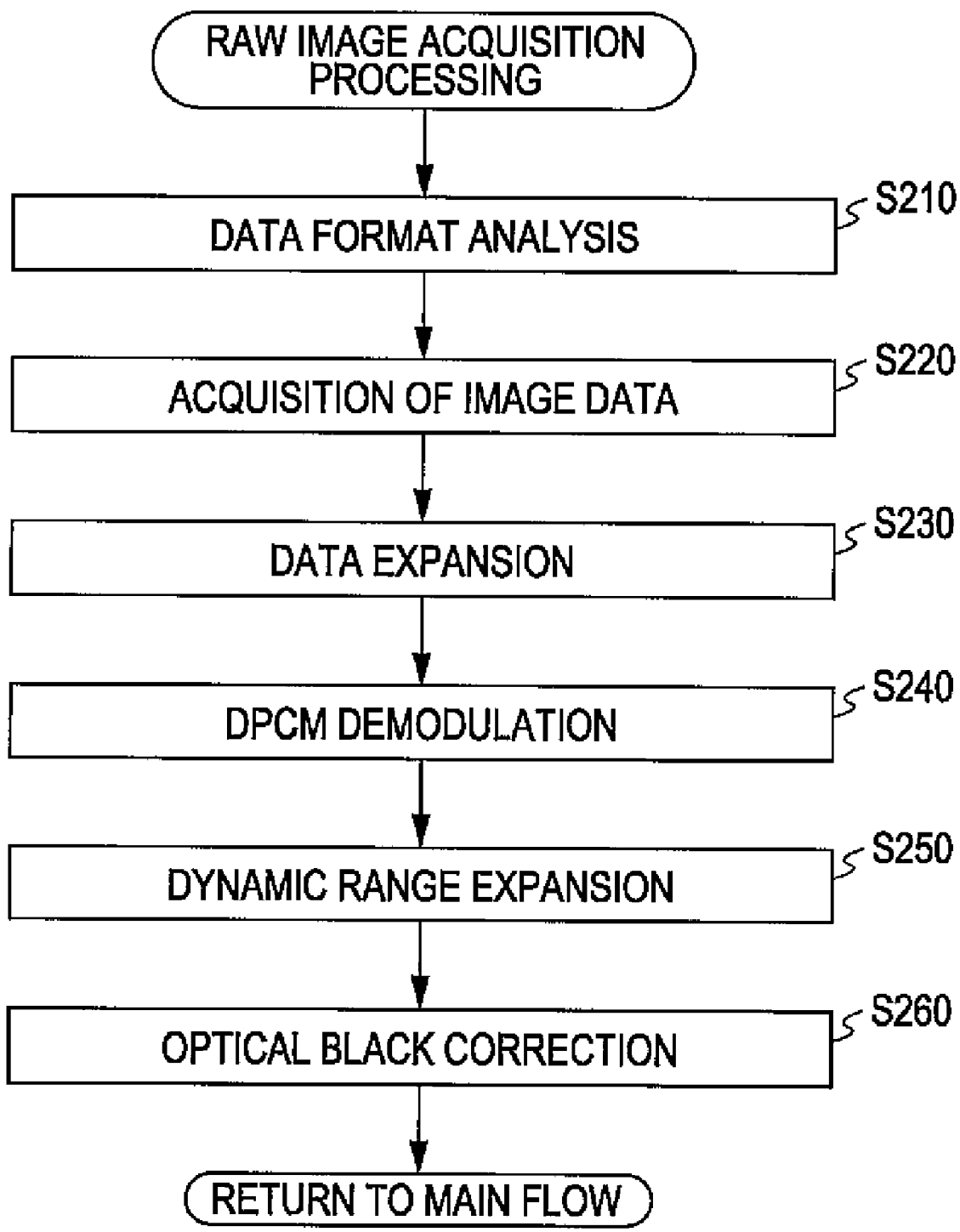
FIG. 7 is a flowchart that illustrates one example of the processing flow of RAW image acquisition processing that is performed in the step S120 of FIG. 4.

Referring back to FIG. 4, step S120, the RAW image acquisition unit 310 acquires RAW image data out of one of RAW image files specified in the preceding step S110. FIG. 7 is a (sub-) flowchart that illustrates an example of the processing flow of RAW image acquisition processing performed in step S120. Moreover, the processing flow shown in FIG. 7 is subject to modification/change depending on the format of the target RAW image file.

In the step S210, the RAW image acquisition unit 310 analyses the data format of the target RAW image file (refer to FIG. 2). As described earlier, the data format of a RAW image file is different from one manufacturer of the digital still camera 100 (refer to FIG. 1) to another, and/or from one model thereof to another. Accordingly, the RAW image acquisition unit 310 identifies the data format of the target RAW image file on the basis of information such as the name of a camera manufacturer who produced the camera and/or information on the model number of the camera, both of which are contained in the header portion thereof. In this way, the RAW image acquisition unit 310 acquires information on the location and/or format of the target RAW image data contained therein. As explained above, in the present embodiment of the invention, it is assumed that the RAW image acquisition unit 310 identifies the data format of the target RAW image file on the basis of information contained in the header portion of the target RAW image file. Furthermore, depending on the type of the target RAW image file, it is possible to identify the data format thereof on the basis of a file extension attached thereto. For example, if a file extension of the target RAW image file reads as EPSN0012.ERF, the data format of the target RAW image file is identified as an E-company data format. In like manner, it is possible to identify the data format of the target RAW image file as an A-company data format if a file extension of the target RAW image file reads as ADSC0125.ARF.

In the next step S220, the RAW image acquisition unit 310 takes the target RAW image data out of the data-format-analyzed RAW image file. Then, the RAW image acquisition unit 310 stores the acquired target RAW image data into the in-process data storage unit 410 (refer to FIG. 3). Thereafter, in the next step S230, data expansion processing, or, in other words, data decompression, is performed on the target RAW image data stored in the in-process data storage unit 410. In most cases, the target RAW image data has been subjected to reversible data compression processing (e.g., Huffman coding) in order to reduce the data size thereof. For this reason, data decompression processing for re-converting the compressed data into original non-compressed one is carried out in step S230. This data re-conversion processing is called data expansion. If the target RAW image data stored in the in-process data storage unit 410 has been compressed by the above-mentioned Huffman coding method, Huffman decoding (i.e., data expansion) processing is carried out thereon by means of Huffman code data.

In the next step S240, the RAW image acquisition unit 310 performs the reverse processing of differential pulse-code modulation (hereafter abbreviated as "DPCM"), which has been performed at the time of creation of the target RAW image data. That is, the RAW image acquisition unit 310 performs differential pulse-code demodulation (abbreviated as "DPCM demodulation" in the accompanying drawing) in step S240. Subsequently, in step S250, the expansion of compressed dynamic range is performed.

In the next step S260, the RAW image acquisition unit 310 performs optical-black correction processing (i.e., optical-black compensation processing). The optical-black correction processing is the subtraction of, from the target RAW image data, an offset value that has been added to the target RAW image data for the purpose of correcting the device characteristics of an image pickup element of a camera, or more specifically, for the purpose of making adjustment or compensation so as to ensure that an optical detection value is zero when the optical intensity of incident light is zero. In the optical-black correction processing, the above-mentioned offset value is subtracted from the gradation value of each of the pixels contained in the target RAW image data. For example, a value that is contained in the header portion of the RAW image file (refer to FIG. 2) may be used as the offset value to be substracted from the gradation value of each of the pixels. In ordinary cases, the output of an image pickup device contains a noise component. Therefore, when an analog signal is converted into a digital signal, a noise component is also subjected to A/D conversion together with a signal component. If the corresponding RAW data value under the conditions of the zero optical intensity of incident light were set as zero, a positive noise would be recorded as a positive value thereof in the RAW data whereas a negative noise would be clamped at zero, which means that the noise is not correctly recorded. As a result, a "smoothed" (filtered) noise component would have a positive value corresponding to the noise amount, which is undesirable. This is provided so as to technically solve such a problem. Specifically, assuming that the corresponding RAW data value under the conditions of the zero optical intensity of incident light is set as, for example, sixty-four (64), a positive noise of +1 is recorded as sixty-five (65), and a negative noise of −1 is recorded as sixty-three (63). By subtracting the offset value of sixty-four therefrom, the values of +1 and −1 are obtained, respectively. Consequently, it is possible to process the RAW data correctly inclusive of noise. If extra sign/code were added for such a negative noise, an extra bit recording width would be necessary, which would undesirably result in increased data amount. Such a problem is solved by means of the above-described technique. Thus, data obtained after the optical-black correction processing is expressed as a signed value, which has a negative value.

In this way, RAW image data that indicates the amount of incident light that entered each of the pixels of the image pickup device of the digital still camera 100 is acquired from the RAW image file. In the following description, the term "RAW image data" refers to data that indicates the amount of incident light that entered each of the pixels of the image pickup device of the digital still camera 100. In addition, since the RAW image data represents an image of a shooting object (i.e., photographic subject) that is formed on the image pickup device of the digital still camera 100, the RAW image data may be simply referred to as a "RAW image" in the following description of this specification as context allows. The RAW image data is usually expressed as data having the gradation value of twelve bits or more for each pixel. Therefore, arithmetic processing performed in the course of development processing is usually carried out in sixteen (16) bits inclusive of a sign in order to avoid any omission of information contained in the RAW image data from occurring. For this reason, unless otherwise specified, it is assumed in the following description that arithmetic processing is performed in 16 bits. Furthermore, a bit length for arithmetic processing is not limited to 16 bits. Any other number of bits is acceptable.

Referring back to FIG. 4, in the step S130 thereof, the development-processing unit 300 (refer to FIG. 3) makes a judgment as to whether the aforementioned automatic exposure compensation is set as active or not. Specifically, the development-processing unit 300 makes a judgment as to whether the automatic exposure compensation is set ON or not by referring to the aforementioned development specifications acquired in the previous step S110. If it is judged that the automatic exposure compensation is set ON, the process goes on to step S140. However, if it is judged that the automatic exposure compensation is not set ON (i.e., set OFF), the process jumps to step S160. In the non-limiting example shown in FIG. 5, the automatic exposure compensation is set ON. Accordingly, it is judged that the automatic exposure compensation is active in step S130. Therefore, the process goes on to step S140. On the other hand, in the non-limiting example shown in FIG. 6, the automatic exposure compensation is set OFF. Accordingly, it is judged that the automatic exposure compensation is inactive in step S130. Therefore, the process jumps to step S160.

In step S140, the screen-nail size reduction unit 320 changes the pixel size of a screen-nail image represented by the aforementioned screen-nail image data (refer to FIG. 2) so as to generate a pixel-size-changed image that has a predetermined image size (i.e., predetermined image resolution). The generated pixel-size-changed image is used in the subsequent image analysis process, which will be described later. In the present embodiment of the invention, it is assumed that an image having a QVGA size (320×240 pixels), is generated as the pixel-size-changed image. Image analysis performed in the next step becomes easier by changing the pixel size of an image into a predetermined resolution in this step regardless of the pre-change resolution of a screen-nail image, irrespective of whether it is high or low. The resolution of the pixel-size-changed image may be any size other than 320×240 pixels. The resolution of the pixel-size-changed image may be any size as long as the changed size is suitable for subsequent image analysis. From the viewpoint of reducing the load (i.e., burden) of arithmetic processing required for the subsequent image analysis, it is preferable to make the size (i.e., resolution) of the pixel-size-changed image as small as possible to the extent that it is sufficient for the subsequent image analysis. If the processing speed is high enough, a screen-nail image may be subjected to image analysis without changing the pixel size. In such a case, the processing of step S150 is performed immediately after the positive decision (YES) made in the step S130 while skipping step S140.

FIGS. 8A, 8B, and 8C are a set of diagrams that schematically illustrates the formation of a pixel-size-changed image from an original screen-nail image. In a non-limiting example illustrated in FIG. 8, the original screen-nail image has an original pixel size of 3008×2000. In the present embodiment of the invention, a pixel-size-changed image having a resultant (i.e., after-processing) pixel size of 320×240 is created from the original screen-nail image having an original pixel size of 3008×2000. In most of the cases, as in the non-limiting example described herein, an original screen-nail image has a pixel size that is larger than that of a pixel-size-changed image. In other words, an original screen-nail image has a resolution that is higher than that of a pixel-size-changed image. Therefore, the pixel size (i.e., resolution) of an original screen-nail image is reduced so as to create a pixel-size-changed image. In view of the foregoing, the pixel-size-changed image is referred to as a reduced image (or size-reduced image) in the following description. The size-reduced image obtained as a result of pixel-size change processing has a pixel size that conforms to an aspect ratio of 4:3. In order to adjust the pixel size of the original screen-nail image shown in FIG. 8A into this aspect ratio, an area having a horizontal size of 172 pixels, which is counted from each of the left edge and right edge of the original screen-nail image in an inward direction, is removed from each of the left-edge region and the right-edge region. This means that the horizontal 344 pixels in total of margin areas are removed from the original screen-nail image. In like manner, an area having a vertical size of one pixel, which is counted from each of the top edge and bottom edge of the original screen-nail image in an inward direction, is removed from each of the top-edge region and the bottom-edge region. Therefore, the vertical two pixels in total of margin areas are removed from the original screen-nail image. As a result, the margin-cut screen-nail image having a pixel size of 2664×1998 is created as shown in FIG. 8B. Next, the margin-cut screen-nail image having a pixel size of 2664×1998 is scaled down by means of a reduction factor of 1/8.325. As a result, the reduced image having the predetermined pixel size of 320×240 is created. The scaling down (i.e., pixel size reduction) of an image is performed by, for example, a bi-linear method, though not necessarily limited thereto. Moreover, a simple pixel-skipping technique that "decimates" (i.e., skips) some pixels so as to reduce the size of an original image may be used in place of the bi-linear method. From the viewpoint of avoiding or reducing the occurrence of an aliasing noise (i.e., folding noise), it is preferable to suppress a high-frequency component of a spatial frequency by means of a low-pass filter when scaling the pixel size of an image down.

If the screen-nail image data is JPEG-format data, it is possible to scale down the screen-nail image by generating a block of a smaller number of pixels such as a block of 5×5 pixels, a block of 4×4 pixels, or a block of 3×3 pixels, though not limited thereto, in place of generating a block of 8×8 pixels in the course of data expansion processing of the JPEG data.

If the number of pixels of an original screen-nail image differs from the above-described example, the cut size of margin areas and a reduction factor are changed accordingly so as to create a reduced image having 320×240 pixels. For example, if the original screen-nail image has an original pixel size of 1504×1000, an area having a horizontal size of 86 pixels, which is counted from each of the left edge and right edge of the original screen-nail image in an inward direction, is removed from each of the left-edge region and the right-edge region. Thus, the horizontal 172 pixels in total of margin areas are removed from the original screen-nail image. In like manner, for the original screen-nail image that has an original pixel size of 1504×1000, an area having a vertical size of one pixel is removed from the bottom-edge region thereof only. Then, the margin-cut screen-nail image (which has a pixel size of 1332×999) is scaled down by means of a reduction factor of 1/4.1625. As a result, the reduced image having the predetermined pixel size of 320×240 is created. As another example, if the original screen-nail image has an original pixel size of 640×424, an area having a horizontal size of 38 pixels, which is counted from each of the left edge and right edge of the original screen-nail image in an inward direction, is removed from each of the left-edge region and the right-edge region. Thus, the horizontal 76 pixels in total of margin areas are removed from the original screen-nail image. In like manner, for the original screen-nail image that has an original pixel size of 640×424, an area having a vertical size of one pixel is removed from the bottom-edge region thereof only. Then, the margin-cut screen-nail image (which has a pixel size of 564×423) is scaled down by means of a reduction factor of 1×1.7625. As a result thereof, the reduced image having the predetermined pixel size of 320×240 is created. Considering that the generation of a reduced image is performed in this step with an aim to analyze a resultant reduced image in the subsequent step, it is preferable to scale down the entire region of an original image. For this reason, it is preferable to cut margin areas out of an original image in a symmetrical cut pattern both for left/right edges and top/bottom edges as explained above so that the center area of the original image remains without being removed after the margin-cut process. Moreover, it is preferable that the remaining center area of the original image should have a considerably large pixel size. If the margin-cut processing is applied to an original image having an aspect ratio of 3:2 so as to form a reduced image having an aspect ratio of 4:3, the margin areas of the original image are removed in a symmetrical cut pattern from each of the left-edge region and the right-edge region thereof.

Referring back to FIG. 4, in step S150, the reduced image analysis unit 330 analyzes a reduced image that was created in the preceding step S140. Then, on the basis of the result of analysis of the reduced image, the reduced image analysis unit 330 sets the aforementioned development conditions. Specifically, the reduced image analysis unit 330 performs histogram analysis on the reduced image. Then, on the basis of the result of the histogram analysis, the reduced image analysis unit 330 calculates an exposure compensation coefficient that is to be multiplied by each of the gradation values of the red color component, the green color component, and the blue color component, that is, the RGB values of the RAW image.

Figure 9A:
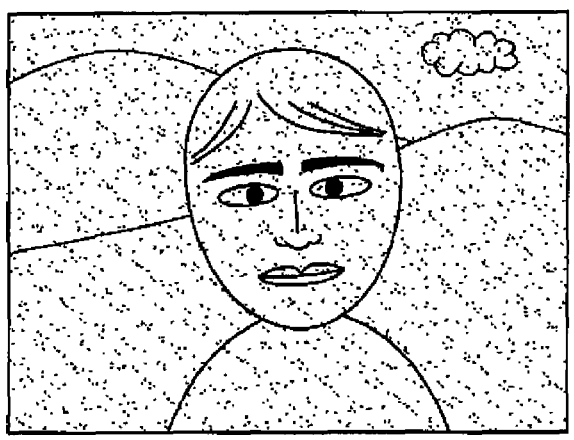
FIGS. 9A, 9B, 9C, and 9D are schematic diagrams that illustrate one example of histogram analysis performed by a reduced image analysis unit in the step S150.
Figure 9B:
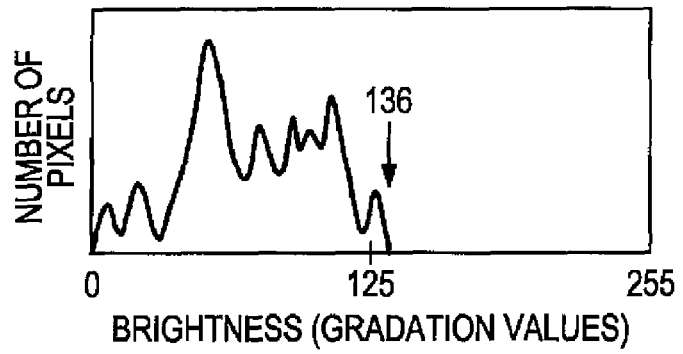
Figure 9C:
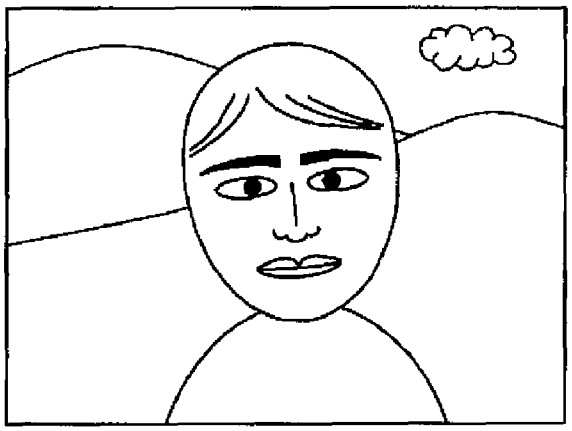

FIGS. 9A, 9B, 9C, and 9D are a set of diagrams that schematically illustrates an example of histogram analysis performed by the reduced image analysis unit 330 in step S150. FIG. 9A illustrates an example of an image for which exposure is at an insufficient level, which is referred to as an "under-exposure" image in the following description, whereas FIG. 9C illustrates an example of an image for which exposure is at a sufficient level, which is referred to as an "appropriate-exposure" image in the following description. FIG. 9B is a graph that shows the result of histogram analysis performed on the under-exposure image illustrated in FIG.

Figure 9D:
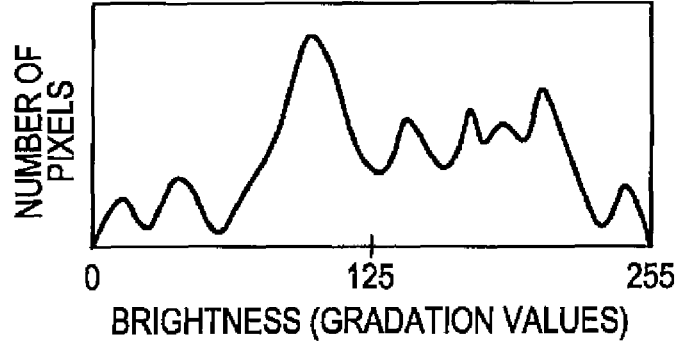

9A. FIG. 9D is a graph that shows the result of histogram analysis performed on the appropriate-exposure image illustrated in FIG. 9C. The horizontal axis of each of the graphs shown in FIG. 9B, 9D represents brightness (i.e., luminosity). The horizontal axis of each of the graphs that is shown in FIG. 9B, 9D represents gradation values. On the other hand, the vertical axis of each of the graphs that is shown in FIG. 9B, 9D represents the number of pixels.

As illustrated in FIG. 9B, the number of pixels that belong to a high-brightness region is generally small in an under-exposure image. In the non-limiting example illustrated in FIG. 9B, the distribution of pixels is localized in the low-luminosity region (0-136), which is a part of the entire range of brightness (0-255). As almost all of the pixels are distributed in the low-brightness region (0-136), the number of pixels that are distributed in the high-luminosity region (137-255) is almost zero. In contrast, as illustrated in FIG. 9D, in the case of an image having an appropriate exposure, pixels are distributed throughout the entire range of brightness (0-255). As understood from these figures, one can convert an under-exposure image illustrated in FIG. 9A into an appropriate-exposure image illustrated in FIG. 9C by performing exposure compensation so as to convert, for example, the luminosity value of 136 into the luminosity value of 255, where such a conversion is applied to all of the pre-exposure-compensation luminosity values so as to spread the shape of the histogram illustrated in FIG. 9B into the histogram illustrated in FIG. 9D, the latter of which is delocalized to span the entire range of brightness (i.e., luminosity, gradation values). The shape of the target histogram can be defined as the range of distribution of pixels.

A screen-nail image is usually subjected to gamma correction performed on a RAW image. Specifically, the luminosity Y of a screen-nail image is expressed in the following mathematical formula (1) by means of the luminosity X of a RAW image.

$$Y = X^{1/\gamma}$$

Therefore, a value calculated by the following mathematical formula (2) is set as a compensation coefficient A that should be multiplied by the luminosity of a RAW image in order to convert the under-exposure image illustrated in FIG. 9A into the appropriate-exposure image illustrated in FIG. 9C.

$$A = (255/136)^{\gamma} \quad (2)$$

In usual gamma correction, the value γ is set at 2.2. Accordingly, the compensation coefficient A that should be multiplied by the luminosity of the under-exposure RAW image shown in FIG. 9A is calculated as approximately 4.0.

In the present embodiment of the invention, an exposure compensation coefficient is calculated from the result of histogram analysis. However, the scope of the invention is not limited to such an example. That is, the exposure compensation coefficient may be calculated by means of other alternative methods. For example, if the reduced image analysis unit 330 has a human face detection function, it is possible to calculate an exposure compensation coefficient on the basis of the luminosity (i.e., brightness) of a human face detected from a reduced image. Specifically, the reduced image analysis unit 330 evaluates the luminosity of an area that has hue (i.e., color phase) and saturation (i.e., chroma) corresponding to the flesh color of a face region in the neighborhood of each of a nose, a mouth, and eyes of the detected human face. The exposure compensation coefficient is calculated as described above while ensuring that the luminosity of the evaluated area falls within a range of 180-200, which is a preferable range of the luminosity of the flesh color. It should be noted that the calculation of an exposure compensation coefficient in such a manner that the luminosity of the evaluated area falls within a range of 180-200 is a technical equivalent of the adjustment of the flesh color into the hue range of the ideal flesh color while ensuring the luminosity range of 180-200. Furthermore, adjustment may also be made for hue and saturation.

Referring back to FIG. 4, in step S160, the final-image-formation development-processing unit (i.e., non-tentative development-processing unit) 350 performs development processing on the basis of the development conditions that were acquired in the previous step S110 and the development conditions that were set in the preceding step S150. FIG. 10 is a flowchart that illustrates an example of the processing flow of final-image-formation development processing performed in the step S160. Herein, the term "final-image-formation development processing" means a non-limiting specific concept of actual development processing that is performed not for the purpose of tentative display only.

In the step S302, the final-image-formation development-processing unit 350 performs gain adjustment (i.e., pre-gain processing). Specifically, the final-image-formation development-processing unit 350 multiplies the pixel values (i.e., RGB values) of each of the pixels that make up the RAW image by a coefficient (i.e., pre-gain set value) set in accordance with the device characteristics of the image pickup element of the digital still camera 100. As the pre-gain set value, a value that is stored in the header portion of the RAW image file (refer to FIG. 2) is used. In most cases, the multiplication of the pre-gain set value is performed for red (R) pixels and green (G) pixels only.

In the step S304, the final-image-formation development-processing unit 350 performs pixel-interpolation processing for printing (i.e., de-mosaic processing). The pixel-interpolation processing is performed so as to create "blank-filled" data by interpolating color-component information that is missing due to the array of a plurality of sensor elements that is provided in the image pickup device of the digital still camera 100 (refer to FIG. 1). In the configuration of an image pickup device that has an RGB primary-color filter attached thereto, the color filter provided on the sensor elements usually has an "RGB-checkered" pattern. Such a checkered pattern is referred to as a Bayer array pattern. Therefore, the pixel of a RAW image that corresponds to each of the plurality of sensor elements of an image pickup device has color information that corresponds to only one color of R, G, or B. For example, if a certain pixel has an R color, color information on G and B at the same position is missing. In the pixel-interpolation processing, such missing color information is obtained by means of predictive interpolation on the basis of known information on the colors of other pixels arrayed in the neighborhood thereof. In the predictive interpolation, the direction of the edge of an image is detected. Then, pixel interpolation is performed along the edge of the image. In this manner, it is possible to avoid any degradation in the quality of an image attributable to errors, coloration, or the like that could occur at the time of interpolation.

In step S306, the final-image-formation development-processing unit 350 performs white balance adjustment. The white-balance adjustment is performed as follows: the final-image-formation development-processing unit 350 multiplies the gradation values of R, G, and B of each of pixels that make up the RAW image (in the following description, each gradation value may be referred to as an R value, G value, and B value) by a coefficient that is set for each target white balance. Specifically, the R and B values of each of the pixels that make up the RAW image are multiplied by coefficients Ar and Ab, respectively. These coefficients Ar and Ab are determined on the basis of the setting of white balance that is described in the header portion of the RAW image file. Alternatively, these coefficients Ar and Ab are determined on the basis of the setting of "color temperature" configured in the development content setting screen SDC (refer to FIGS. 5 and 6). Furthermore, these coefficients Ar and Ab may be calculated from the result of image analysis.

In step S308, the final-image-formation development-processing unit 350 performs exposure compensation (i.e., exposure correction). The exposure compensation is performed as a result of the multiplication of each of the R value, G value, and B value of each of pixels that make up the RAW image by the same single exposure compensation coefficient Ga. The multiplication of each of the R value, G value, and B value of each of pixels that make up the RAW image by the same single exposure compensation coefficient Ga is technically equivalent to the increasing/decreasing of the amount of incident light that enters the image pickup device of the digital still camera 100. Therefore, it is possible to obtain, by performing the above-described exposure compensation, the same advantageous effects as those obtained by changing the amount of exposure at the time of shooting performed by the digital still camera 100. The exposure compensation coefficient Ga is determined by performing the histogram analysis of a reduced image, if the "automatic exposure compensation" setting item is set ON in the development content setting screen SDC (refer to FIGS. 5 and 6). However, if the automatic exposure compensation setting item is set OFF in the development content setting screen SDC, the exposure compensation coefficient Ga is determined in accordance with the state of the "exposure", which is one of the aforementioned extended setting items.

In the step S310, the final-image-formation development-processing unit 350 performs color reproduction processing. The spectral sensitivity characteristics (i.e., spectral-response characteristics) of an image pickup device is usually different from that of a human eye. For this reason, a color represented by the R, G, and B values of a RAW image differs from a color that is visually perceived by human eyes. Therefore, in this color reproduction step, the final-image-formation development-processing unit 350 adjusts the R, G, and B values of a RAW image in consideration of the visual sensitivity behavior of a human eye, so as to meet the visibility characteristics. In this manner, the final-image-formation development-processing unit 350 reproduces a faithful and correct color. The color reproduction processing is performed as a result of the multiplication of a three-dimensional vector, which is made up of the R value, the G value, and the B value as its components, by a matrix of 3×3 having a compensation coefficient as its element (i.e., 3×3 matrix operation). The compensation coefficient varies from one camera model to another. Therefore, the camera model is identified as an analysis result of the file format of a RAW image file. Then, a correction coefficient that was individually preset for each camera model is used for color reproduction processing.

In step S312, the final-image-formation development-processing unit 350 performs hue correction processing (i.e., color-phase compensation processing). As done in the preceding color reproduction step, hue correction is also done by means of 3×3 matrix operation. Each element of the 3×3 matrix used for hue correction is set on the basis of the rotation angle of a target hue. The rotation angle of hue is determined on the basis of the setting of "hue" in the development content setting screen SDC (refer to FIGS. 5 and 6).

In the step S314, the final-image-formation development-processing unit 350 performs tone compensation processing.

In this tone compensation processing, the final-image-formation development-processing unit 350 corrects the gradation values of a RAW image by referring to a tone curve, which represents a relationship between input gradation values and output gradation values. The tone curve is determined on the basis of the setting of "style" in the development content setting screen SDC (refer to FIGS. 5 and 6). If the default setting of "contrast", which is one of the extended setting items, has been changed, the tone curve is determined on the basis of the setting of the user-configured contrast.

In step S316, the final-image-formation development-processing unit 350 performs gradation correction (gamma correction) in order to correct gradation characteristics. As a gamma value (γ) used for gamma correction, a value that corresponds to the type of an image data that will be obtained after development is used. Therefore, through gamma correction processing, the gradation characteristics of a RAW image are corrected into one that correspond to the type of an image data that will be obtained after development.

In step S318, the final-image-formation development-processing unit 350 performs color conversion processing. In the color conversion processing, the R, G, and B values of a RAW image, which is a set of color information expressed in an RGB space, are converted into color component values that are expressed in a color space used in a developed image (i.e., YCbCr space). As done in the aforementioned color reproduction processing (step S310) and hue correction processing (step S312), the color conversion processing is also performed by means of 3×3 matrix operation.

In the step S320, the final-image-formation development-processing unit 350 performs noise rejection (i.e., denoising) processing. The noise rejection processing is performed in order to remove any noise component that is contained in an image, thereby creating a clear image. The noise rejection processing can be performed by means of a Gaussian filter, though not necessarily limited thereto.

In step S322, the final-image-formation development-processing unit 350 performs sharpness adjustment processing. The sharpness adjustment processing is performed in order to correct any blurred contour of an image. Herein, the term sharpness adjustment processing means edge enhancement. The outline of an image could be blurred due to the effect of an optical low-pass filter that is provided in an image pickup device. This processing sharpens such a blurred edge of an image. Note that the denoising processing of the preceding step S320 and the sharpness adjustment processing of this step S322 may be performed before the tone compensation processing of step S314.

Through the series of final-image-formation development processing described above, the final-image-formation development-processing unit 350 creates a developed image from a RAW image. Then, the final-image-formation development-processing unit 350 further creates a JPEG-format developed image data (e.g., print image data, which is image data created for the purpose of printing) from the created after-development image (i.e., developed image). In a case where a JPEG-formatted image data is created as a developed image data as described above, 16-bit data used in the arithmetic processing performed in the course of the final-image-formation development processing is converted into 8-bit data at the time of creation of the developed image data. The data format of the development image data is not limited to the JPEG format. For example, the data format of the development image data may be any other standard image-data format such as TIFF or BMP, though not limited thereto. After the generation of developed image data, the final-image-formation development processing illustrated in FIG. 10 is finished. Then, the process returns to the batch development processing shown in FIG. 4. In step S170 shown in FIG. 4, the developed image data that has been created through the above-described final-image-formation development processing is stored into the developed image storage unit 420 (refer to FIG. 3).

In step S180, the development-processing unit 300 (refer to FIG. 3) makes a judgment as to whether all of the RAW image files that are specified as development targets (i.e., target files) have already been developed or not. If it is judged that all of the target files have already been developed, the batch development processing ends. However, if it is judged that all of the target files have not yet been developed, or in other words, if it is judged that there is any target file(s) that remains to be undeveloped, the process returns to the previous step S110. In the latter case (S180: NO), steps S110-S180 are repeated until the development of all of the RAW image files that are specified as development targets have been completed.

Figure 11:
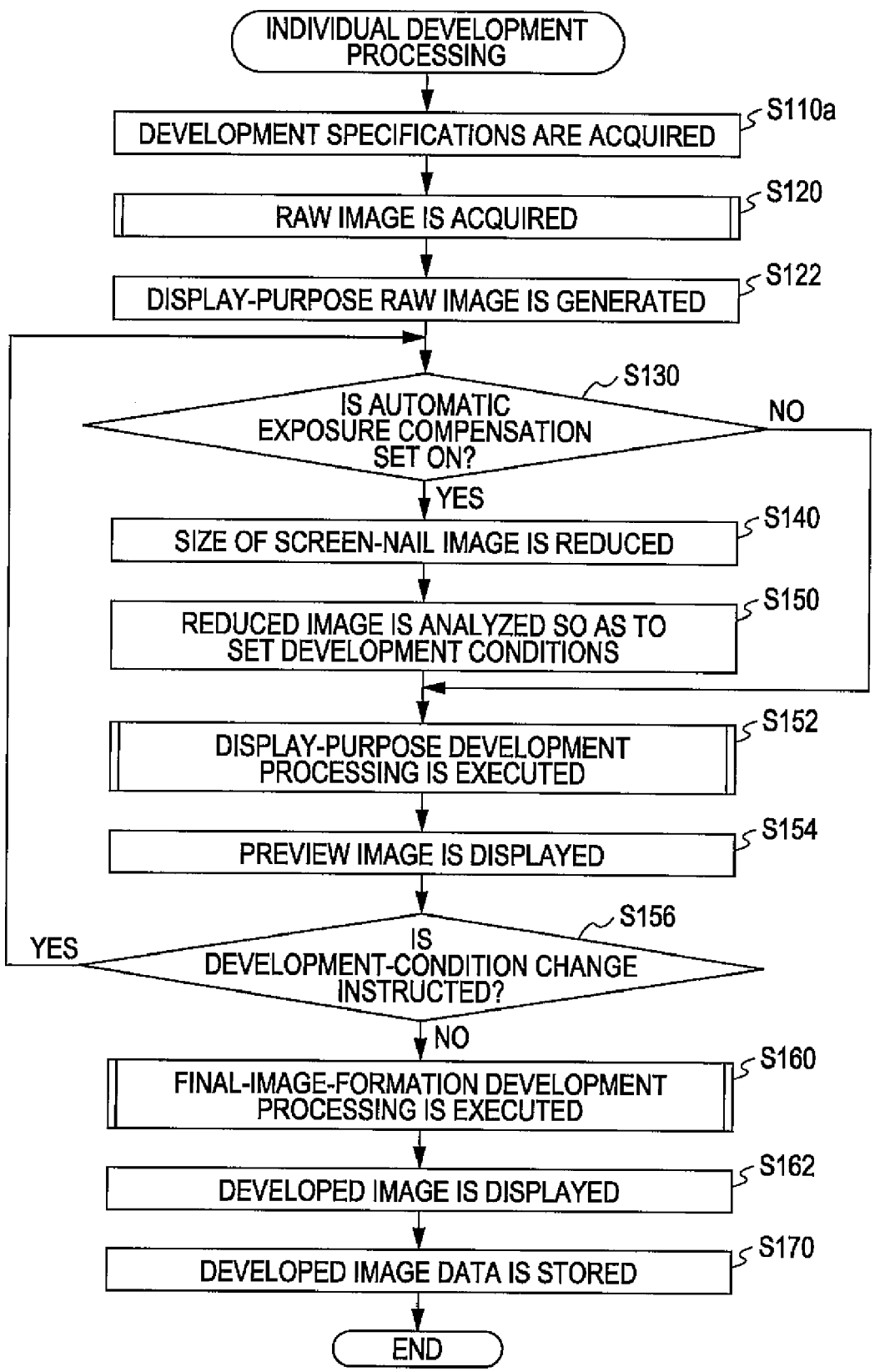
FIG. 11 is a flowchart that illustrates one example of the processing flow of individual development processing in which the development-processing unit performs development processing under individual development conditions that are separately set for each one RAW image file.

FIG. 11 is a flowchart that illustrates an example of the processing flow of individual development processing in which the development-processing unit 300 performs development processing under individual development conditions that are separately set for each RAW image file. The processing flow of the individual development processing illustrated in FIG. 11 differs from that of the batch development processing illustrated in FIG. 4 in the following points: step S110 of the batch development processing is replaced by step S110a in the individual development processing; step S122 is interposed between the step S120 and the step S130 in the individual development processing; steps S152, S154, and S156 are interposed between step S150 and step S160 in the individual development processing; step S162 is interposed between step S160 and step S170 in the individual development processing; finally, step S180 of the batch development processing is omitted in the individual development processing. Except for the above-described differences, the processing flow of the individual development processing illustrated in FIG. 11 is the same as that of the batch development processing illustrated in FIG. 4.

Figure 12:
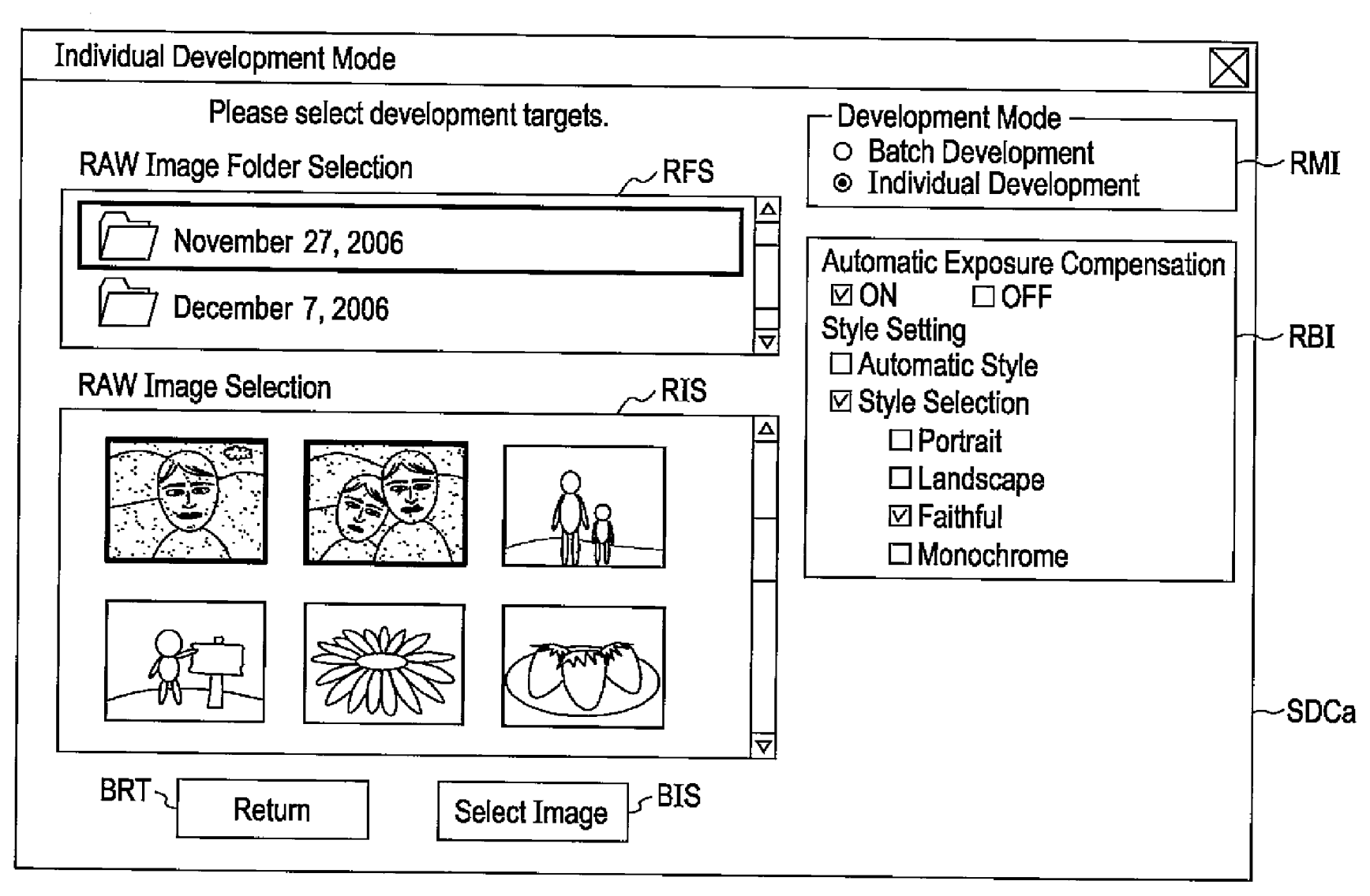

As in the above-explained step S110 of the batch development processing illustrated in FIG. 4, the development-processing unit 300 (refer to FIG. 3) acquires development specifications such as an instruction that specifies the content of development in the step S110a. FIG. 12 is an explanatory diagram that schematically illustrates an example of a development content setting screen SDCa that is displayed in step S110a. The development content setting screen SDCa displayed in the individual development processing shown in FIG. 12 differs from the development content setting screen SDC displayed in the batch development processing (refer to FIGS. 5 and 6) in the following points: the extended instruction region REI that is provided in the development content setting screen SDC displayed in the batch development processing is omitted in the development content setting screen SDCa displayed in the individual development processing; the "Start Development" button BDS provided in the development content setting screen SDC displayed in the batch development processing is replaced by a "Select Image" button BIS in the development content setting screen SDCa displayed in the individual development processing. As illustrated in FIG. 12, one RAW image file that is the target of the individual development processing is selected in the image selection region RIS of the development content setting screen SDCa. If a user presses down the "Select Image" button (i.e., button for validating the selection or making the selection effective) BIS after selecting a certain RAW image file, the selected RAW image file is specified as the development target. Furthermore, the conditions set on the development content setting screen SDCa are specified as the development conditions. In the non-limiting example illustrated in FIG. 12, the automatic exposure compensation is set ON, whereas the style is set as "faithful". Under the faithful style setting, standard development conditions are applied to development processing.

In step S122, the tentative preview display development-processing unit 340 (refer to FIG. 3) generates a display RAW image (hereafter referred to as "display-purpose RAW image") from the RAW image data that was acquired in the preceding step S120 in order to display the result of development on the display unit 220. The display-purpose RAW image is created as a result of the application of pre-gain processing and pixel-interpolation processing on the acquired RAW image. The created display-purpose RAW image is stored into the in-process data storage unit 410 (refer to FIG. 3). The formation of the display-purpose RAW image performed in this step S122 (e.g., display-run image formation) does not have to follow the same procedure as that of the aforementioned final-image-formation development processing performed in the step S160 (e.g., print-run development processing). Generally, a display-purpose RAW image is usually created as a tentative image that is restrictively used only for display. Therefore, it is quite satisfactory that the display-purpose RAW image has a lower picture quality (i.e., resolution) than that of an actually developed image (which is a generic concept of a developed image that is obtained after a final-image-formation process). For example, it is sufficient that the display-purpose RAW image has a pixel size ranging from a VGA size (i.e., 640×480 pixels) to an XGA size (i.e., 1024×768 pixels). Since a development target RAW image has, in most of cases, six million pixels or ten million pixels or so, a display-purpose RAW image is scaled down from the original image with a high reduction factor. For this reason, in place of the aforementioned sophisticated high-quality pixel interpolation (step S304) performed in the course of the final-image-formation development processing in step S160, a simpler and speedier alternative pixel interpolation can be performed for the formation of a display-purpose RAW image. For example, in the creation of a display-purpose RAW image, the R, G, and B values of each pixel can be obtained by calculating an arithmetical averaging value for a G color component while utilizing the values of R, G1, B, and G2 that are arrayed adjacent to one another in vertical and horizontal directions. Specifically, the R, G, and B values of each pixel can be obtained as R, (G1+G2)/2, and B, respectively. With such a simpler and speedier summation averaging, a reduced image data having a half VH size can be generated as a display-purpose RAW image.

Figure 13:
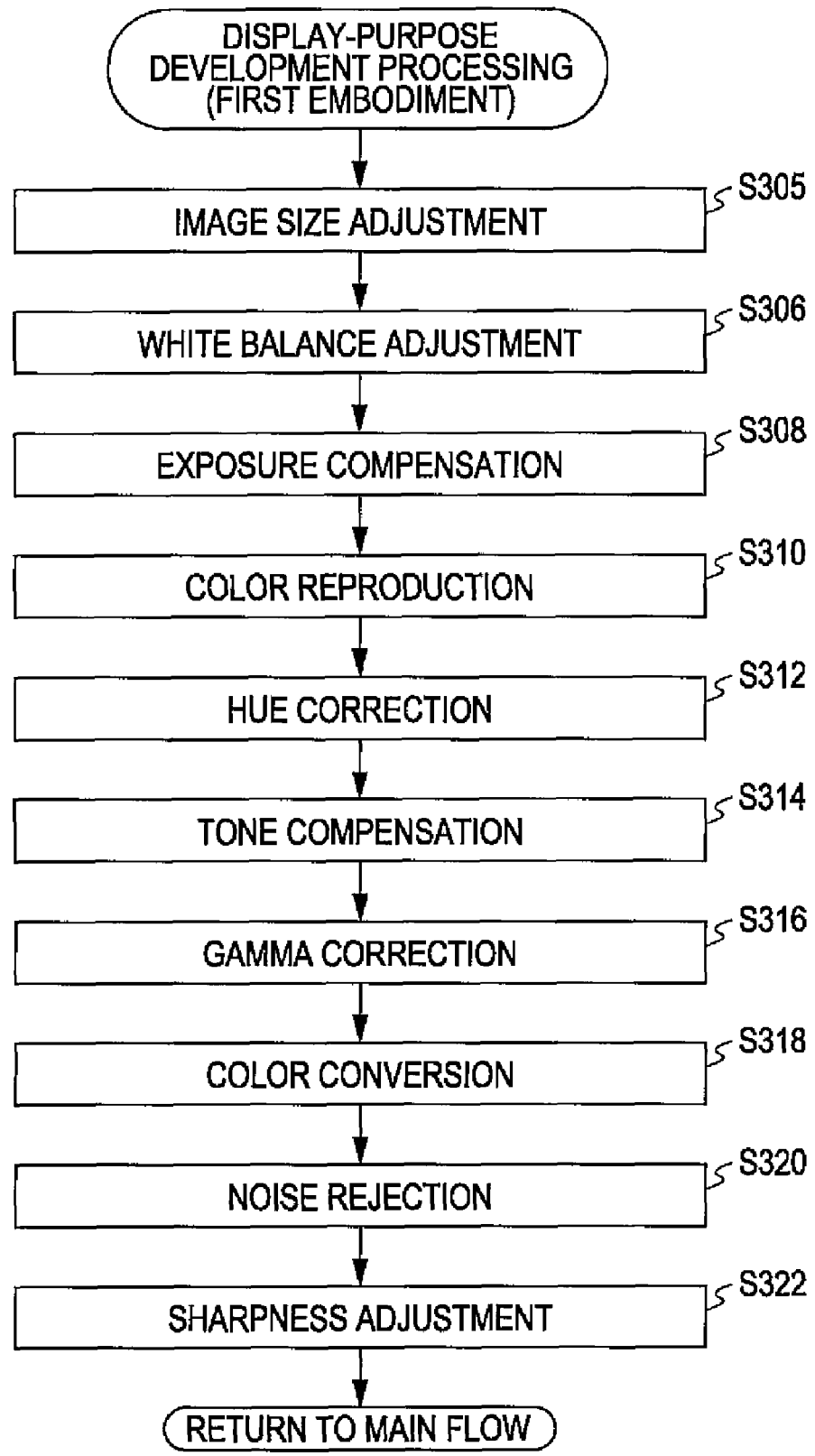
FIG. 13 is a flowchart that illustrates one example of the processing flow of display-purpose development processing performed in step S152.

In step S152, the display-purpose RAW image is subjected to development processing. Hereafter, this development processing is referred to as "display-purpose development processing". As a result of the display-purpose development processing, a display-purpose image, which is a developed image, is created. FIG. 13 is a flowchart that illustrates an example of the processing flow of display-purpose development processing performed in step S152. The processing flow of the display-purpose development processing illustrated in FIG. 13 differs from that of the final-image-formation development processing illustrated in FIG. 10 in the following points: the pre-gain processing (which corresponds to the aforementioned step S302) and the pixel-interpolation processing (which corresponds to the aforementioned step S304) that have already been performed at the time of creation of the display-purpose RAW image (the aforementioned step S122 shown in FIG. 11) are omitted in the display-purpose development processing illustrated in FIG. 13. In addition, an additional step of the adjustment of an image size (step S305) is provided prior to the adjustment of white balance (step S306) in the display-purpose development processing illustrated in FIG. 13. Except for the above-described differences, the processing flow of the display-purpose development processing illustrated in FIG. 13 is the same as that of the final-image-formation development processing illustrated in FIG. 10.

In step S305, the tentative preview display development-processing unit (hereafter called a "display-purpose development-processing unit") 340 adjusts the size of the display-purpose RAW image stored in the in-process data storage unit 410 (i.e., image size adjustment). Specifically, the display-purpose development-processing unit 340 changes the size of the display-purpose RAW image into one that is suitable to be displayed on the display unit 220 either by scaling down the size thereof or by cutting margins thereof. A non-limiting example of the size of the display-purpose RAW image after being subjected to the above-described image size adjustment is 640×480 pixels. Although the adjustment of an image size is performed in the display-purpose development processing illustrated in FIG. 13 in the present embodiment of the invention. As a modification thereof, it may be performed at the time of the creation of a display-purpose RAW image, which was performed in step S122 shown in FIG. 11.

Next, in a series of sequential steps S306-322, white balance adjustment processing, exposure compensation processing, color reproduction processing, hue correction processing, tone compensation processing, gamma correction processing, color conversion processing, noise rejection processing, and sharpness adjustment processing are performed on the size-reduced display-purpose RAW image in the order of appearance herein. Through the application of this processing onto the display-purpose RAW image, a display-purpose developed image (i.e., preview image) is created. In the process of creating a preview image, the development conditions acquired in the previous step S110a are used. After the creation of the preview image, the process returns to the individual development processing illustrated in FIG. 11. In step S154, the created preview image is shown on the display unit 220. Since the size of the display-purpose RAW image has been reduced to a preview size in step S122/S305, the load of processing the image during the subsequent steps S306-S322 is lightened in proportion to the reduced number of pixels. Therefore, it is possible to perform processing with a very high speed, thereby offering advantageous effects in the considerable reduction of development waiting time for the benefit of a user.

Figure 14:
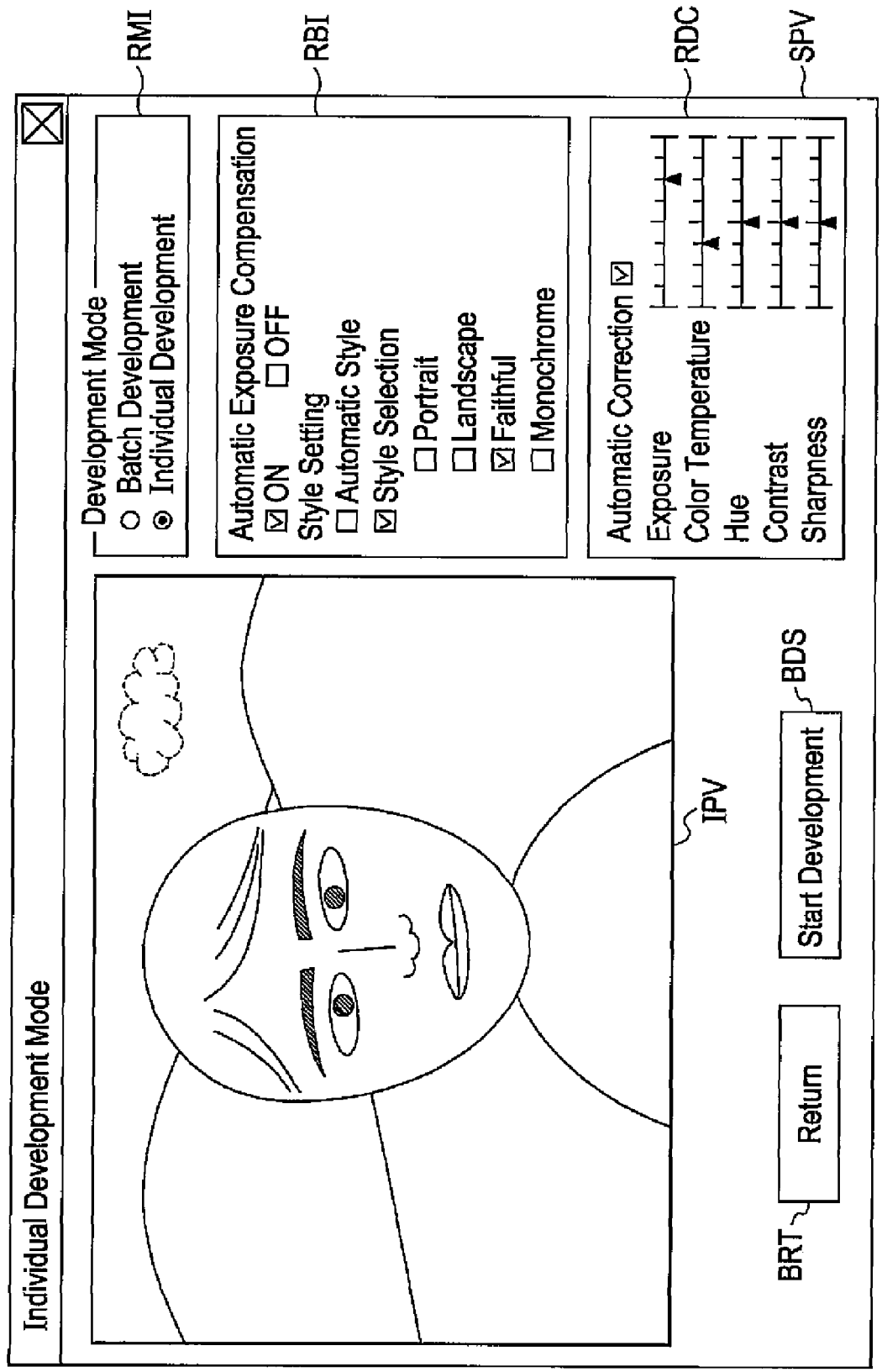
FIG. 14 is a schematic diagram that illustrates an example of a development result preview screen displayed in step S154.

FIG. 14 is an explanatory diagram that schematically illustrates an example of a development result preview screen SPV that is displayed in the step S154. In the development result preview screen SPV, a preview image IPV, which represents the result of development processing performed in accordance with the content set on the development content setting screen SDCa, is displayed in a large picture size. In addition to the setting region RBI, which is provided on the development content setting screen SDCa shown in FIG. 12 so as to allow a user to set development conditions, the development result preview screen SPV further has a development condition display region RDC in which the development conditions that were used in the display-purpose development processing are displayed. The setting states of "exposure", "color temperature", "hue", "contrast", and "sharpness" are shown in the development condition display region RDC as the development conditions. In addition to these five setting items, the development condition display region RDC has an "automatic correction" checkbox that indicates whether automatic correction (i.e., automatic compensation) was performed or not. In the non-limiting example of the development content setting screen SDCa shown in FIG. 12, the automatic exposure compensation checkbox is marked ON. Accordingly, the result of analysis performed for the purpose of automatic correction is shown in the development condition display region RDC as a default display. Assuming that it was judged as the result of analysis that exposure should be heightened by two increments whereas color temperature should be lowered by one increment, as illustrated in FIG. 14, a triangular "cursor" (i.e., notch) is placed at a position that is higher than the center exposure position by two increments, which indicates that exposure compensation will be performed so as to increase the luminosity of the image by two steps. In addition, the automatic correction checkbox is checked ON. As for the setting item of the color temperature, a triangular notch is placed at a position that is lower than the center position thereof by one increment.

When a user performs some manipulation on the development result preview screen SPV, the development-processing unit 300 (refer to FIG. 3) acquires the content of user manipulation. Then, in the step S156 shown in FIG. 11, the development-processing unit 300 makes a judgment as to whether the manipulation performed by the user on the development result preview screen SPV is an instruction for changing the development conditions or not. If it is judged that the user performed the manipulation on the development result preview screen SPV for the purpose of instructing that the development conditions should be changed (step S156: YES), the process returns to the previous step S130. Then, the steps S130-S156 are repeated. However, if it is judged that the manipulation performed by the user on the development result preview screen SPV is not an instruction for changing the development conditions, or in other words, if the user pressed down the "Start Development" button BDS (step S156: No), the process moves onto the next step S160.

Figure 15:
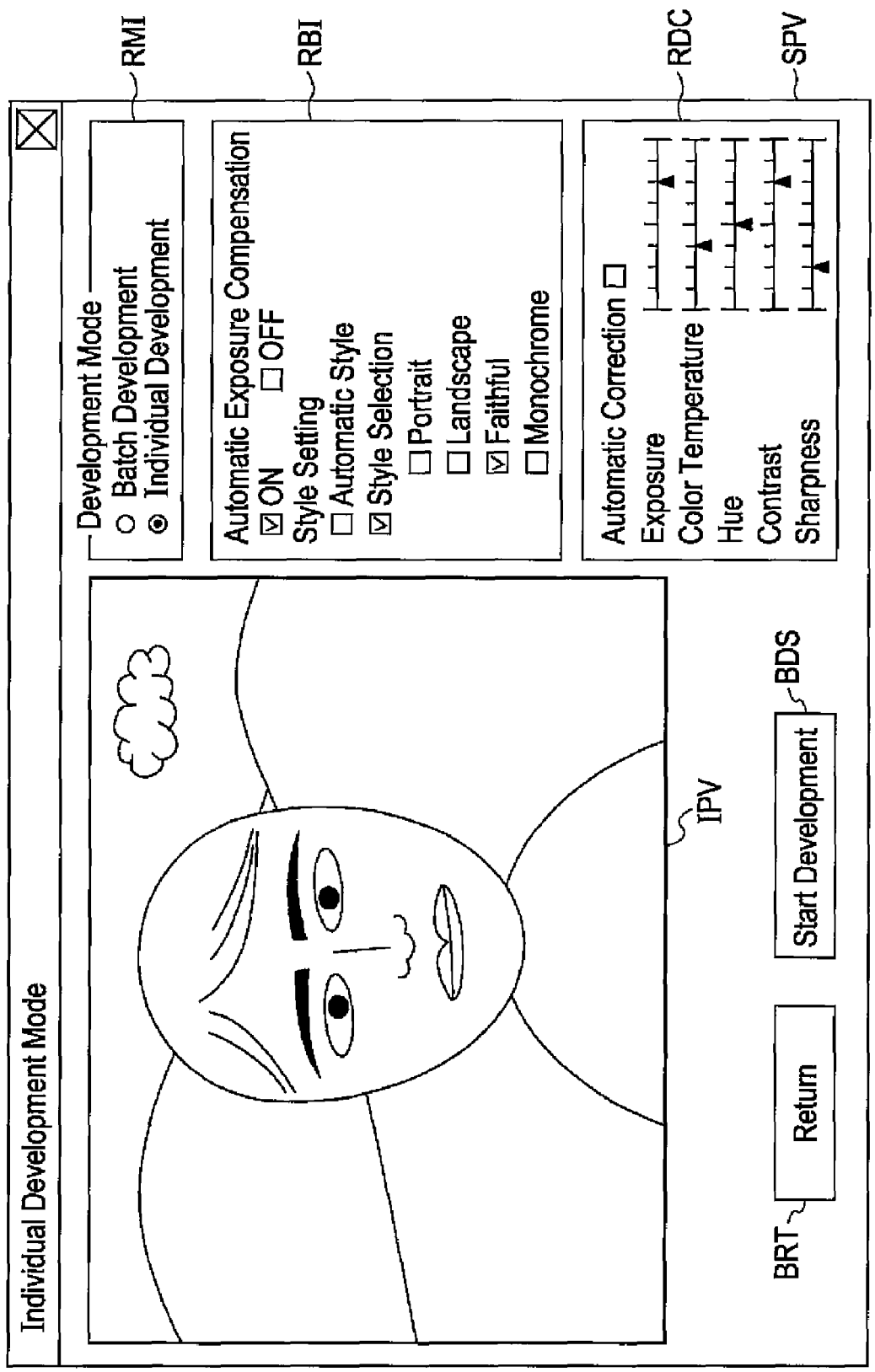
FIG. 15 is an schematic diagram that illustrates one example of the result of a development condition change performed by a user on the development result preview screen illustrated in FIG. 14.

FIG. 15 is an explanatory diagram that schematically illustrates an example of the result of a development condition change that was performed by a user on the development result preview screen SPV illustrated in FIG. 14. In a non-limiting example illustrated in FIG. 15, it is assumed that a user changed the settings shown in the development condition display region RDC of FIG. 14. As a result, in the changed RDC setting shown in FIG. 15, the level of contrast is higher than the pre-change center level thereof by two increments, whereas the level of sharpness is lower than the pre-change center level by two increments. If the user changes the settings of the development conditions as illustrated in FIG. 15, the display-purpose development processing is performed again in step S152. As a result, the preview image IPV changes from a pre-change image that is shown in FIG. 14 into a re-developed image with heightened contrast and lowered sharpness. In addition, the checkmark that was put in the automatic correction checkbox in the development condition display region RDC of FIG. 14 has disappeared. If the user presses down the "Start Development" button BDS after effecting the above-described change in the development conditions on the development result preview screen SPV illustrated in FIG. 15, then the aforementioned final-image-formation development processing (step S160) is executed on the RAW image.

Figure 16:
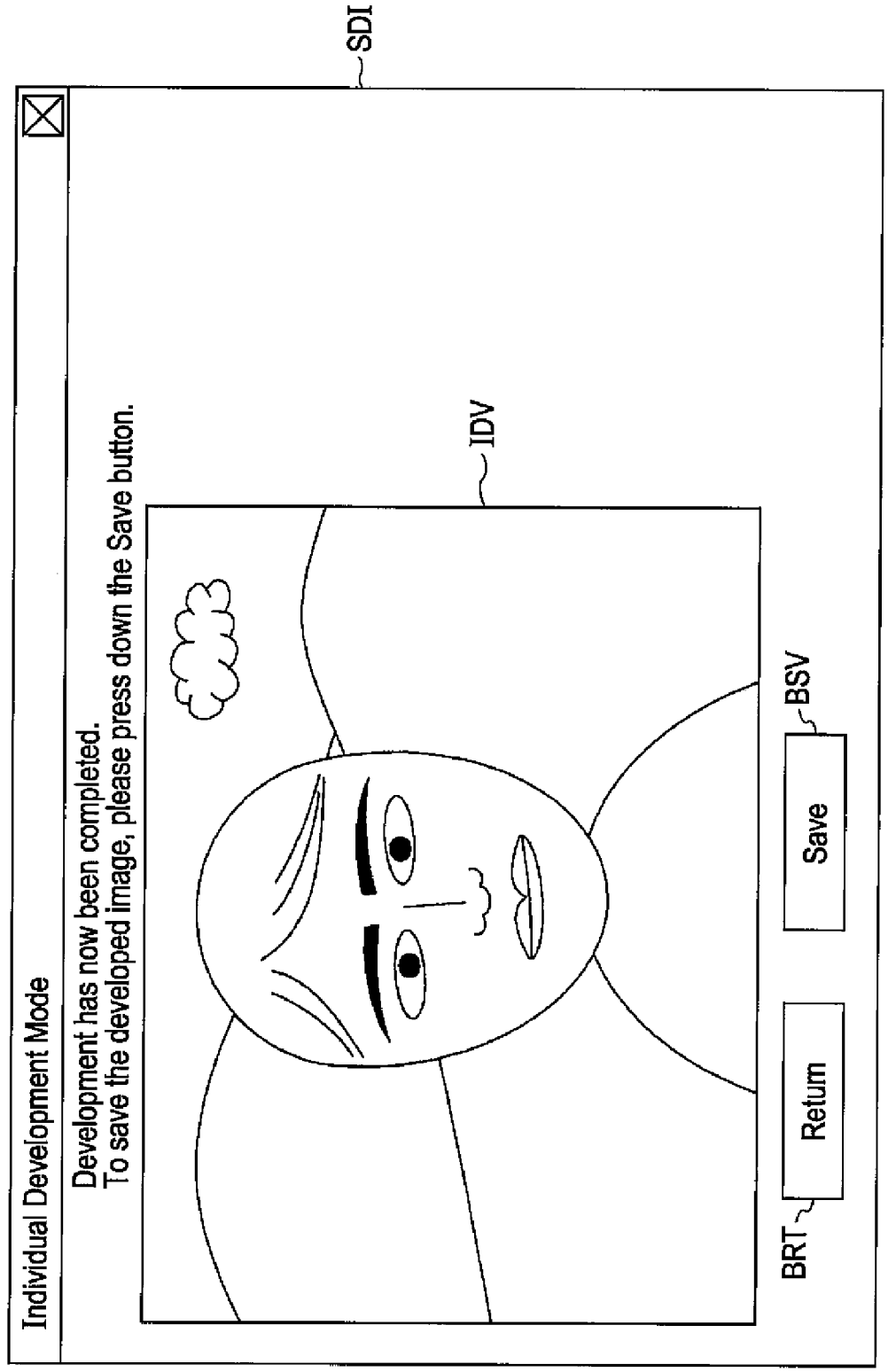
FIG. 16 is a schematic diagram that illustrates one example of a developed image display screen displayed on a display unit in step S162.

In step S162 shown in FIG. 11, the development-processing unit 300 displays the developed image after changing the size thereof, if such a size change is necessary. FIG. 16 is an explanatory diagram that schematically illustrates an example of a developed image display screen SDI displayed on the display unit 220 (refer to FIG. 3) in the step S162. In the developed image display screen SDI, a developed image (i.e., after-development image) IDV, which was generated as a result of the final-image-formation development processing (step S160), is displayed in a large picture size. If the user presses down the "Save" button BSV that is provided on the developed image display screen SDI, a JPEG-formatted developed image data, which was created from the developed image, is stored into the developed image storage unit 420 (refer to FIG. 3) in step S170 of FIG. 11. Then, the individual development processing illustrated in FIG. 11 ends.

Figure 17:
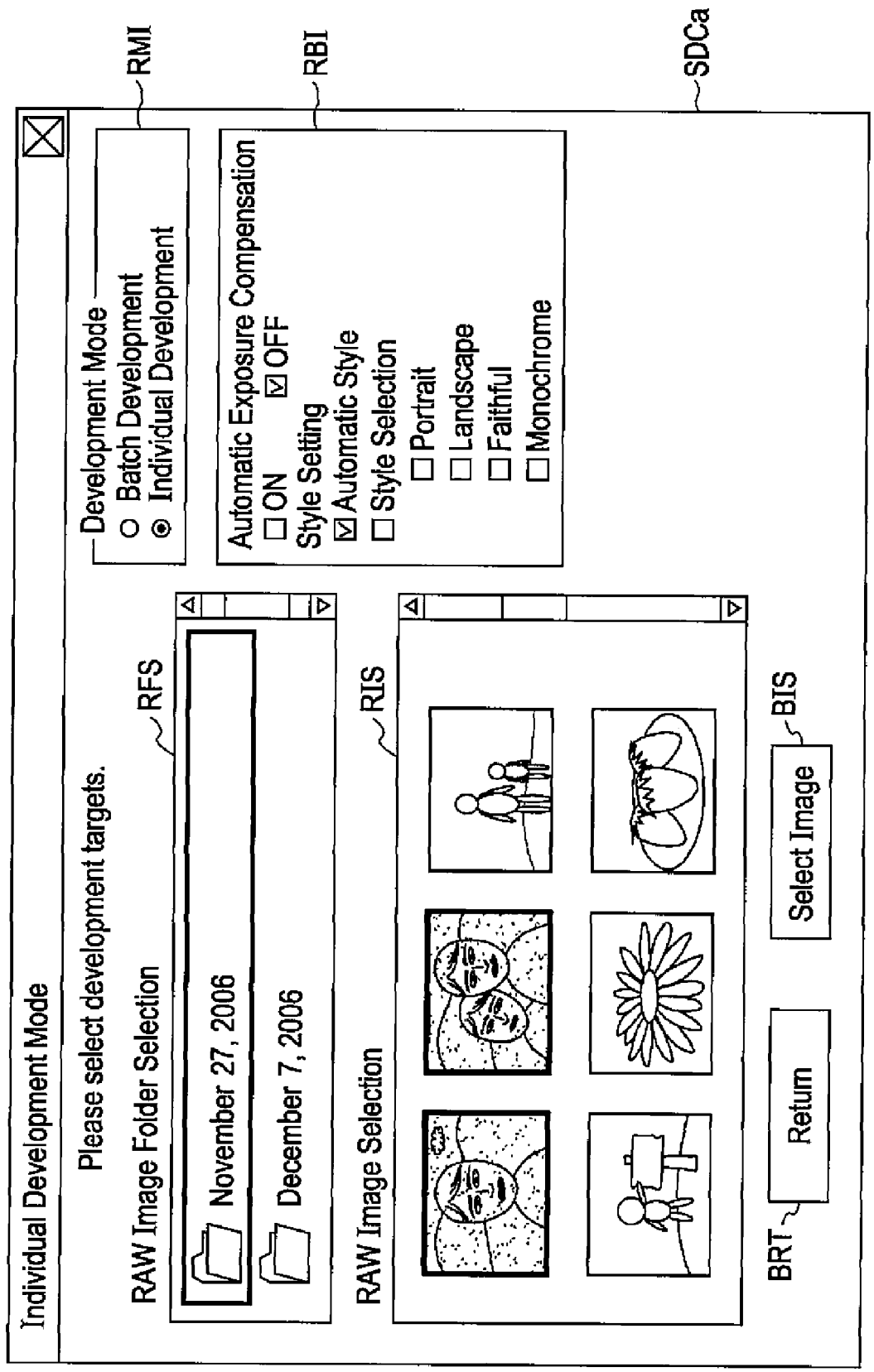
FIG. 17 is a schematic diagram that illustrates another example of the development content setting screen displayed in step S110a, which shows settings that differ from those of FIG. 12.

FIG. 17 is an explanatory diagram that schematically illustrates another example of the development content setting screen SDCa displayed in step S110a, which shows settings that differ from those of FIG. 12. The setting of the development content setting screen SDCa illustrated in FIG. 17 differs from the development content setting screen SDCa illustrated in FIG. 12 in that, firstly, the "automatic exposure compensation" is set OFF in FIG. 17 whereas it is set ON in FIG. 12. Secondly, the "style" is set as "automatic style" in FIG. 17, unlike the style setting of FIG. 12. Under the automatic style setting, the development conditions are set on the basis of scene settings made at the time of shooting of the digital still camera 100. The scene settings configured at the time of shooting of the digital still camera 100 are acquired from the shooting conditions that are stored in the header portion of the RAW image file (refer to FIG. 2). A more detailed explanation will be provided later. In the non-limiting example illustrated in FIG. 17, it is assumed that no scene settings were made at the time of shooting of the digital still camera 100. In such a case, standard conditions are used for development conditions other than exposure compensation.

In the following description, an explanation is given as to how processing is performed when the "automatic style" is set in the development content setting screen SDCa of FIG. 17. Under the automatic style setting, the development conditions are set on the basis of scene settings made at the time of shooting of the digital still camera 100. The scene settings configured at the time of shooting of the digital still camera 100 are acquired from the shooting conditions that are stored in the header portion of the RAW image file (refer to FIG. 2).

For example, in the case of a RAW image file that conforms to Exif 2.21, which is an image file format standard developed for a digital still camera, shooting scenes are recorded in "SceneCaptureType", which is recorded in "Exif IFD" and/or "0th IFD Exif Private Tag". The values of "SceneCaptureType" are associated with a variety of shooting scenes. Specifically, the value of "SceneCaptureType" 1 is associated with landscape. The value of "SceneCaptureType" 2 is associated with portrait. The value of "SceneCaptureType" 3 is associated with nightscape. The value of "SceneCaptureType" 0 is associated with a standard scene. The automatic style determines the conditions that optimize the development of an image by utilizing these values of "SceneCaptureType" automatically. For example, if the landscape is set therein, contrast and saturation are set higher than normal processing. In addition, sharpness correction is performed. Moreover, if the landscape is set therein, memory color correction processing is performed for sky and greens. If the portrait is set therein, memory color correction processing is performed for the flesh color. In addition, the softening of sharpness and contrast reproduction are performed so as to be suitable for a portrait. If the night scene is set, no excessive exposure compensation is performed. Noise rejection is performed on the entirety of a night scene image. Moreover, contrast is reproduced in a subtle or moderate manner.

In addition to the above-described SceneCaptureType, a variety of other settings configured at the time of shooting are recorded in the Exif tag, including but not limited to Contrast, Saturation, and Sharpness. It is possible to change the development conditions presented at the time of the execution of the final-image-formation development processing illustrated in FIG. 10 and/or at the time of the execution of the display-purpose development processing illustrated in FIG. 13 on the basis of a Contrast value (0=standard, 1=soft (low), 2=hard (high)), Saturation value (0=standard, 1=low, 2=high), and/or a Sharpness value (0=standard, 1=weak, 2=strong).

If additional settings other than those described above are recorded in the tag as information on the settings configured at the time of shooting (i.e., shooting-time setting information), it is possible to read such tag information so as to make further more sophisticated development style settings (i.e., development finish settings). Specifically, tag information that can be associated with development conditions may be specified so as to allow a user to change the development conditions at the time of development by means of the tag information. Examples include, without any intention of limitation thereto, "faithful image" (color reproduction is performed with an enhanced fidelity), "soft image" (a soft image is reproduced), "natural image" (an image is formed so as to give a more natural impression while making more active touch-up than "faithful image"), "cool landscape" (an image of a scene before daylight having a cool or sharp atmosphere with a high color temperature is formed), "warm landscape" (an image of a scene of evening twilight having a soft and warm atmosphere is formed), "sunset glow" (sunrise red or sunset red is more vividly reproduced), "wedding portrait" (the gradations of a white wedding dress and the flesh of a female are reproduced with a softer impression), "kids" (an image of active kids playing around is formed with a vivid tone, and "warm room" (warm light shining into a room is reproduced).

Moreover, other additional settings may be recorded into the shooting-time setting information (i.e., information on the settings configured at the time of shooting) for effecting monochrome development conditions. In such a non-limiting modified configuration, the tag information is read out so as to set the monochrome development conditions that offer monochrome development and/or produce contrast effects as if an image were seen through a red, orange, yellow, or green filter. Monochrome development can be realized by adjusting the levels of brightness/luminance signal in accordance with the R, G, and B ratio while ensuring the same R, G, and B values of an output image. Red, orange, yellow, or green filtering effects can be achieved by changing the ratio of the R, G, and B values at the time of generation of brightness/luminosity values.

If a user presses down the "Select Image" button BIS provided in the development content setting screen SDCa with the settings configured as illustrated in FIG. 17, it is judged in step S130 of the processing flow of the individual development processing illustrated in FIG. 11 that the automatic exposure compensation is set OFF. Accordingly, the display-purpose development processing (step S152) is executed without performing exposure compensation. Then, in step S154 thereof, a preview image that has been created as a result of development performed without exposure compensation is displayed.

Figure 18:
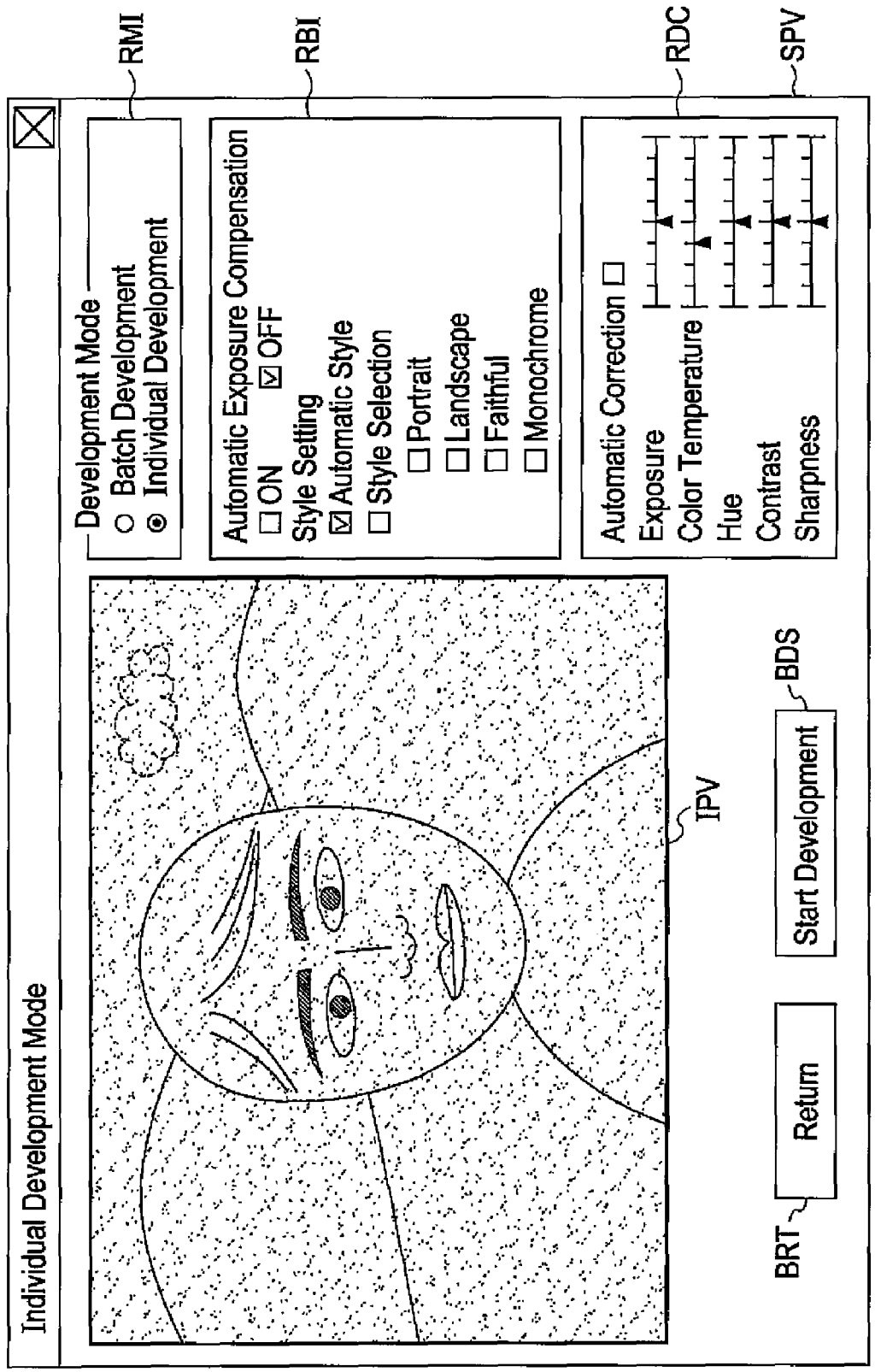
FIG. 18 is a schematic diagram that illustrates one example of a development result preview screen that shows a preview image that has been developed in accordance with the setting content configured on the development content setting screen illustrated in FIG. 17.

FIG. 18 is an explanatory diagram that schematically illustrates an example of a development result preview screen SPV that shows a preview image IPV that has been developed in accordance with the setting content configured on the development content setting screen SDCa illustrated in FIG. 17. In the example of the development result preview screen SPV illustrated in FIG. 18, an under-exposure RAW image file was selected in the previous step S110a of FIG. 11. For this reason, an under-exposure preview image IPV is displayed in the development result preview screen SPV.

Figure 19:
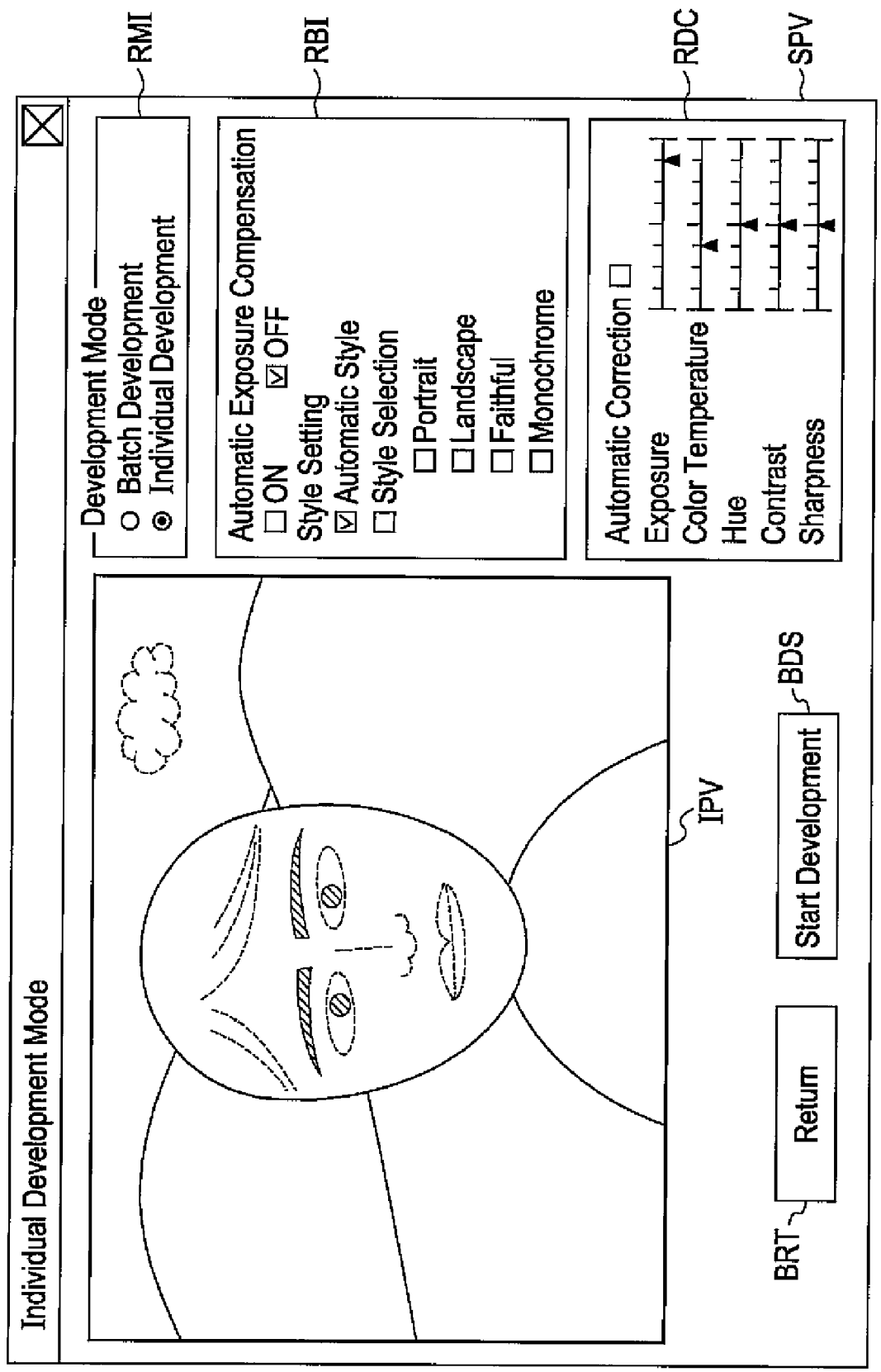
FIG. 19 is a schematic diagram that illustrates one example of an updated (i.e., re-developed) development result preview screen displayed after the user raises the level of the "exposure" setting item so that it is higher by three increments in comparison with the pre-change under-exposure setting state shown in the development result preview screen SPV illustrated in FIG. 18.

FIG. 19 is an explanatory diagram that schematically illustrates an example of an updated (i.e., re-developed) development result preview screen SPV displayed after the user raised the level of the "exposure" setting item so that it is higher by three increments in comparison with (i.e., changed it from) the pre-change under-exposure setting state shown in the development result preview screen SPV illustrated in FIG. 18. In the process of updating the development result preview screen SPV, it is judged in the step S156 of FIG. 11 that the development conditions were changed. Accordingly, exposure compensation is performed so as to increase exposure by three increments in the display-purpose development processing (step S152). As a result thereof, an updated preview image IPV that has a slightly excessive exposure value (hereafter referred to as "slightly-over-exposure" image) is displayed in the development result preview screen SPV as illustrated in FIG. 19.

Figure 20:
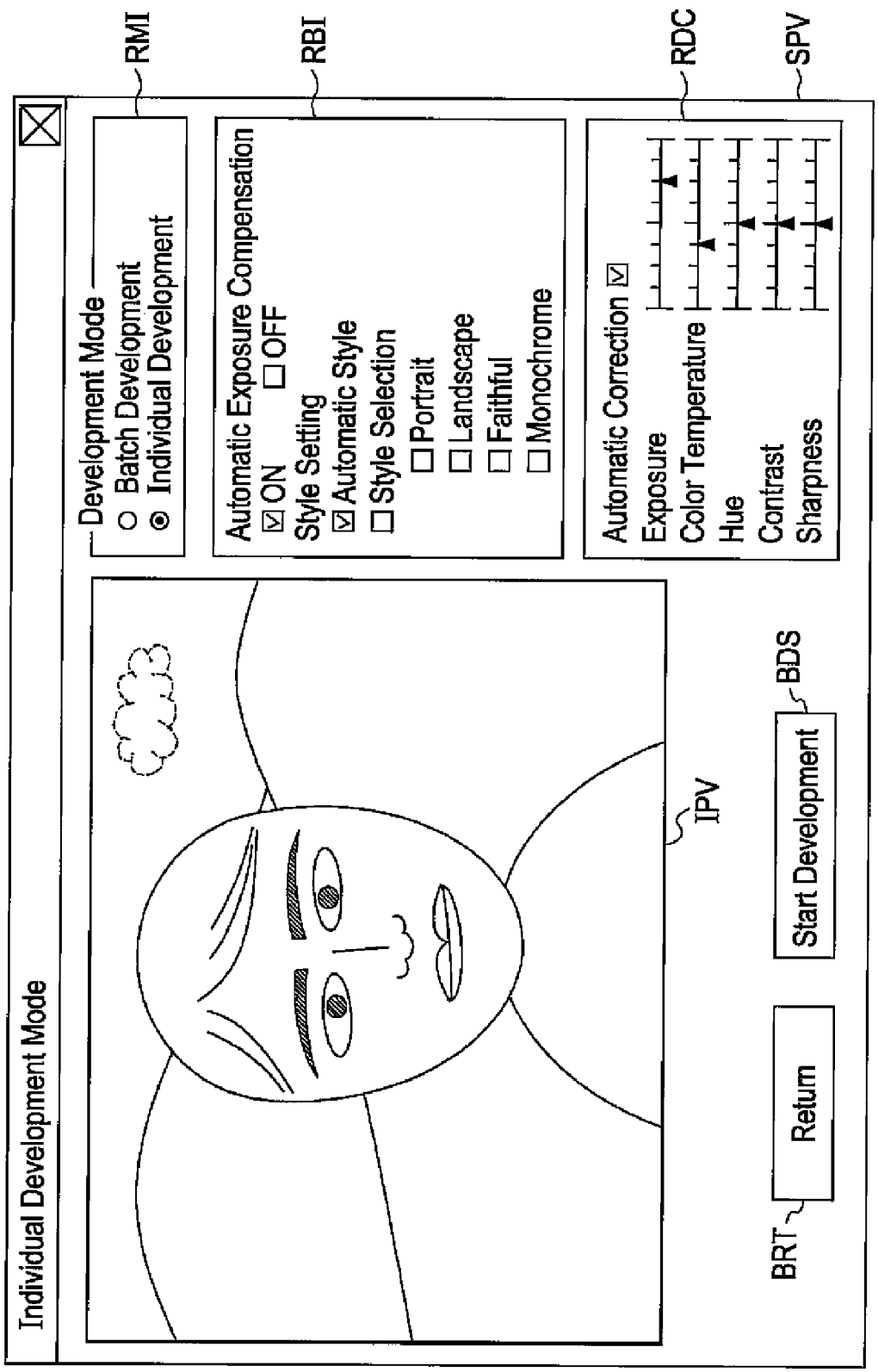
FIG. 20 is an schematic diagram that illustrates one example of a further updated development result preview screen displayed after the user changes the setting of "automatic exposure compensation" into ON from the pre-change slightly-over-exposure setting state shown in the development result preview screen illustrated in FIG. 19.

FIG. 20 is an explanatory diagram that schematically illustrates an example of a further updated development result preview screen SPV displayed after the user changed the setting of "automatic exposure compensation" into ON from the pre-change slightly-over-exposure setting state shown in the development result preview screen SPV illustrated in FIG. 19. In the process of updating the development result preview screen SPV, it is judged in the step S156 of FIG. 11 that the development conditions were changed. Then, in the step S130 thereof, it is judged that the automatic exposure compensation is set ON. Accordingly, the amount of exposure compensation is set on the basis of the result of analysis performed on a reduced image. Thereafter, the display-purpose development processing (step S152) is performed by means of the exposure compensation amount that was set on the basis of the result of analysis performed on the reduced image. As a result, an updated preview image IPV that has an appropriate exposure value is displayed in the development result preview screen SPV as illustrated in FIG. 20.

Figure 21:
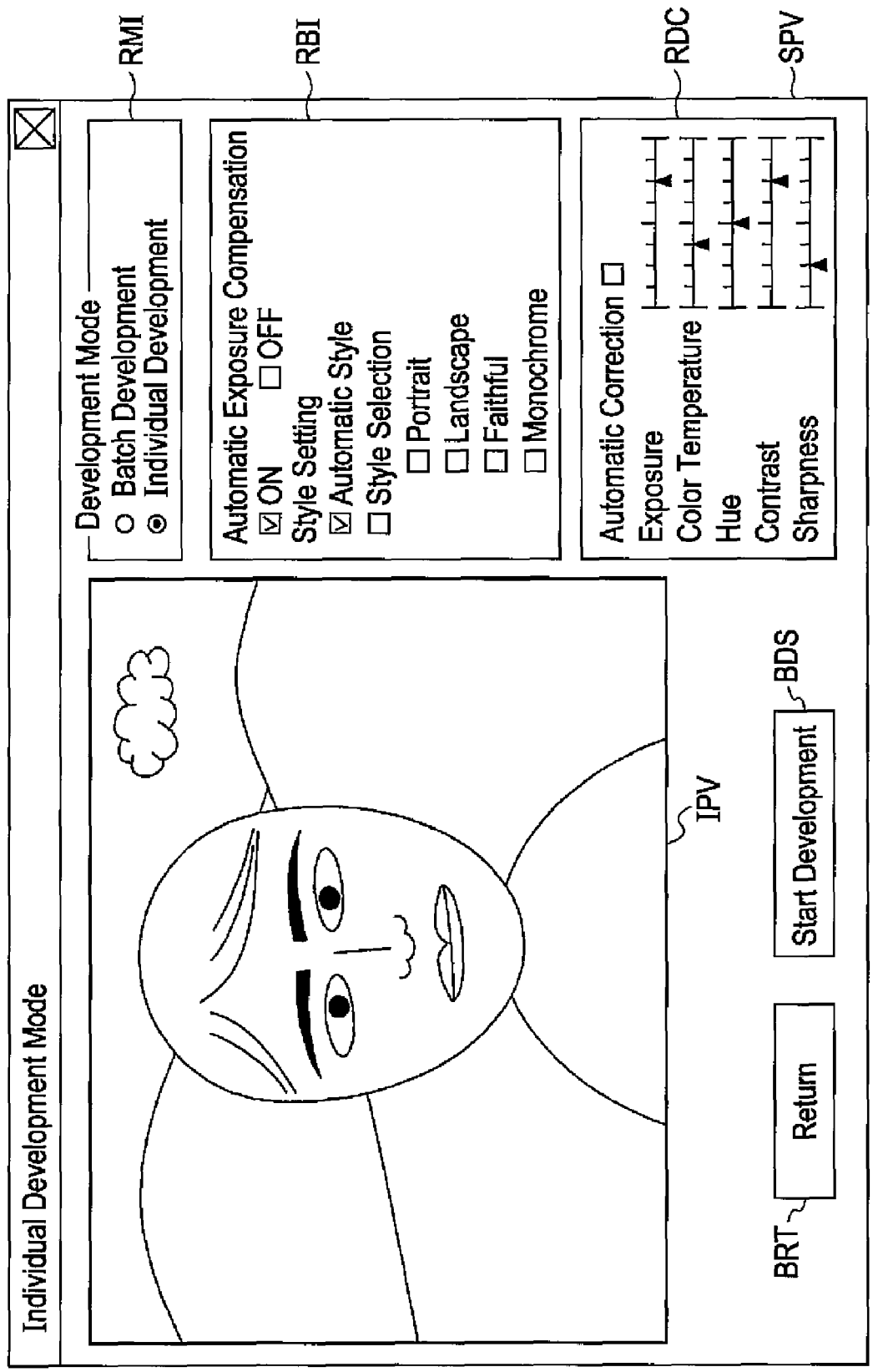
FIG. 21 is a schematic diagram that illustrates an example of a further updated development result preview screen displayed after the user raises the level of the "Contrast" setting item by two increments and lowers the level of the "sharpness" setting item by two increments from the pre-change appropriate-exposure setting state shown in the development result preview screen illustrated in FIG. 20.
Figure 22:
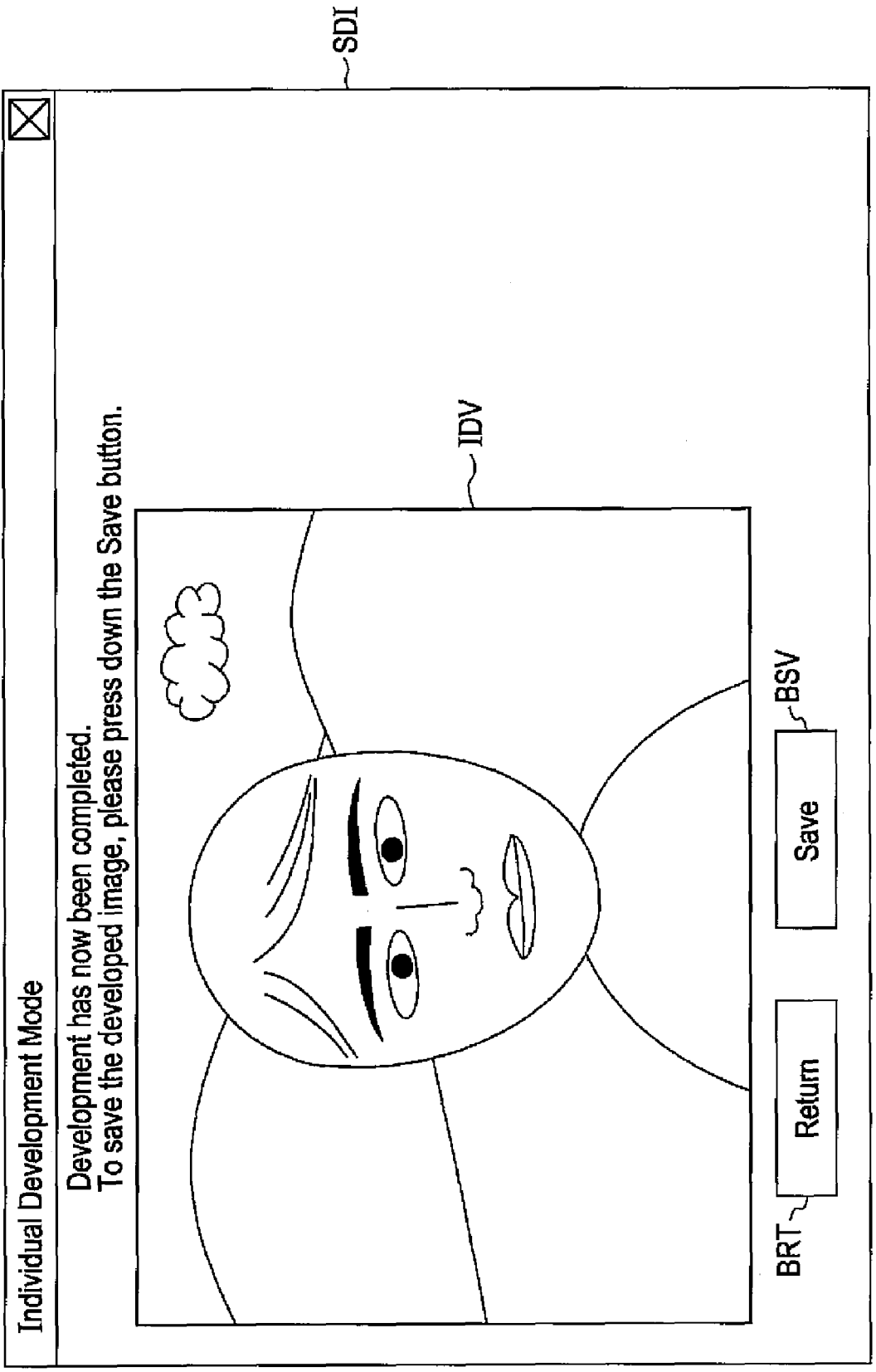
FIG. 22 is a schematic diagram that illustrates an example of the developed image display screen displayed on the display unit after the completion of the final-image-formation development processing, which was instructed by the user on the development result preview screen illustrated in FIG. 21.

FIG. 21 is an explanatory diagram that schematically illustrates an example of a further updated development result preview screen SPV that is displayed after the user raised the level of the "contrast" setting item by two increments and lowered the level of the "sharpness" setting item by two increments from the pre-change appropriate-exposure setting state shown in the development result preview screen SPV illustrated in FIG. 20. As a result of the above-described user manipulation, the preview image IPV changes from the pre-change appropriate-exposure image shown in the development result preview screen SPV illustrated in FIG. 20 into one having raised contrast and lowered sharpness as illustrated in FIG. 21, which is the same setting state as that illustrated in the foregoing example of FIG. 15. In addition, the checkmark that was put in the automatic correction checkbox in the development condition display region RDC of FIG. 20 has disappeared. If the user presses down the "Start Development" button BDS after effecting the above-described change in the development conditions on the development result preview screen SPV illustrated in FIG. 21, a developed image IDV is displayed in a developed image display screen SDI as illustrated in FIG. 22. If the user further presses down the "Save" button BSV provided on the developed image display screen SDI, a JPEG-formatted developed image data created from the developed image, is stored into the developed image storage unit 420 (refer to FIG. 3).

Figure 23:
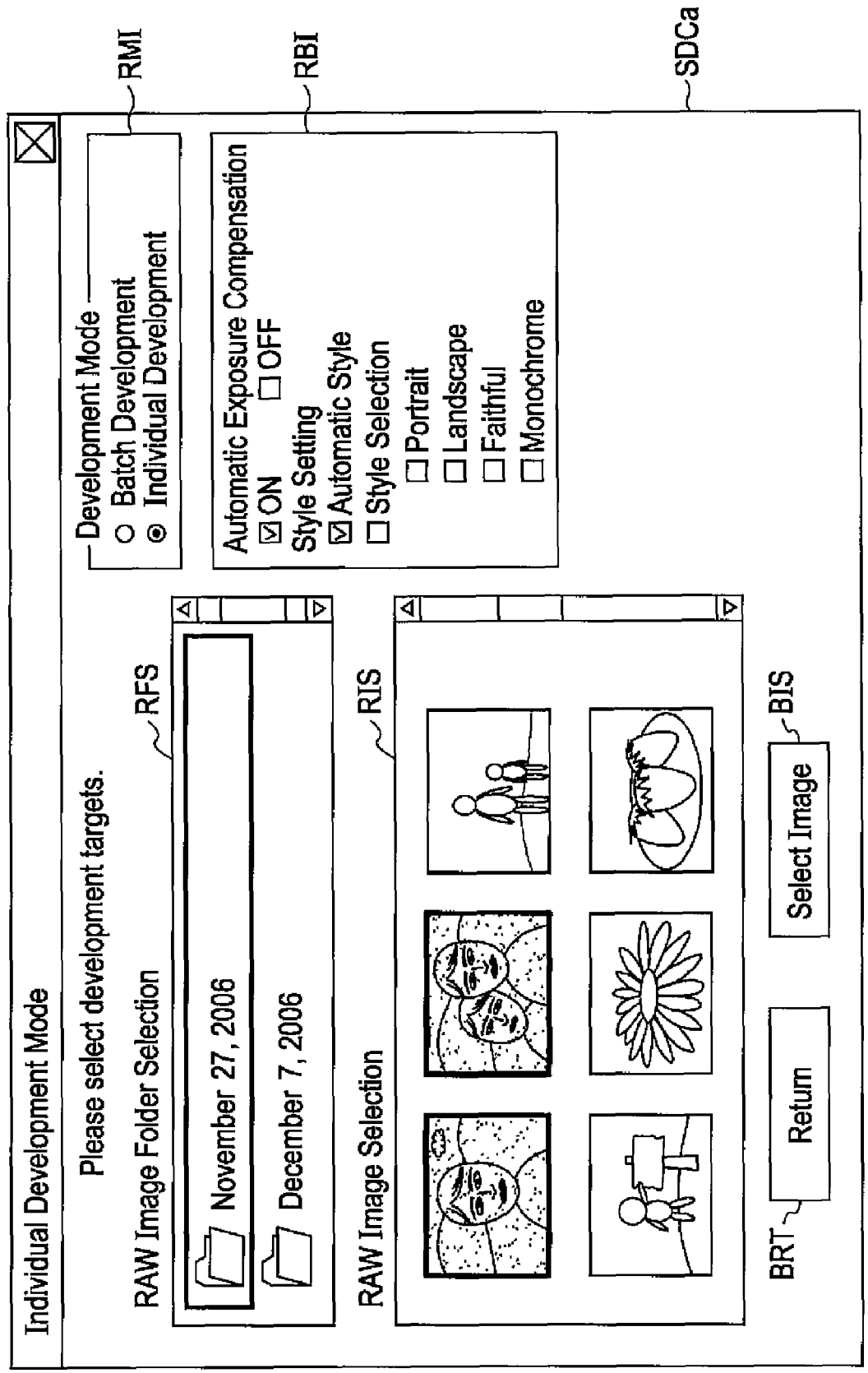
Figure 24:
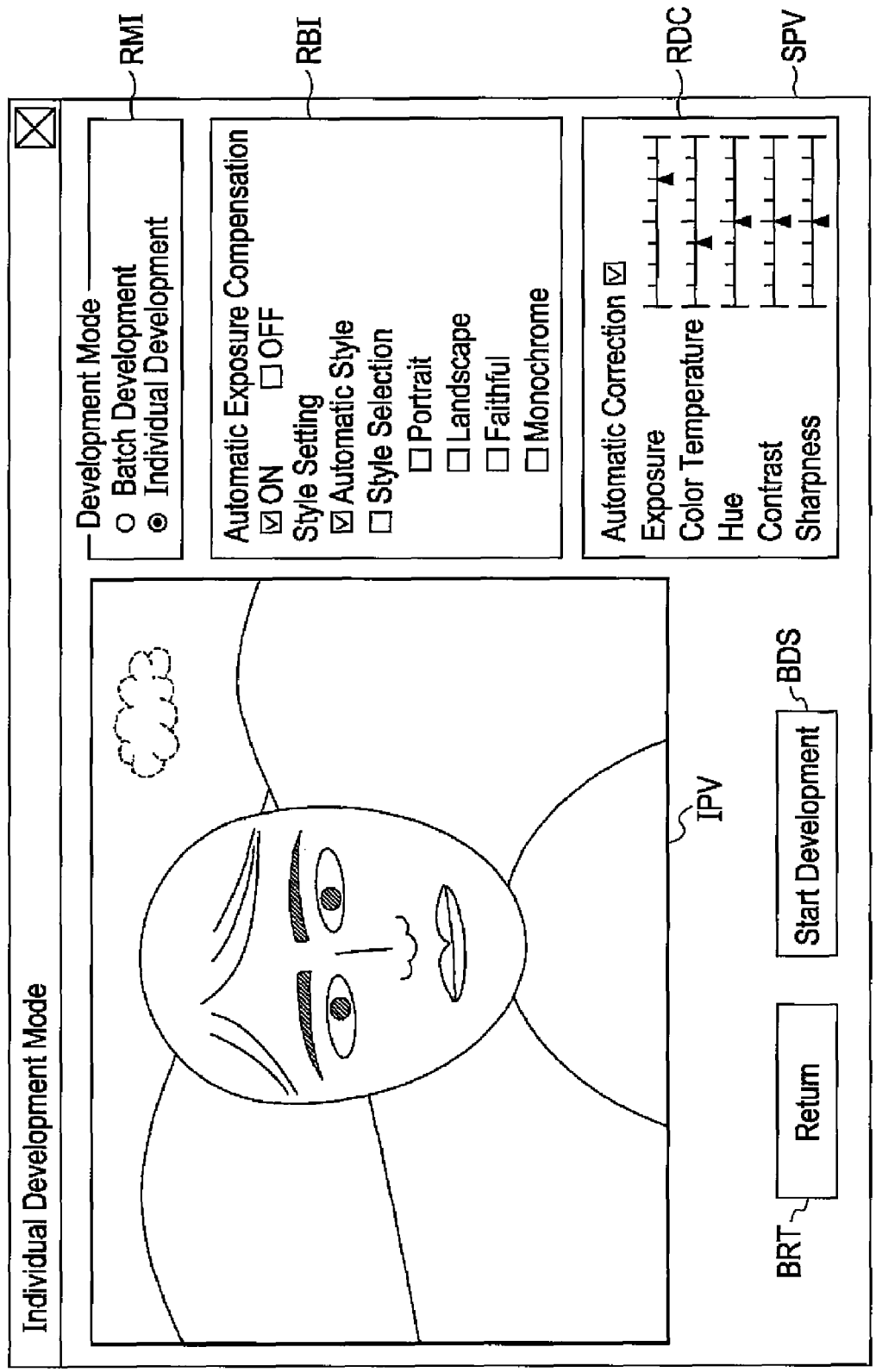
FIG. 24 is a schematic diagram that illustrates one example of the development result preview screen displayed as a result of the user's depressing of the "Select Image" button provided in the development content setting screen shown in FIG. 23.

FIG. 23 is an explanatory diagram that schematically illustrates another example of the development content setting screen SDCa that is displayed in the step S110a. The setting of the development content setting screen SDCa illustrated in FIG. 23 differs from the development content setting screen SDCa illustrated in FIG. 17 in that the automatic exposure compensation is set ON in FIG. 23 whereas it is set OFF in FIG. 17. FIG. 24 is an explanatory diagram that schematically illustrates an example of the development result preview screen SPV that is displayed as a result of the user's depressing of the "Select Image" button BIS provided in the development content setting screen SDCa shown in FIG. 23. In the development result preview screen SPV illustrated in FIG. 24, it is indicated that exposure compensation was performed so as to increase the luminosity of the image by two increments and that the color temperature thereof was lowered by one increment.

Figure 25:
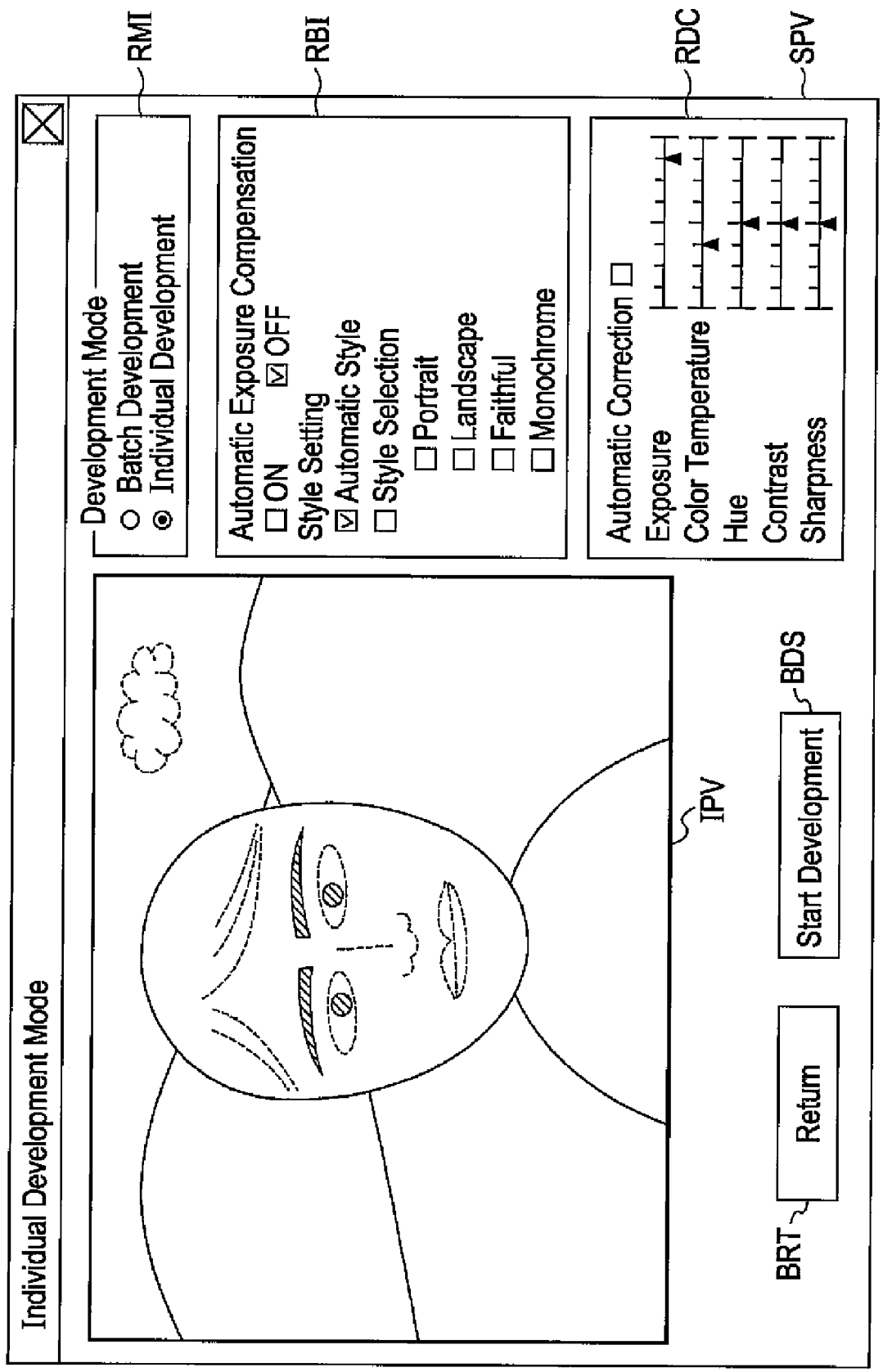
FIG. 25 is a schematic diagram that illustrates one example of an updated development result preview screen that is displayed after the user further raises the level of the exposure setting item by one increment from the exposure setting state shown in the development result preview screen illustrated in FIG. 24.

FIG. 25 is an explanatory diagram that schematically illustrates an example of an updated development result preview screen SPV displayed after the user further raised the level of the exposure setting item by one increment from the exposure setting state shown in the development result preview screen SPV illustrated in FIG. 24. In the example illustrated in FIG. 25, the check state of the automatic exposure compensation has changed from ON (FIG. 24) to OFF because the user re-configured the exposure setting. In addition thereto, the checkmark that was put in the automatic correction checkbox in the development condition display region RDC of FIG. 24 has disappeared.

Figure 26:
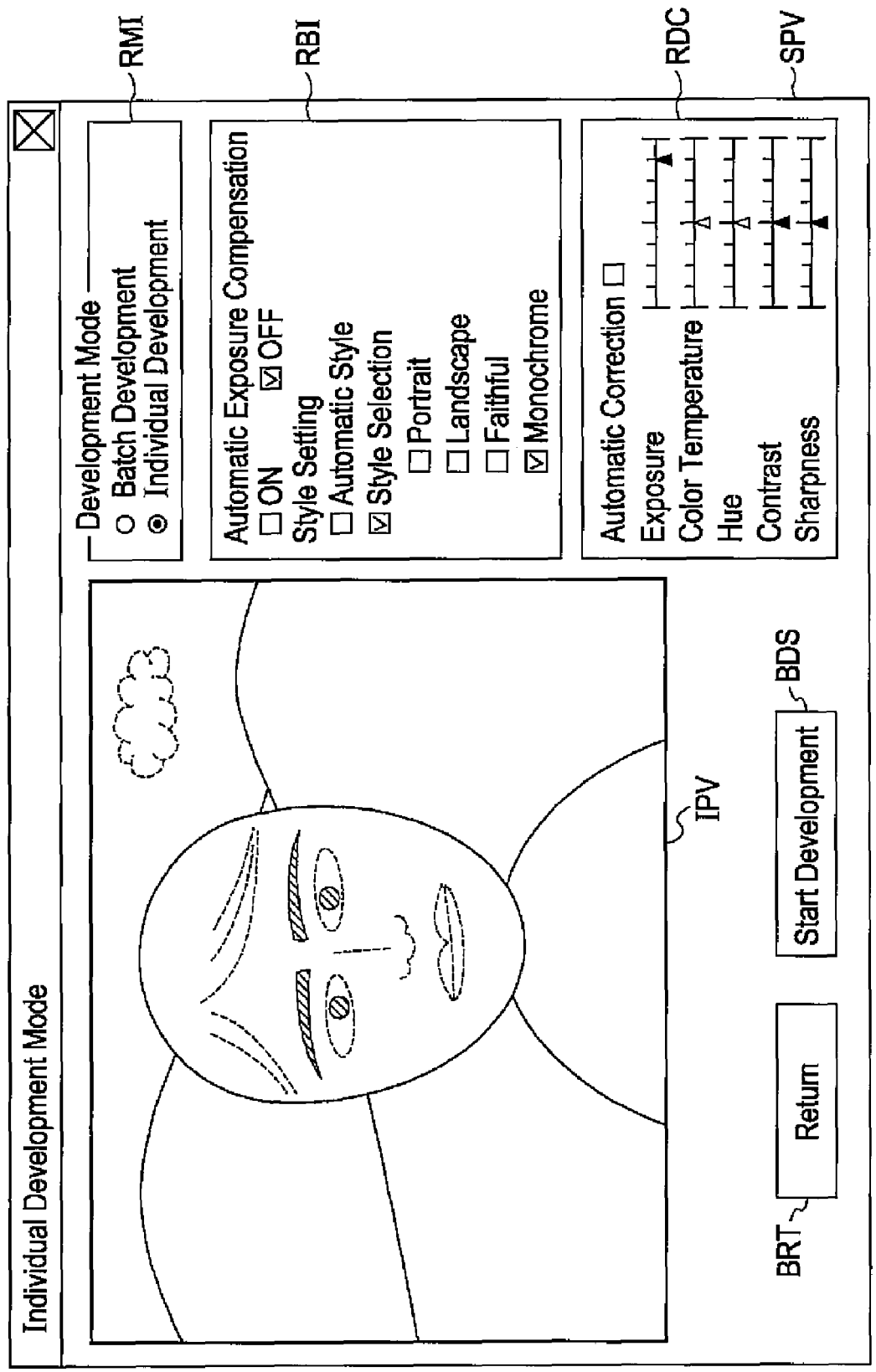
FIG. 26 is a schematic diagram that illustrates one example of a further updated development result preview screen displayed after the user changes the setting item of the "style" from the automatic style set in the development result preview screen illustrated in FIG. 25 into "monochrome" one.

FIG. 26 is an explanatory diagram that schematically illustrates an example of a further updated development result preview screen SPV displayed after the user changed the setting item of the "style" from the automatic style that was set in the development result preview screen SPV illustrated in FIG. 25 into "monochrome" one. In the example shown in FIG. 26, the "monochrome" style is selected. Accordingly, a black-and-white image is displayed as a resultant preview image IPV in the development result preview screen SPV. The display color of the notch level indication mark for each of the setting items of the "color temperature" and "hue" is changed into gray in the development result preview screen SPV illustrated in FIG. 26 because it is impossible for a user to configure these setting items for a black-and-white image. Therefore, the settings of these items are disabled, which is indicated by the above-described gray display.

Figure 27:
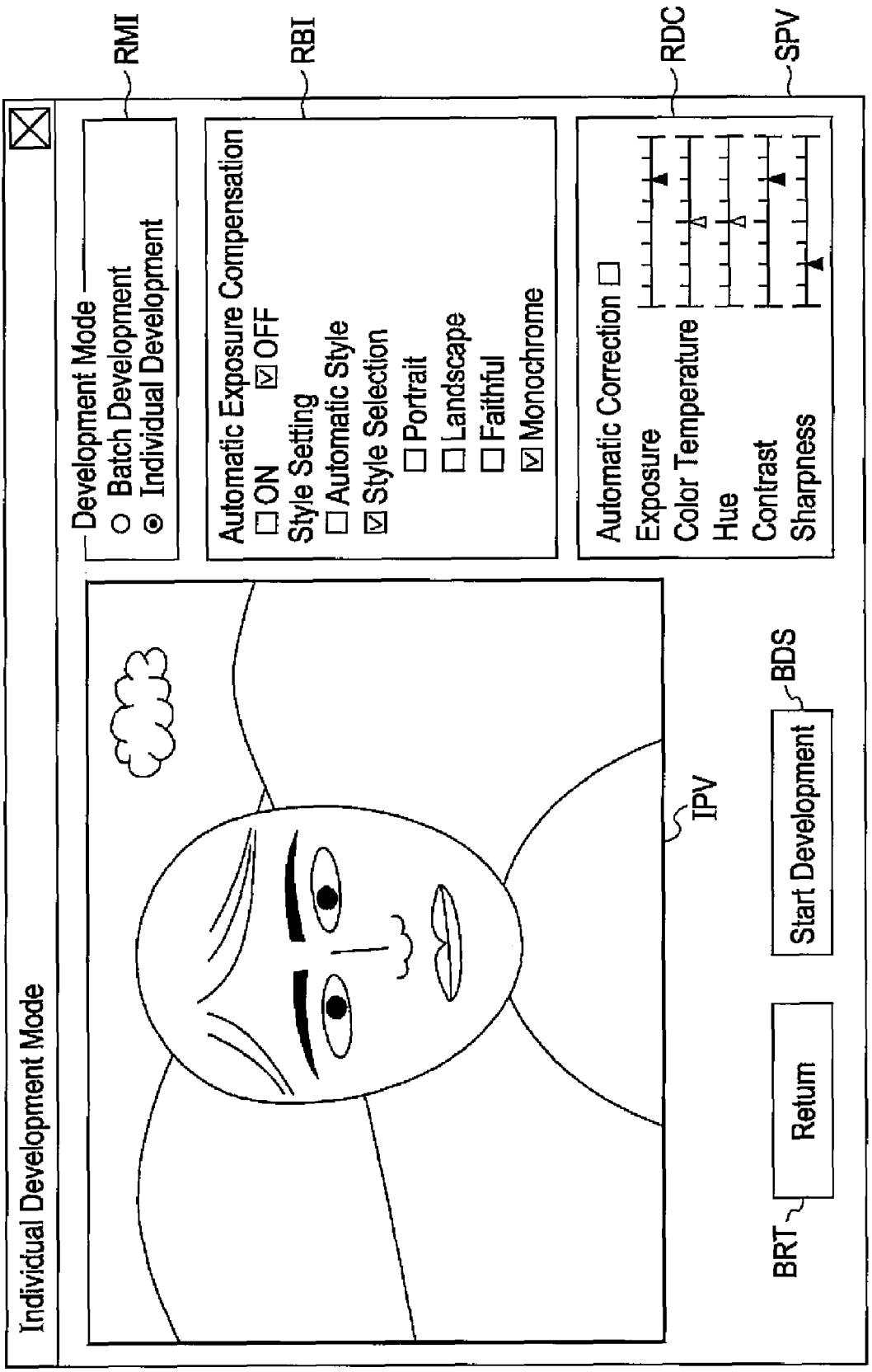
FIG. 27 is a schematic diagram that illustrates one example of a further updated development result preview screen displayed after the user decreases the exposure compensation amount by one increment, raises the level of the contrast by two increments, and lowers the level of the sharpness by two increments from the setting state shown in the development result preview screen illustrated in FIG. 26.
Figure 28:
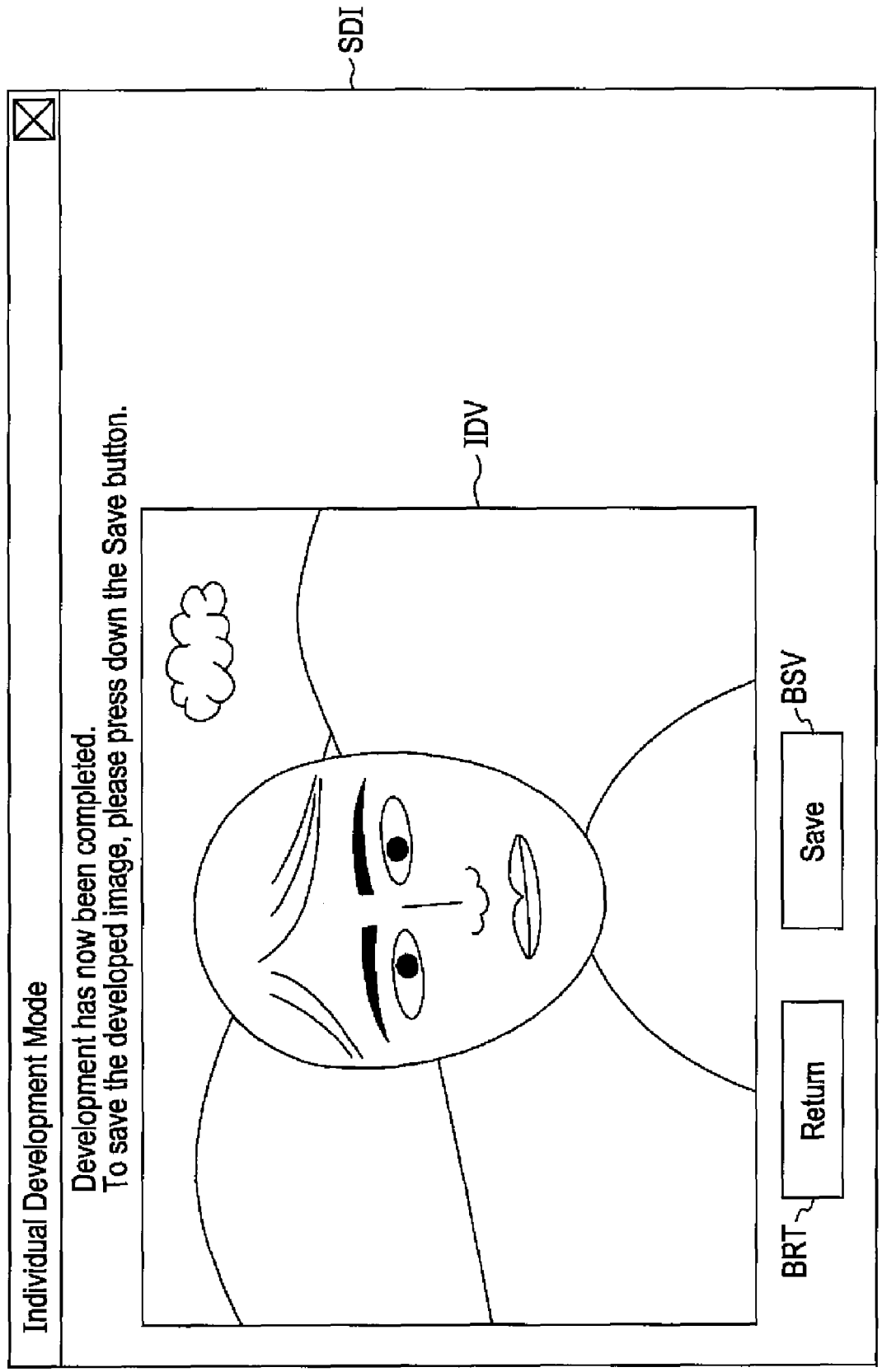
FIG. 28 is a schematic diagram that illustrates an example of the developed image display screen displayed on the display unit after the completion of the final-image-formation development processing, which was instructed by the user on the development result preview screen illustrated in FIG. 27.

FIG. 27 is an explanatory diagram that schematically illustrates an example of a further updated development result preview screen SPV displayed after the user decreased the exposure compensation amount by one increment, raised the level of the contrast by two increments, and lowered the level of the sharpness by two increments from the setting state shown in the development result preview screen SPV illustrated in FIG. 26. As a result of the above-described change made in the development conditions, a resultant image having lower luminosity and higher contrast than those of the preview image IPV shown in the development result preview screen SPV illustrated in FIG. 26 is obtained as a preview image IPV of the development result preview screen SPV illustrated in FIG. 27. If the user presses down the "Start Development" button BDS after effecting the above-described change in the development conditions on the development result preview screen SPV illustrated in FIG. 27, a black-and-white developed image IDV is displayed in a developed image display screen SDI as illustrated in FIG. 28. If the user further presses down the "Save" button BSV provided on the developed image display screen SDI, a JPEG-formatted developed image data, created from the developed image, is stored into the developed image storage unit 420 (refer to FIG. 3).

As explained above, in the first embodiment of the invention, a reduced image having a predetermined number of resolutions that is suitable to be used for image analysis is created from a screen-nail image. Then, the created reduced image is analyzed so as to calculate an exposure compensation coefficient that is used in the course of development processing. Then, development processing is performed by means of the calculated exposure compensation coefficient. By this means, the brightness/luminosity of a developed image has been subjected to correction. Therefore, it is possible to prevent any color shift (i.e., color drift) that could otherwise occur during the process of the adjustment of the brightness/luminosity (i.e., degrees of luminance) of a developed image that has been subjected to non-linear processing. In addition thereto, it is further possible to adjust the brightness/luminosity of the developed image into a more preferable level. Depending on the format of developed image data, the gradation values thereof might be expressed in eight bits. In such a case, if the correction on the degrees of luminance of the developed image is performed, there is a possibility that the gradation values become discrete (such a phenomenon is called as "gradation jump"), which could result in that an image obtained after the brightness/luminosity correction is unnatural. In connection therewith, in the first embodiment of the invention described above, the correction on the degrees of luminance thereof is performed through development processing in which arithmetic processing is performed by means of 16-bit data. Therefore, it is possible to prevent the occurrence of the gradation jump due to the correction of the degree of luminance thereof so as to ensure that an image that has been subjected to the brightness/luminosity correction is more preferable one.

Moreover, in the first embodiment of the invention described above, the display-purpose development processing is performed on a display-purpose RAW image whose number of resolutions has been reduced in advance. For this reason, the time required for the display-purpose development processing is shortened, which means that it takes a relatively short time from the changing of development conditions instructed by a user till the re-displaying of an updated (i.e., re-developed) preview image. Thus, since the user can visually confirm what the result will be like if a certain change in development conditions is effected, it becomes easier for the user to change the development conditions.

Furthermore, in the first embodiment of the invention described above, it is an exposure compensation coefficient that is calculated on the basis of the result of analysis performed on a reduced image. However, the scope of the invention is not limited to such an exemplary configuration. Other development conditions may be set on the basis of the result of analysis performed on a reduced image. For example, it is possible to detect a white region included in a reduced image and then determines parameters that are to be used for the white-balance adjustment processing (refer to the aforementioned step S306 of FIG. 10) on the basis of the color of the detected white region. As another example, it is also possible to determine parameters to be used for the color reproduction processing (refer to the aforementioned step S310 of FIG. 10) on the basis of the result of detection of a certain shooting object (e.g., sky or face) that is included in a reduced image. In such a modification example, the parameters for the color reproduction processing are set so as to ensure that the color of the above-mentioned certain shooting object falls within a range of a target color.

As still another example, it is also possible to identify a shooting object that is represented by a reduced image so as to set development conditions in accordance with the identified shooting object. For example, if the shooting object is identified as a landscape, development conditions can be determined in such a manner that a certain tone curve that heightens the contrast of an image should be used in the tone compensation processing (refer to the aforementioned step S314 of FIG. 10). On the other hand, if the shooting object is identified as a portrait, development conditions can be determined in such a manner that another certain tone curve that lowers the contrast of an image should be used in the tone compensation processing. If the shooting object is identified as a nightscape, development conditions can be determined in such a manner that brightness/luminosity correction should not be excessive. Furthermore, parameters to be used in the color reproduction processing (refer to the aforementioned step S310 of FIG. 10) may be suited to a type (i.e., scene) of each of these shooting objects.

B. Embodiment 2

Figure 29:
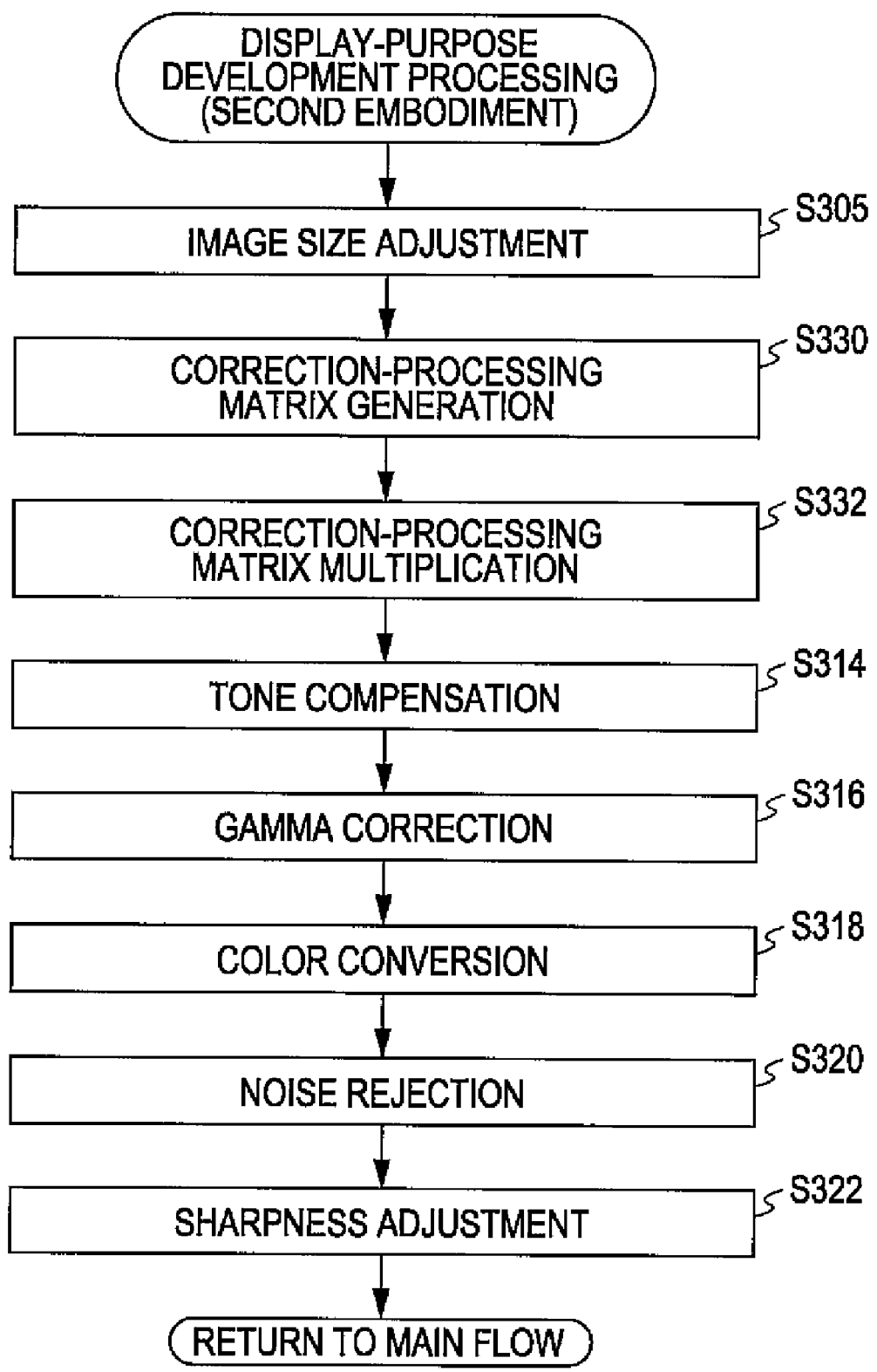
FIG. 29 is a flowchart that illustrates one example of the processing flow of display-purpose development processing according to a second embodiment of the invention.

FIG. 29 is a flowchart that illustrates an example of the processing flow of display-purpose development processing according to a second embodiment of the invention. The processing flow of the display-purpose development processing according to the second embodiment of the invention differs from that of the display-purpose development processing according to the first embodiment of the invention, which is illustrated in FIG. 13, in that the series of steps S306-S312 (i.e., white balance adjustment, exposure compensation, color reproduction, and hue correction) are replaced by correction-processing matrix generation (step S330) and correction-processing matrix multiplication (step S332) in the display-purpose development processing. Except for the above-described differences, the processing flow of the display-purpose development processing according to the second embodiment of the invention is the same as that of the display-purpose development processing according to the first embodiment of the invention.

As has already been described above, in each of the white balance adjustment processing and the exposure compensation processing, each of R, G, and B values is multiplied by a predetermined compensation coefficient (i.e., correction coefficient). In addition, in each of the color reproduction processing and the hue correction processing, 3×3 matrix operation is performed. Since each of these processing is a linear operation, arithmetic processing that is performed in steps S306-S312 of the display-purpose development processing illustrated in FIG. 13 can be expressed as the following mathematical formula (3).

$$\begin{pmatrix} r' \\ g' \\ b' \end{pmatrix} = \begin{pmatrix} H_{11} & H_{12} & H_{13} \\ H_{21} & H_{22} & H_{23} \\ H_{31} & H_{32} & H_{33} \end{pmatrix} \quad (3)$$

$$\begin{pmatrix} C_{11} & C_{12} & C_{13} \\ C_{21} & C_{22} & C_{23} \\ C_{31} & C_{32} & C_{33} \end{pmatrix} \begin{pmatrix} Ga & 0 & 0 \\ 0 & Ga & 0 \\ 0 & 0 & Ga \end{pmatrix} \begin{pmatrix} Ar & 0 & 0 \\ 0 & 1 & 0 \\ 0 & 0 & Ab \end{pmatrix} \begin{pmatrix} r \\ g \\ b \end{pmatrix}$$

In the above mathematical formula, the vectors (r, g, b) denote R, G, and B values before being subjected to arithmetic processing performed in steps S306-S312 of the display-purpose development processing illustrated in FIG. 13 (i.e., display-purpose RAW image), respectively. Whereas the vectors (r', g', b') denote R, G, and B values after being subjected to arithmetic processing performed in steps S306-S312 of the display-purpose development processing illustrated in FIG. 13, respectively. In the four matrices shown in the mathematical formula (3), the rightmost one represents arithmetic processing performed for white balance adjustment. The second one next to the rightmost white-balance adjustment matrix represents a matrix used for exposure compensation. The third one next to the second exposure compensation matrix represents a matrix used for color reproduction. Finally, the leftmost one of these four matrices shown in the mathematical formula (3) represents a matrix used for hue correction. In the present embodiment of the invention, each value of the vectors (r, g, b) is a 12-bit numerical value (or a numerical value having an extra sign in addition to 12 bits). Each element of each of the matrices contained in the mathematical formula (3) is a signed 16-bit numerical value.

In step S330 of the display-purpose development processing according to the second exemplary embodiment of the invention described herein, these matrices are multiplied by one another so as to generate a single matrix, which is referred to as a "correction-processing matrix" in this specification. Then, in the next step S332, the arithmetic processing is performed by means of the correction-processing matrix expressed in the following mathematical formula (4) so as to perform the batch processing of white balance adjustment, exposure compensation, color reproduction, and hue correction.

$$\begin{pmatrix} r' \\ g' \\ b' \end{pmatrix} = \begin{pmatrix} M_{11} & M_{12} & M_{13} \\ M_{21} & M_{22} & M_{23} \\ M_{31} & M_{32} & M_{33} \end{pmatrix} \begin{pmatrix} r \\ g \\ b \end{pmatrix} \quad (4)$$

The matrix of the above mathematical formula (4) represents the correction-processing matrix obtained as the result of multiplication of the matrices shown in the mathematical formula (3) by one another. Each element of the matrix contained in the mathematical formula (4) is also a signed 16-bit numerical value. In order to prevent any saturation or decreased precision from occurring during computation performed when converting the mathematical formula (3) into the mathematical formula (4), the computation of elements are performed in the precision unit of 32 bits. The result of the 32-bit computation is rounded into the precision unit of 16 bits. The arithmetic processing of the mathematical formula (4) is also performed in such a manner that no saturation or decreased precision occurs.

Since the correction-processing matrix has been generated in advance so as to make it possible to perform a plurality of processing in one batch process by means of the pre-generated correction-processing matrix, it is possible to reduce the load (i.e., burden or amount) of arithmetic processing required for processing a display-purpose RAW image.

In the explanation of the display-purpose development processing according to the second embodiment of the invention given above, the pre-generation of the correction-processing matrix and the batch arithmetic processing by means of the pre-generated correction-processing matrix are applied to the display-purpose development processing. Moreover, if a single matrix can be derived in advance from a plurality of matrices to be used for arithmetic processing, it is possible to perform a plurality of arithmetic processing in one batch process by means of the pre-generated single matrix for other development processing that is not the display-purpose development processing, in addition to the above-described display-purpose development processing. For example, the same pre-generation of the correction-processing matrix and the batch arithmetic processing by means of the pre-generated correction-processing matrix as those described above may be applied to the aforementioned final-image-formation development processing (refer to FIG. 10). Specifically, the generation of the correction-processing matrix may be performed in place of steps S306-S312 of FIG. 10, which corresponds to step S330 illustrated in FIG. 29. Thereafter, arithmetic processing of white balance adjustment, exposure compensation, color reproduction, and hue correction may be performed in one batch process by means of the pre-generated correction-processing matrix, which corresponds to the step S332 illustrated in FIG. 29.

C. Embodiment 3

Figure 30:
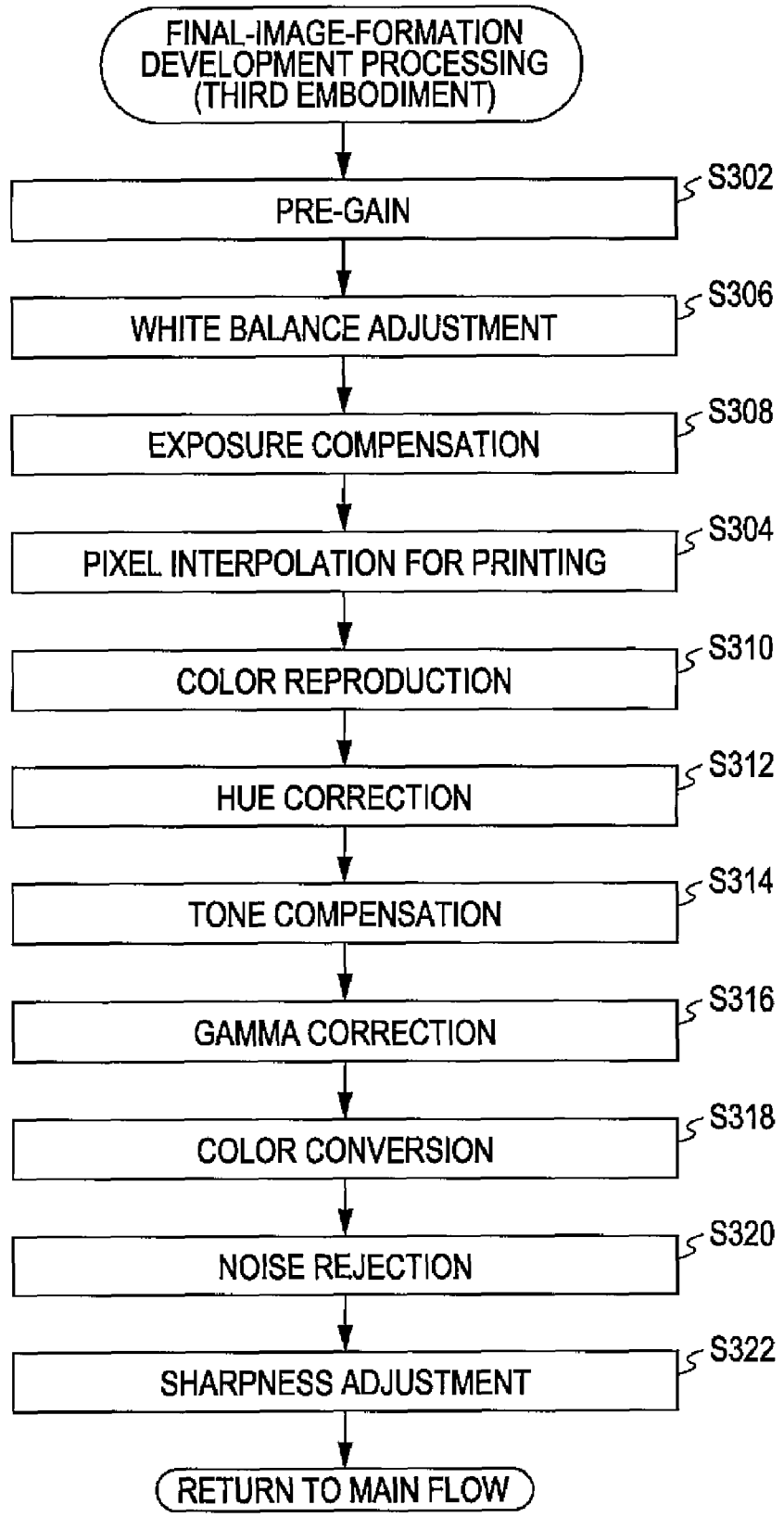
FIG. 30 is a flowchart that illustrates one example of the processing flow of final-image-formation development processing according to a third embodiment of the invention.

FIG. 30 is a flowchart that illustrates an example of the processing flow of final-image-formation development processing according to a third embodiment of the invention. The processing flow of the final-image-formation development processing according to the third embodiment of the invention differs from that of the final-image-formation development processing according to the first embodiment of the invention, which is illustrated in FIG. 10, in that the pixel-interpolation processing for printing (step S304) is performed after the exposure compensation processing (step S308) in the final-image-formation development processing according to the third embodiment of the invention. Except for the above-described difference, the processing flow of the final-image-formation development processing according to the third embodiment of the invention is the same as that of the final-image-formation development processing according to the first embodiment of the invention.

In each of the white balance adjustment processing and the exposure compensation processing, each of R, G, and B values is multiplied by a predetermined compensation coefficient. Therefore, even when pixel's color information is insufficient, it is still possible to perform processing by multiplying the gradation value of the color information of each pixel by the correction coefficient.

If the white-balance adjustment processing (step S306) and the exposure compensation processing (step S308) are performed prior to the execution of the pixel-interpolation processing (step S304), it is possible to reduce the amount of arithmetic processing required for this processing.

Furthermore, the pixel-interpolation processing (step S304) is performed before the white-balance adjustment processing (step S306) for the display-purpose development processing (refer to FIG. 13) and not before, even in the third embodiment of the invention. In this manner, it is possible to generate a display-purpose RAW image used in display-purpose development processing. In the display-purpose development processing, the size of a pre-generated display-purpose RAW image is relatively small. Therefore, in comparison with a case where white-balance adjustment processing and other processing are performed on the RAW image, the load of arithmetic processing required for the display-purpose development processing is relatively reduced. In addition, in a case where an instruction for changing development conditions is received from a user, it is possible to respond to (i.e., deal with) the user instruction just by performing the remaining development processing by means of the interpolated image.

As explained above, in the third embodiment of the invention, the execution timing of the pixel-interpolation processing performed during the final-image-formation development processing differs from the execution timing of the pixel-interpolation processing performed during the display-purpose development processing. Therefore, it is possible to reduce the burden of arithmetic processing for both of the final-image-formation development processing (FIG. 30) and the display-purpose development processing (FIG. 13).

D. Embodiment 4

Figure 31:
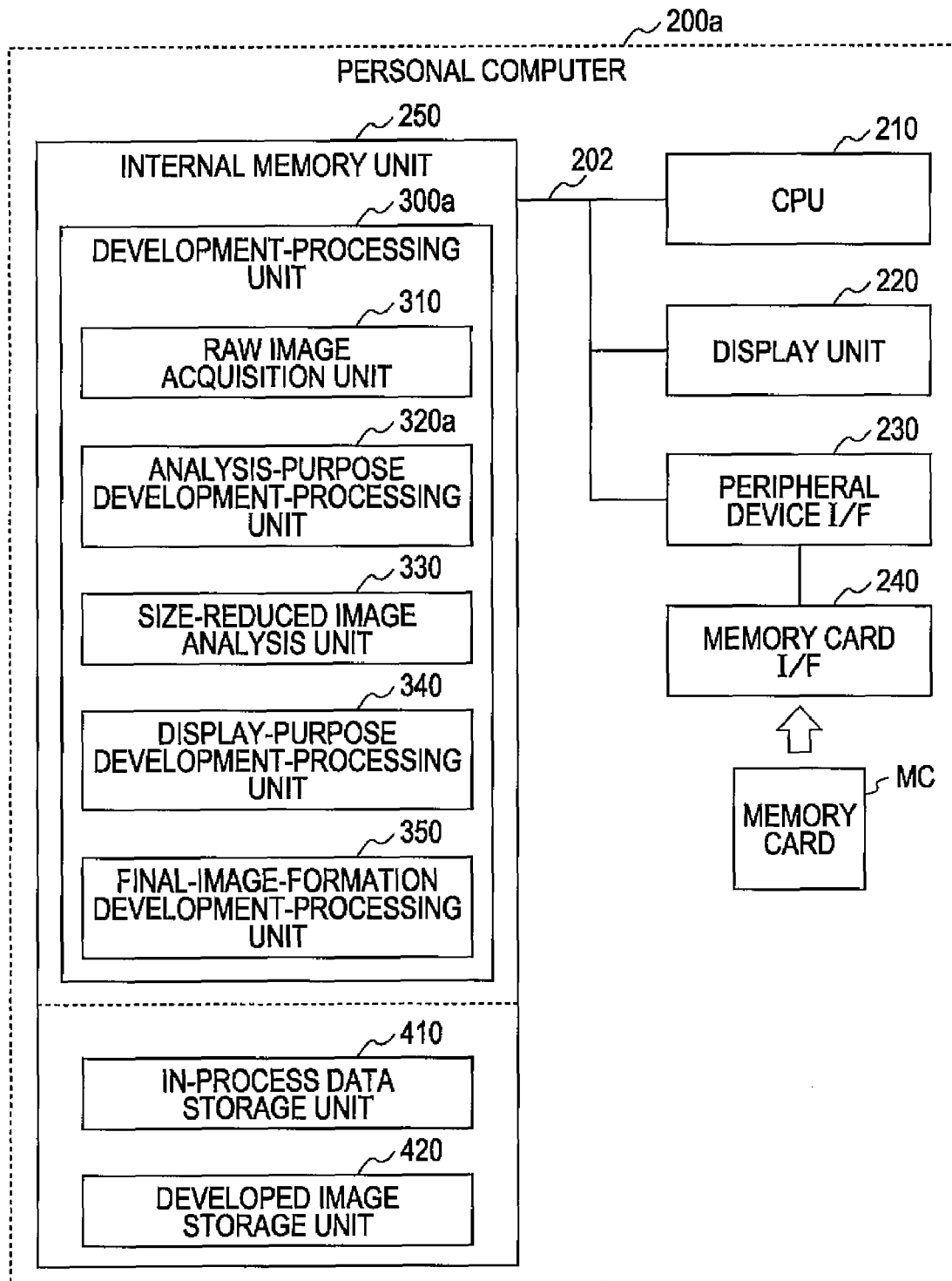
FIG. 31 is a block diagram that illustrates one example of a personal computer according to a fourth embodiment of the invention.

FIG. 31 is a diagram that schematically illustrates one example of a personal computer 200a according to a fourth embodiment of the invention. The configuration of the personal computer 200a according to the fourth embodiment of the invention differs from that of the personal computer 200 according to the first embodiment of the invention (refer to FIG. 3) in that the screen-nail size reduction unit 320 of the development-processing unit 300 according to the first embodiment of the invention is replaced by an in-process analysis development-processing unit 320a in the configuration of the personal computer 200a according to the fourth embodiment of the invention. In the following description, the in-process analysis development-processing unit is hereafter referred to as "analysis-purpose development-processing unit". Except for the above-described difference, the configuration of the personal computer 200a according to the fourth embodiment of the invention is the same as that of the personal computer 200 according to the first embodiment of the invention.

Figure 32:
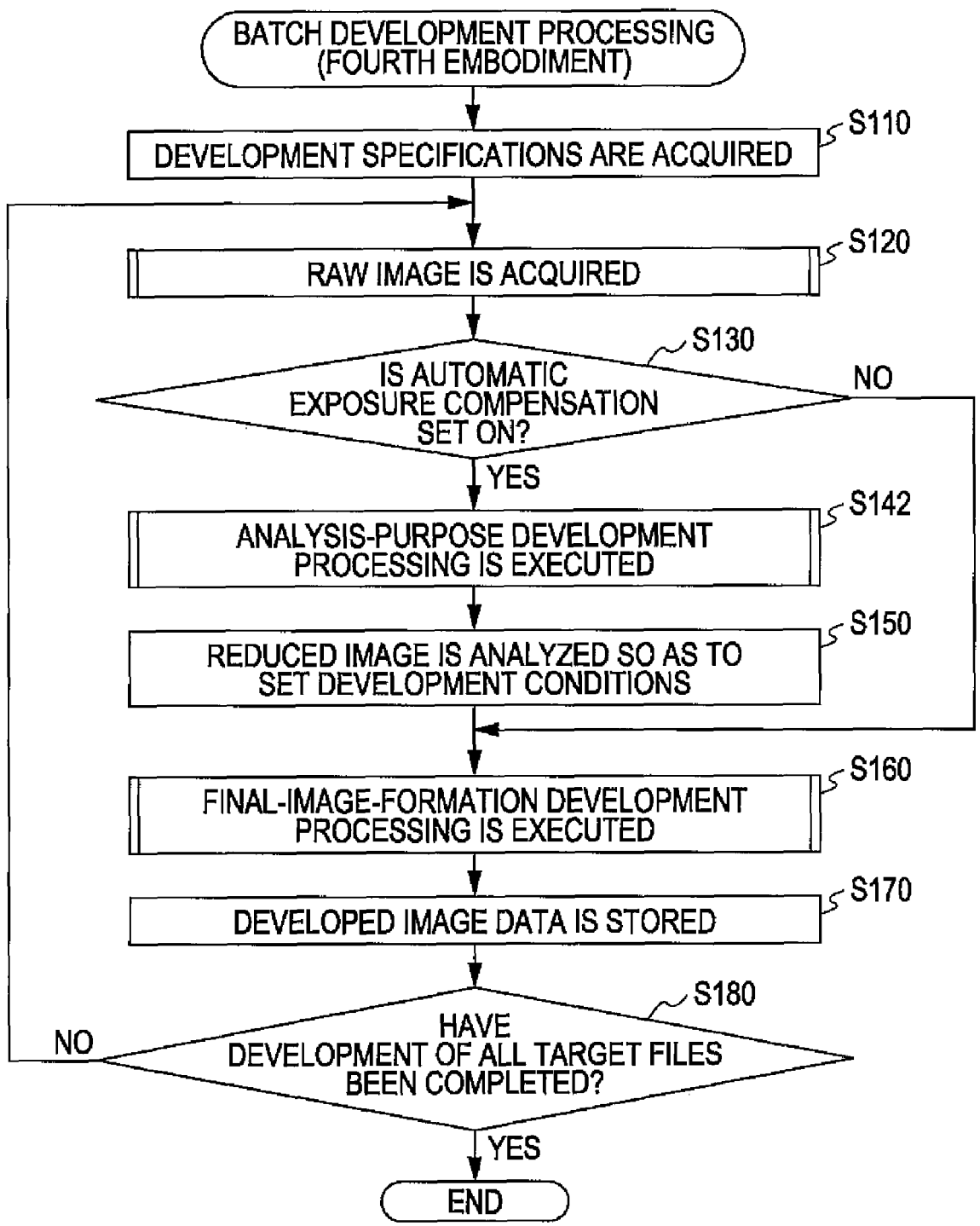
FIG. 32 is a flowchart that illustrates one example of the processing flow of batch development processing according to the fourth embodiment of the invention.

FIG. 32 is a flowchart that illustrates one example of the processing flow of batch development processing according to the fourth embodiment of the invention. The processing flow of the batch development processing according to the fourth embodiment of the invention differs from that of the batch development processing according to the first embodiment of the invention (refer to FIG. 4) in that step S140 of the batch development processing according to the first embodiment of the invention is replaced by step S142 in the batch development processing according to the fourth embodiment of the invention described herein. Except for the above-described difference, the processing flow of the batch development processing according to the fourth embodiment of the invention is the same as that of the batch development processing according to the first embodiment of the invention. Although an explanation is given of the batch development processing only in the following description, the same procedure as that explained below applies to the aforementioned individual development processing.

Figure 33:
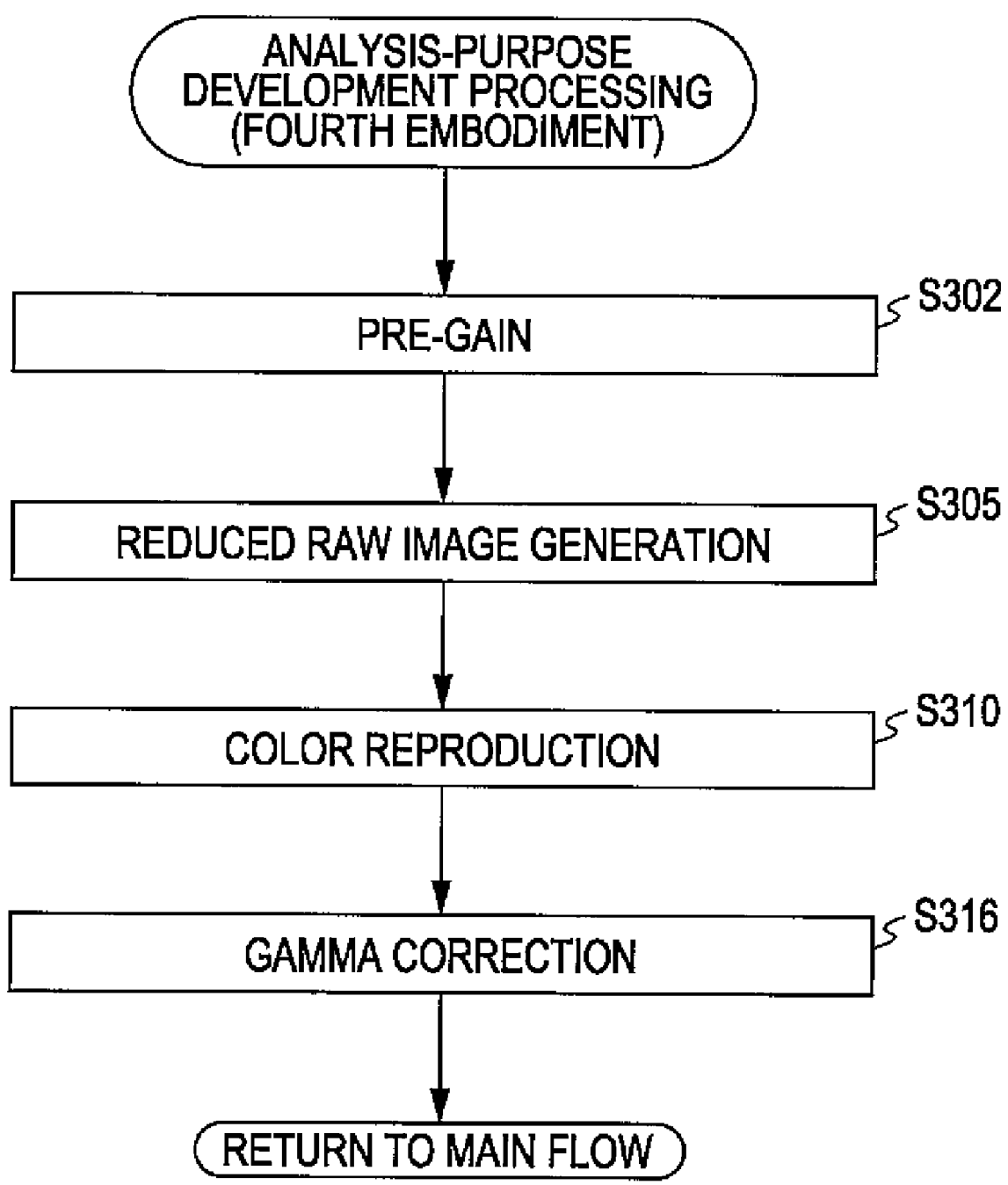
FIG. 33 is a flowchart that illustrates one example of the processing flow of analysis-purpose display processing, performed by an analysis-purpose development-processing unit in step S142 of FIG. 32.

FIG. 33 is a flowchart that illustrates an example of the processing flow of the analysis-purpose display processing performed by the analysis-purpose development-processing unit 320a in the step S142 shown in FIG. 32. The processing flow of the analysis-purpose display processing illustrated in FIG. 33 (e.g., analysis-run development processing) differs from that of the final-image-formation development processing illustrated in FIG. 10 (e.g., print-run development processing) in the following points: the white-balance adjustment processing (step S306), the exposure compensation processing (step S308), the hue correction processing (step S312), the tone compensation processing (step S314), the color conversion processing (step S318), the noise rejection processing (step S320), and the sharpness adjustment processing (step S322) of the final-image-formation development processing illustrated in FIG. 10 are omitted in the analysis-purpose display processing illustrated in FIG. 33. In addition, the pixel-interpolation processing for printing (step S304) of the final-image-formation development processing illustrated in FIG. 10 is replaced by a reduced RAW image generation processing (step S305) in the analysis-purpose display processing illustrated in FIG. 33.

In step S305, the analysis-purpose development-processing unit 320a performs pixel-interpolation processing on a RAW image in a simpler manner, which is hereafter referred to as "simplified pixel-interpolation processing". Then, the analysis-purpose development-processing unit 320a reduces the size of the interpolated image generated as the result of the simplified pixel-interpolation processing performed on the original RAW image so as to create a size-reduced RAW image, which is hereafter referred to as a reduced RAW image.

FIGS. 34A, 34B, 34C, 34D, and 34E are a set of explanatory diagrams that schematically illustrates one example of the simplified pixel-interpolation processing. A Bayer-array color filter is provided on the image pickup device of the digital still camera 100 (refer to FIG. 1). The Bayer color-filter array pattern is illustrated in FIG. 34A. Because of the arrangement characteristics of the Bayer-array color filter, elements that detect green incident light (i.e., G pixels) are patterned in such a manner that there are not any two G pixels that are adjacent to each other in a horizontal direction and in a vertical direction. The array pattern of the G pixels is shown in FIG. 34B. In addition, elements that detect red incident light (i.e., R pixels) are patterned in such a manner that the R pixels are placed at every other position. The array pattern of the R pixels is shown in FIG. 34C. In the simplified pixel-interpolation processing, if green color information is missing for a certain pixel, as illustrated in FIG. 34D, the G value thereof is calculated on the basis of the G values of four pixels that are vertically/horizontally adjacent to the G-missing pixel through pixel-interpolation processing by means of the aforementioned bi-linear method. On the other hand, in the simplified pixel-interpolation processing, if red color information is missing for a certain pixel, interpolation processing depends on the relative position of the R-missing pixel with respect to its adjacent pixels. For example, if two pixels that are vertically adjacent to the R-missing pixel are the R pixels, as illustrated in FIG. 34E, the R value of the R-missing pixel is linearly interpolated on the basis of the R values of these two vertically adjacent pixels. The same holds true for a horizontal case. If four pixels that are "diagonally adjacent" to the R-missing pixel are the R pixels, as illustrated in FIG. 34E, the R value of the R-missing pixel is calculated on the basis of the R values of these four diagonally adjacent pixels by means of the bi-linear method. The same simplified pixel-interpolation technique as that explained for the calculation of the R value of the R-missing pixel is applied to the calculation of the B value of the B-missing pixel. In the fourth exemplary embodiment of the invention described above, the pixel-interpolation processing is performed by means of the bi-linear method. However, the scope of the invention is not limited to such an exemplary configuration. Any other alternative pixel-interpolation technique may be adopted. For example, color information of either one pixel adjacent to a certain pixel in which color information is missing may be used as the "interpolated" value of the color-information-missing pixel. As another example, color information that is missing in a certain pixel may be calculated as the average values of color information of neighboring pixels that are adjacent thereto.

FIGS. 35A, 35B, and 35C are a set of explanatory diagram that schematically illustrates one example of the simplified pixel-interpolation processing performed by means of a method different from that illustrated in FIG. 34 (FIGS. 34A, 34B, 34C, 34D, and 34E). FIG. 35A illustrates the Bayer color-filter array pattern similar to that of FIG. 34A. In the simplified pixel-interpolation processing illustrated in FIG. 35, one pixel that has all of R, G, and B color information is formed from a 4×4 pixel block. In the following description, this pixel is referred to as an "RGB pixel". Specifically, one pixel is selected for each of the R color component, G color component, and B color component from the 4×4 pixel block. Then, the R value of the selected R pixel, the G value of the selected G pixel, and the B value of the selected B pixel are set as the RGB value of the RGB pixel. In this way, one RGB pixel is generated from each 4×4 pixel block. In this manner, it is possible to reduce the pixel size to one fourth in the simplified pixel-interpolation processing. The unitary pixel block size, that is, the unitary size of pixel area used for generation of each one RGB pixel may not necessarily be 4×4. The set of the R pixel, G pixel, and B pixel of the 4×4 pixel block each of which is used for the generation of the RGB pixel may be any one that is arrayed inside the 4×4 pixel area. For example, as explained in the step S122, the size reduction may be performed by means of a 2×2 unitary pixel area size.

The size of an image created from a RAW image through the simplified pixel-interpolation processing is reduced up to 320×240 pixels, which is the size to be used for image analysis. In this way, a reduced RAW image is created.

The reduced RAW image created through the above-described process is then subjected to the color reproduction processing (step S310) and the gamma correction processing (step S31). Accordingly, a reduced image for analysis, which is hereafter referred to as an analysis-purpose reduced image, is generated. Thereafter, the generated reduced image is analyzed in step S150 of FIG. 32 so as to set the aforementioned development conditions.

In the fourth embodiment of the invention, a reduced image is created through analysis-purpose development processing. Then, the created reduced image is subjected to analysis so as to set development conditions. Therefore, even in a case where no screen-nail image data is contained in a target RAW image file (refer to FIG. 2) or in a case where the screen-nail image data contained in a target RAW image file is not suitable to be used for analysis, it is possible to use a reduced image created through analysis-purpose development processing so as to determine development conditions. Even in a case where the resolution of the screen-nail image data that is contained in a target RAW image file is too low and thus not suitable to be used for analysis, or in a case where the type of the screen-nail image data contained in a target RAW image file is black-and-white one and thus not suitable to be used for analysis, it is still possible to use a reduced image created through analysis-purpose development processing so as to determine development conditions.

E. Embodiment 5

Figure 36:
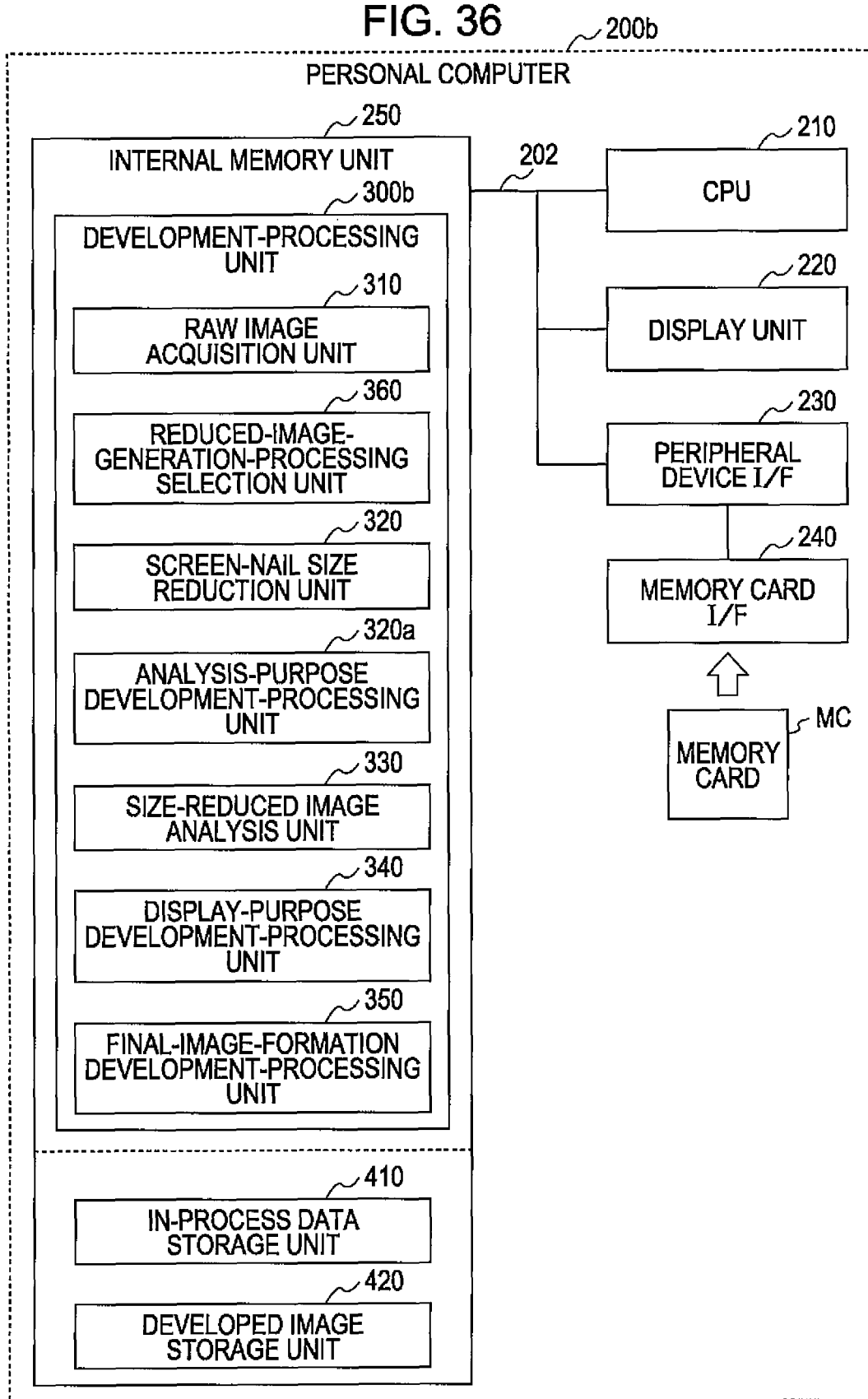
FIG. 36 is a block diagram that illustrates one example of a personal computer according to a fifth embodiment of the invention.

FIG. 36 is a diagram that schematically illustrates one example of the configuration of a personal computer 200b according to a fifth embodiment of the invention. The personal computer 200b according to the fifth embodiment of the invention differs from that of the personal computer 200 according to the first embodiment of the invention (refer to FIG. 3) in that a reduced-image-generation-processing selection unit 360 and the analysis-purpose development-processing unit 320a are additionally provided in the configuration of the personal computer 200b according to the fifth embodiment of the invention described herein. Except for the above-described difference, the configuration of the personal computer 200b according to the fifth embodiment of the invention is the same as that of the personal computer 200 according to the first embodiment of the invention.

Figure 37:
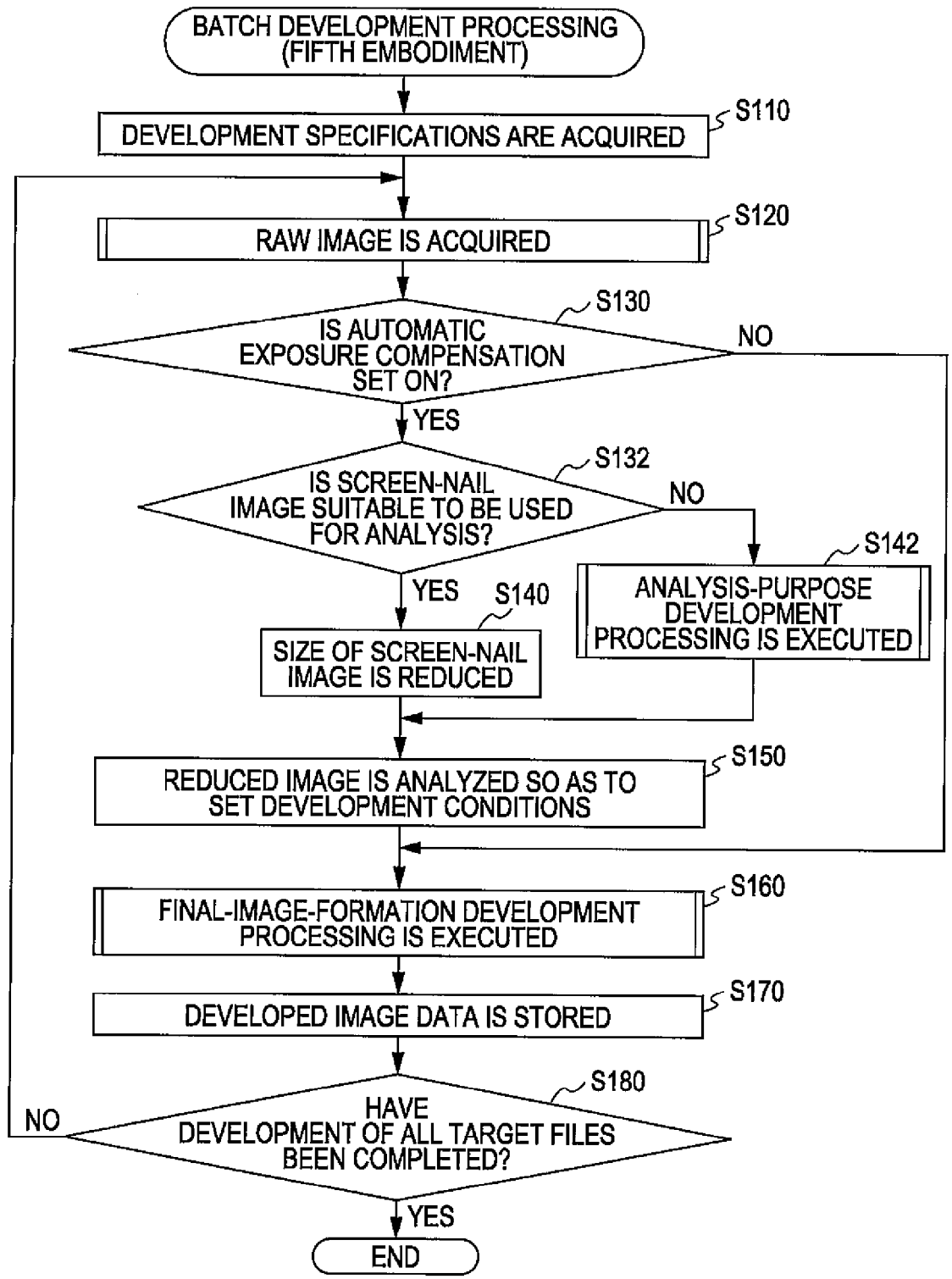
FIG. 37 is a flowchart that illustrates one example of the processing flow of batch development processing according to the fifth embodiment of the invention.

FIG. 37 is a flowchart that illustrates an example of the processing flow of batch development processing according to the fifth embodiment of the invention. The processing flow of the batch development processing according to the fifth embodiment of the invention differs from that of the batch development processing according to the first embodiment of the invention (refer to FIG. 4) in the following points: step S132 is added after step S130 in the batch development processing according to the fifth embodiment of the invention. In addition, step S142 is added as a branch destination of added step S132 in the batch development processing according to the fifth embodiment of the invention. Except for the above-described differences, the processing flow of the batch development processing according to the fifth embodiment of the invention is the same as that of the batch development processing according to the first embodiment of the invention. Although an explanation is given of the batch development processing only in the following description, the same procedure as that explained below applies to the aforementioned individual development processing.

In step S132, the reduced-image-generation-processing selection unit 360 makes a judgment as to whether the screen-nail image is suitable to be used for analysis or not. If it is judged that the screen-nail image is suitable to be used for analysis, the process moves on to step S140. Then, as done in the first embodiment, the size of the screen-nail image is reduced so as to create a size-reduced image. However, if it is judged that the screen-nail image is not suitable to be used for analysis, the process moves on to step S142. Then, as done in the fourth embodiment a size-reduced image is created through the analysis-purpose development processing.

The judgment as to whether the screen-nail image is suitable to be used for analysis or not is made on the basis of the data format of the RAW image file (refer to FIG. 2). The data format of the RAW image file can be identified on the basis of information on the name of a camera manufacturer or the model number thereof that is stored in the header portion, or on the basis of a file extension that is attached to the RAW image file. Then, on the basis of the identified data format of the RAW image file, it is judged that the screen-nail image is suitable to be used for analysis or not. For example, it is judged that the screen-nail image is not suitable to be used for analysis if the resolution thereof is too low. Furthermore, it is judged that the screen-nail image is not suitable to be used for analysis if it is a black-and-white image. As still another example thereof, it is judged that the screen-nail image is not suitable to be used for analysis if no screen-nail image data is contained in a target RAW image file. Note that the format of the screen-nail image data may be identified on the basis of the analysis of the screen-nail image data itself.

As explained above, in the fifth embodiment of the invention, a size-reduced image is created as the result of the reduction in size of a screen-nail image if the screen-nail image is suitable to be used for analysis. However, if the screen-nail image is not suitable to be used for analysis, a size-reduced image is created as the result of the execution of analysis-purpose development processing, which is performed on a RAW image. Typically, the load of arithmetic processing required for analysis-purpose development processing is heavier than that required for the reduction in size of a screen-nail image. In view of this fact, in the fifth embodiment of the invention, a size-reduced image is created as the result of the reduction in size of a screen-nail image if the screen-nail image is suitable to be used for analysis. Therefore, it is possible to reduce the amount of computing performed in order to set development conditions. However, if the screen-nail image is not suitable to be used for analysis, a size-reduced image is created as the result of the execution of analysis-purpose development processing. Therefore, it is possible to perform the setting of development conditions with increased reliability on the basis of the analysis of the created size-reduced image.

In the fifth embodiment of the invention described above, a reduced image that is to be used for analysis is selected between an image created as the result of the execution of analysis-purpose development processing and an image that is created as the result of the reduction in size of a screen-nail image on the basis of the format of a screen-nail image or on the basis of information on the digital still camera 100 (refer to FIG. 1) such as the name of a camera manufacturer or the model number thereof. However, the scope of the invention is not limited to such an exemplary configuration or specific embodiment. For example, the selection of a size-reduced image may be performed in accordance with the instruction given by a user.

F. Embodiment 6

Figure 38:
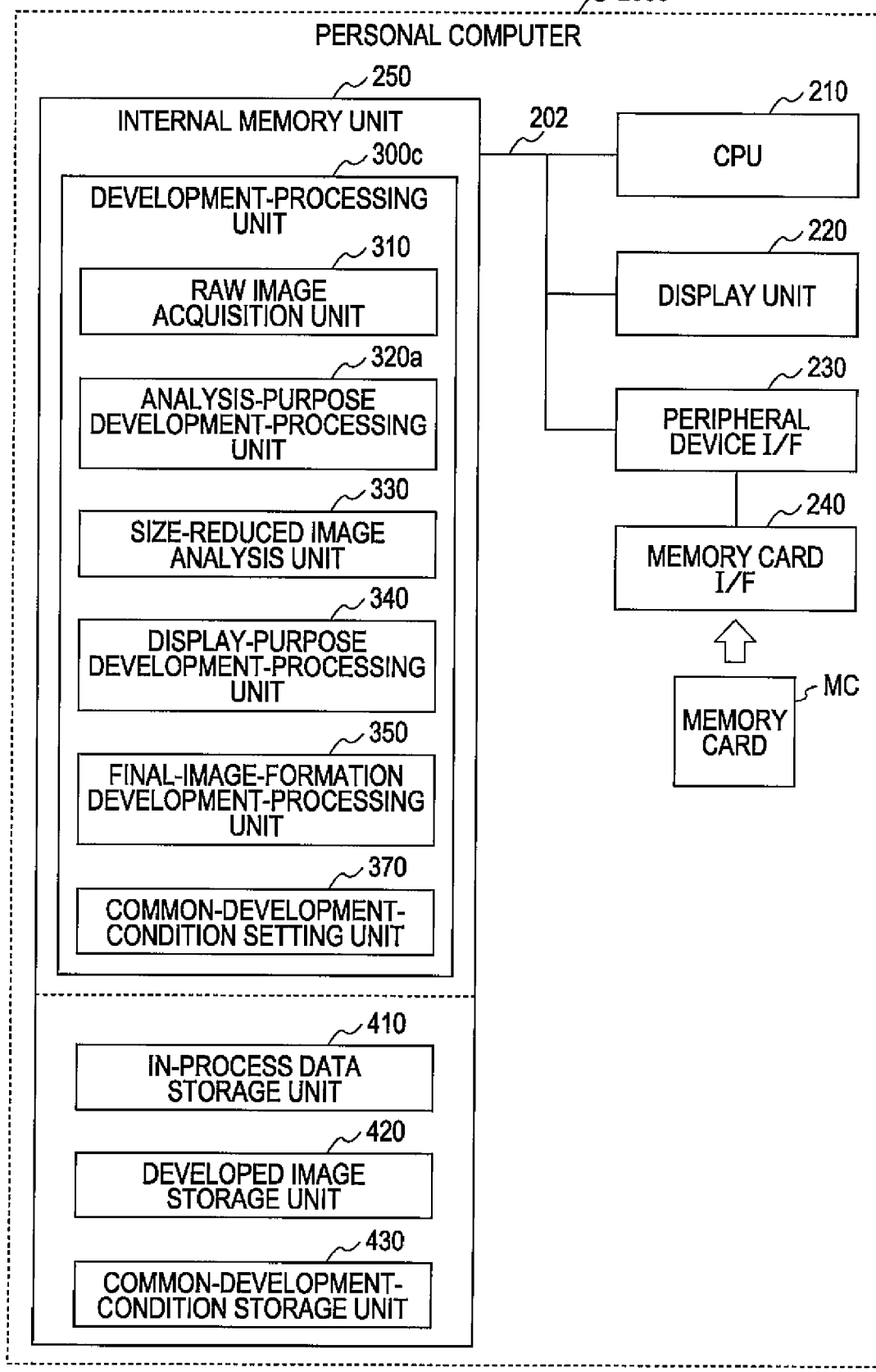
FIG. 38 is a block diagram that illustrates one example of a personal computer according to a sixth embodiment of the invention.

FIG. 38 is a diagram that schematically illustrates an example of a personal computer 200c according to a sixth embodiment of the invention. The configuration of the personal computer 200c according to the sixth embodiment of the invention differs from that of the personal computer 200a according to the fourth embodiment of the invention (refer to FIG. 31) in the following points: a common-development-condition setting unit 370 is additionally provided in a development-processing unit 300c in the personal computer 200c according to the sixth embodiment. In addition, a common-development-condition storage unit 430 is provided in the internal memory unit 250 in the configuration of the personal computer 200c according to the sixth embodiment of the invention. Except for the above-described differences, the configuration of the personal computer 200c according to the sixth embodiment of the invention is the same as that of the personal computer 200a according to the fourth embodiment of the invention.

Figure 39:
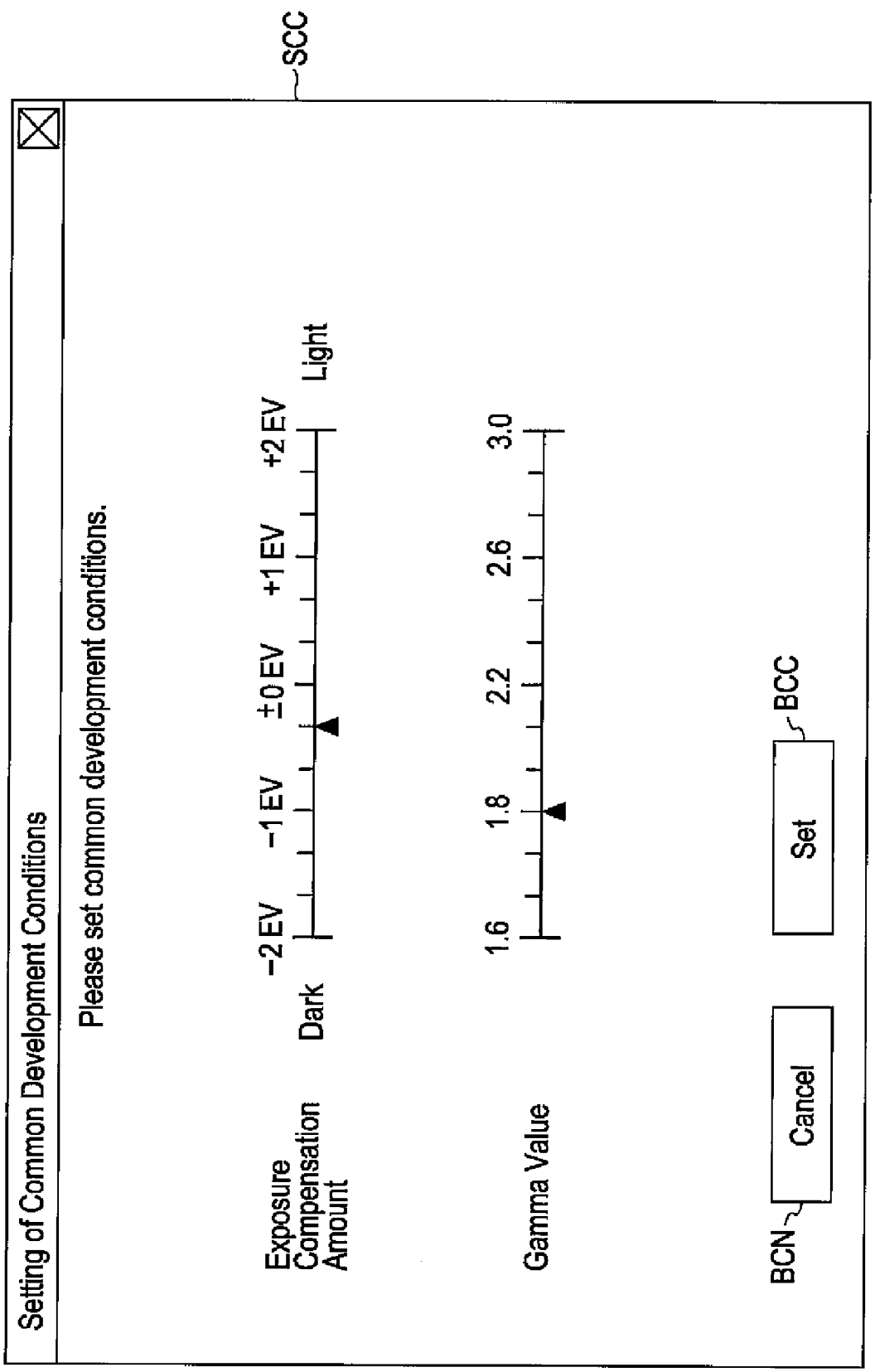
FIG. 39 is a schematic diagram that illustrates one example of a common-development-condition setting screen presented/used when a user sets development conditions as conditions used in common when performing development processing (i.e., common development conditions).

FIG. 39 is an explanatory diagram that schematically illustrates an example of a common-development-condition setting screen SCC that is presented/used when a user sets development conditions that are set as conditions used in common when performing development processing (i.e., common development conditions). The common-development-condition setting unit 370 displays the common-development-condition setting screen SCC on the display unit 220 (refer to FIG. 38) either at the time when a user launches a setting application or at the time when the setting of the common development conditions is instructed on an image-processing application.

The common-development-condition setting screen SCC includes a setting region for configuring exposure compensation amount and a setting region for configuring a gamma value. The exposure-compensation-amount setting region is denoted as RCE, whereas the gamma-value setting region is denoted as RCG. When a user manipulates a pointing device so as to slide a triangular indication notch in the exposure-compensation-amount setting region RCE, the common setting value of the exposure compensation amount changes in accordance with the movement of the triangular indication notch. However, when a user manipulates a pointing device so as to slide a triangular indication notch in the gamma-value setting region RCG, the common setting value of the gamma value changes in accordance with the movement of the triangular indication notch. Then, if the user presses down a "Set" button BCC, the common-development-condition setting unit 370 stores the user-configured (i.e., changed) common setting values of the exposure compensation amount and the gamma value into the common-development-condition storage unit 430. If the user presses down a "Cancel" button BCN, the user-configured common setting values of the exposure compensation amount and the gamma value are discarded. This means that the common development conditions stored in the common-development-condition storage unit 430 are not changed.

Figure 40:
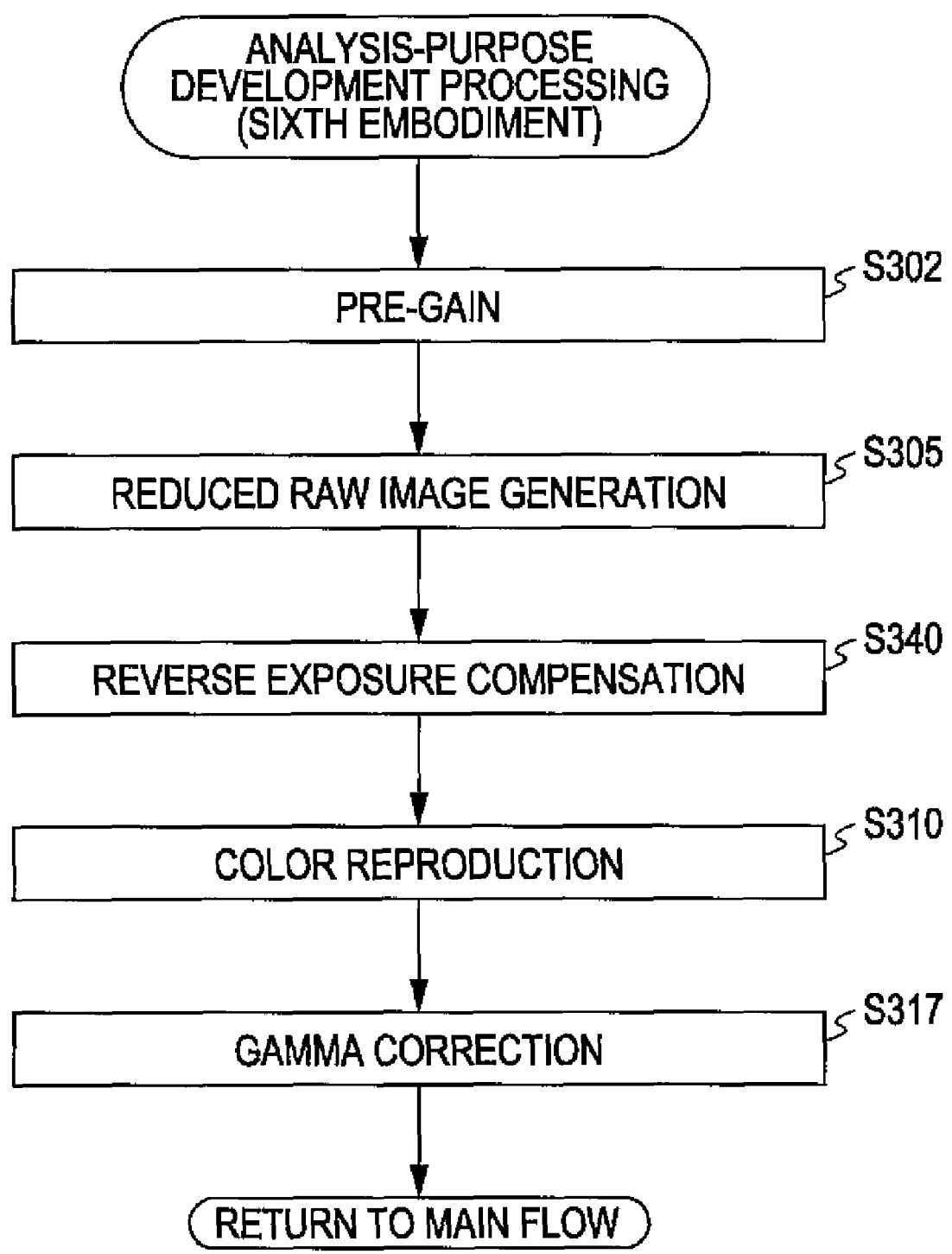
FIG. 40 is a flowchart that illustrates one example of the processing flow of analysis-purpose development processing according to the sixth embodiment of the invention.

FIG. 40 is a flowchart that illustrates an example of the processing flow of analysis-purpose development processing according to the sixth embodiment of the invention. The processing flow of the analysis-purpose development processing according to the sixth embodiment of the invention differs from that of the analysis-purpose development processing according to the fourth embodiment of the invention in the following points: step S340 in which reverse exposure compensation is performed is additionally provided between the step S305 and the step S310 in the analysis-purpose development processing according to the sixth embodiment of the invention. In addition, the step S316 of the analysis-purpose development processing according to the fourth embodiment of the invention in which gamma correction is performed is replaced by the step S317 in the analysis-purpose development processing according to the sixth embodiment of the invention. Although an explanation is given of the analysis-purpose development processing only in the following description, the replacement of the step S316 (gamma-correction) by step S317 also applies to the final-image-formation development processing (refer to FIG. 10) and the display-purpose development processing (refer to FIG. 13).

In step S340, the analysis-purpose development-processing unit 320a (refer to FIG. 38) performs the reverse exposure compensation processing on the basis of the common setting value of the exposure compensation amount stored in the common-development-condition storage unit 430. Specifically, in this reverse exposure compensation processing, the R, G, and B values of the reduced RAW image are multiplied by the inverse number of the exposure compensation coefficient corresponding to the common setting value of the exposure compensation amount. Through the reverse exposure compensation processing performed as described above, the exposure compensation coefficient obtained as the result of analyzing the created reduced image takes a value obtained as the result of the multiplication of a standard exposure compensation coefficient by the exposure compensation coefficient corresponding to the common setting value of the exposure compensation amount. Therefore, when the final-image-formation development processing or the display-purpose development processing is performed by means of the exposure compensation coefficient obtained as the result of analysis, the result of development processing takes a value that reflects the common setting value of the exposure compensation amount configured by the user.

In the non-limiting example shown in FIG. 39, the common setting value of the exposure compensation amount is set as "−⅓ EV". Accordingly, the R, G, and B values of the reduced RAW image are multiplied by the inverse number "1.26" of the exposure compensation coefficient "0.79" corresponding to the common setting value of the exposure compensation amount "−⅓ EV". Therefore, the exposure compensation coefficient obtained as the result of analyzing the reduced image takes a value obtained as the result of the multiplication of an exposure compensation coefficient at the time of no exposure-compensation-amount setting by the exposure compensation coefficient 110.7911 corresponding to the common setting value of the exposure compensation amount "−⅓ EV". Herein, the unit "EV" denotes the amount of exposure (i.e., Exposure Value). The compensation of "+1 EV" corresponds to an increase in aperture by one increment, or corresponds to a decrease in shutter speed by one increment. The compensation of "−1 EV" corresponds to a decrease in aperture by one increment, or corresponds to an increase in shutter speed by one increment.

In step S317, the analysis-purpose development-processing unit 320a performs gamma correction by means of the common setting value of the gamma value (γ) that is stored in the common-development-condition storage unit 430. The replacement of step S316 (gamma-correction) by step S317 also applies to the final-image-formation development processing (refer to FIG. 10) and the display-purpose development processing (refer to FIG. 13). For this reason, in the gamma correction performed in the course of various kinds of development processing, a common setting value configured by a user is used as the gamma value (γ) in place of values corresponding to the types of developed image data. The gamma value is never changed as the result of the analysis of a reduced image. For this reason, the common setting value configured by a user is used as each of the gamma value used for the analysis-purpose development processing, the gamma value used for the final-image-formation development processing, and the gamma value used for the display-purpose development processing in such a manner that the result of the gamma correction performed in the analysis-purpose development processing is equal to the result of the gamma correction performed in the final-image-formation development processing and to the result of the gamma correction performed in the display-purpose development processing.

As explained above, in the sixth embodiment of the invention, a user sets, in accordance with a user's preference, common development conditions for any development conditions whose settings do not change due to the analysis of a reduced image, an example of which is a gamma value. In this manner, the development results of the final-image-formation development processing and the display-purpose development processing are suited to a user's preference. Moreover, at the time when the analysis-purpose development processing is executed, reverse compensation is performed for the exposure compensation amount whose correction value (i.e., compensation value) is calculated through the analysis of a reduced image. Accordingly, the exposure compensation coefficient calculated through the analysis of a reduced image is changed in accordance with the exposure compensation amount configured (i.e., set) by a user. Since the exposure compensation coefficient calculated through the analysis of a reduced image is used for the final-image-formation development processing and the display-purpose development processing, it is possible to ensure that the result of development processing reflects the common setting value of the exposure compensation amount set by the user according to their preference.

In the sixth embodiment of the invention described above, it is assumed that the exposure compensation amount and the gamma value are preset as the common development conditions. However, the scope of the invention is not limited to such an exemplary configuration. That is, other development conditions such as the aforementioned color temperature and/or sharpness may be set as the common development conditions. The reverse correction (i.e., reverse compensation) is performed for some development conditions whose settings are changed due to the analysis of a reduced image, where such reverse correction is performed in the course of the analysis-purpose display processing in which the reduced image is created. However, for other development conditions whose settings never change due to the analysis of a reduced image, the same condition is applied to each of the analysis-purpose development processing, the final-image-formation development processing, and the display-purpose development processing. In the sixth embodiment of the invention, it is assumed that both of the exposure compensation amount and the gamma value are preset as the common development conditions. However, the scope of the invention is not limited to such an exemplary configuration. That is, either one of the exposure compensation amount and the gamma value may be set as the common development conditions.

G. Variation Example

Although various exemplary embodiments of the present invention are described above, needless to say, the invention is in no case restricted to these exemplary embodiments described herein. The invention may be configured in an adaptable manner in a variety of variations and/or modifications without departing from the spirit thereof. A non-limiting variation example thereof is explained below.

G1. Variation Example 1

In each of the exemplary embodiments described above, the invention is applied to development processing performed in a personal computer. However, the scope of the invention is not limited to such an exemplary application. That is, the invention can be applied to other various types of devices, apparatuses, equipment, and the like that perform development processing. As a non-limiting modified application thereof, the invention can be applied to a photo-viewing apparatus having a development-processing function that saves an image and displays the saved image. Alternatively, the invention can be applied to a printing apparatus having a development-processing function that prints out an image.

What is claimed is:

1. A development processing apparatus that performs development processing on the basis of an image file that contains an undeveloped image data created by a digital camera and contains an accompanying image data that accompanies the undeveloped image data, the accompanying image data being image data that has been subjected to development, the development processing apparatus comprising:
   an actual development processing section that creates actually developed image data conforming to a predetermined format from the undeveloped image data;
   a first analysis-purpose image generating section that creates a first analysis-purpose image data having a predetermined resolution by performing development processing on the undeveloped image data;
   a second analysis-purpose image generating section that creates a second analysis-purpose image data having a predetermined resolution from the accompanying image data;
   a development condition determining section that determines development conditions that are to be used by the actual development processing section by analyzing either one of the first analysis-purpose image data and the second analysis-purpose image data; and an analysis-purpose image data selecting section that selects either one of the first analysis-purpose image data and the second analysis-purpose image data as analysis-purpose image data that is to be used in the analysis performed by the development condition determining section on the basis of precedence between the first analysis-purpose image data and the second analysis-purpose image data.

2. The development processing apparatus according to claim 1, wherein the analysis-purpose image data selecting section determines the precedence on the basis of information on the digital camera contained in the image file.

3. The development processing apparatus according to claim 1, wherein the analysis-purpose image data selecting section determines the precedence on the basis of the type of the accompanying image data.

4. The development processing apparatus according to claim 3, wherein the analysis-purpose image data selecting section sets the second analysis-purpose image data higher in precedence than the first analysis-purpose image data if the accompanying image data is data that represents a black-and-white image.

5. The development processing apparatus according to claim 1, wherein the development condition determining section has a selection instruction acquiring section that acquires instructions for selecting the analysis-purpose image data given by a user; and the precedence is determined on the basis of the user instructions acquired by the selection instruction acquiring section.

6. The development processing apparatus according to claim 1, wherein the resolution of the first analysis-purpose image data is the same as the resolution of the second analysis-purpose image data.

7. A development processing method for performing development processing on the basis of an image file that contains an undeveloped image data created by a digital camera and contains an accompanying image data that accompanies the undeveloped image data, the accompanying image data being image data that has been subjected to development, the development processing method comprising:

creating actually developed image data conforming to a predetermined format from the undeveloped image data;

creating a first analysis-purpose image data having a predetermined resolution by performing development processing on the undeveloped image data;

creating a second analysis-purpose image data having a predetermined resolution from the accompanying image data;

determining development conditions that are to be used in the above-mentioned creation of the actually developed image data by analyzing either one of the first analysis-purpose image data and the second analysis-purpose image data; and selecting either one of the first analysis-purpose image data and the second analysis-purpose image data as analysis-purpose image data to be used in the analysis performed in the above-mentioned determination of the development conditions on the basis of precedence between the first analysis-purpose image data and the second analysis-purpose image data.

8. A development processing computer program for performing development processing on the basis of an image file that contains an undeveloped image data created by a digital camera and contains an accompanying image data that accompanies the undeveloped image data, the accompanying image data being image data that has been subjected to development, the development processing computer program stored in a non-transitory computer readable medium and the computer program comprising:

an actual development processing means for creating actually developed image data conforming to a predetermined format from the undeveloped image data;

a first analysis-purpose image generating means for creating a first analysis-purpose image data having a predetermined resolution by performing development processing on the undeveloped image data;

a second analysis-purpose image generating means for creating a second analysis-purpose image data having a predetermined resolution from the accompanying image data;

a development condition determining means for determining development conditions to be used in the actual development processing means by analyzing either one of the first analysis-purpose image data and the second analysis-purpose image data; and an analysis-purpose image data selecting means for selecting either one of the first analysis-purpose image data and the second analysis-purpose image data as analysis-purpose image data to be used in the analysis performed by the development condition determining means on the basis of precedence between the first analysis-purpose image data and the second analysis-purpose image data.

* * * * *

UNITED STATES PATENT AND TRADEMARK OFFICE
CERTIFICATE OF CORRECTION

| | | |
|---|---|---|
| PATENT NO. | : 8,125,533 B2 | |
| APPLICATION NO. | : 12/117618 | |
| DATED | : February 28, 2012 | |
| INVENTOR(S) | : Ryuichi Shiohara | |

It is certified that error appears in the above-identified patent and that said Letters Patent is hereby corrected as shown below:

Title Page, item [75]

The inventor's residence should be spelled Matsumoto

Signed and Sealed this
Tenth Day of July, 2012

David J. Kappos
*Director of the United States Patent and Trademark Office*